(12) United States Patent
Sakagami et al.

(10) Patent No.: US 8,469,528 B2
(45) Date of Patent: Jun. 25, 2013

(54) IMAGING OPTICAL SYSTEM AND RANGE FINDER

(75) Inventors: Norihisa Sakagami, Osaka (JP); Takahiro Fujioka, Osaka (JP); Kouei Hatade, Osaka (JP)

(73) Assignee: Nalux Co., Ltd., Osaka (JP)

( * ) Notice: Subject to any disclaimer, the term of this patent is extended or adjusted under 35 U.S.C. 154(b) by 427 days.

(21) Appl. No.: 12/773,279

(22) Filed: May 4, 2010

(65) Prior Publication Data

US 2010/0271691 A1    Oct. 28, 2010

Related U.S. Application Data

(63) Continuation-in-part of application No. PCT/JP2008/070355, filed on Nov. 7, 2008, and a continuation-in-part of application No. PCT/JP2007/071844, filed on Nov. 9, 2007.

(51) Int. Cl.
*G02B 5/08* (2006.01)
*G02B 5/10* (2006.01)

(52) U.S. Cl.
USPC .............................. 359/850; 359/861; 359/858

(58) Field of Classification Search
USPC ........................................................ 359/861
See application file for complete search history.

(56) References Cited

U.S. PATENT DOCUMENTS

| | | | | |
|---|---|---|---|---|
| 5,153,898 | A * | 10/1992 | Suzuki et al. | 378/34 |
| 7,001,031 | B2 * | 2/2006 | Sasaki | 359/859 |
| 2005/0063075 | A1 | 3/2005 | Nagata et al. | |

FOREIGN PATENT DOCUMENTS

| | | |
|---|---|---|
| JP | 2004-126510 | 4/2004 |
| JP | 2005-55755 | 3/2005 |
| JP | 2005-326496 | 11/2005 |
| JP | 2007-017698 | 1/2007 |

\* cited by examiner

*Primary Examiner* — Jade R Chwasz
(74) *Attorney, Agent, or Firm* — Squire Sanders (US) LLP

(57) ABSTRACT

An imaging optical system includes three reflecting mirrors having first to third reflection surfaces and is configured, such that in an XYZ orthogonal coordinate system using an optical axis at the center of the field of view as Z-axis, the optical axis at the center of the field of view and an optical axis of an image plane are in parallel to each other Assuming that along the path of the beam traveling along the optical axis at the center of the field of view a distance between the second reflection surface and the third reflection surface is L2, a distance between the third reflection surface and the image plane is L3 and fy1 and an equivalent F-number of the imaging optical system is represented as Fno, the relational expression $0.5 < Fno(L2/L3) < 1.3$ is satisfied.

16 Claims, 48 Drawing Sheets

HORIZONTAL FOV

HORIZONTAL FOV

HORIZONTAL FOV

HORIZONTAL FOV

HORIZONTAL FOV

HORIZONTAL FOV

HORIZONTAL FOV

HORIZONTAL FOV

HORIZONTAL FOV

FIG. 80
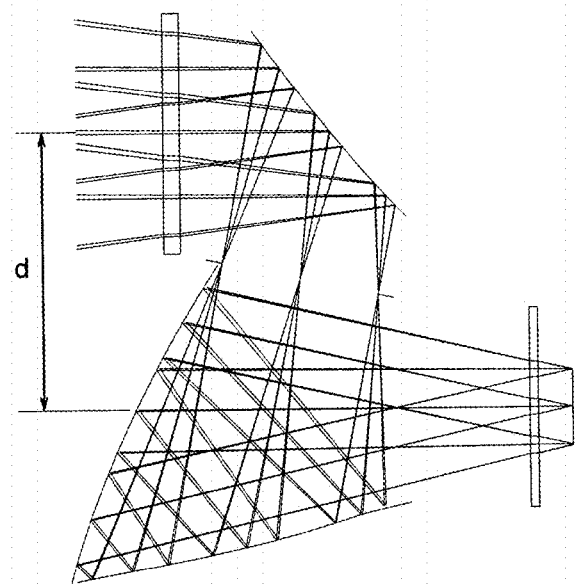
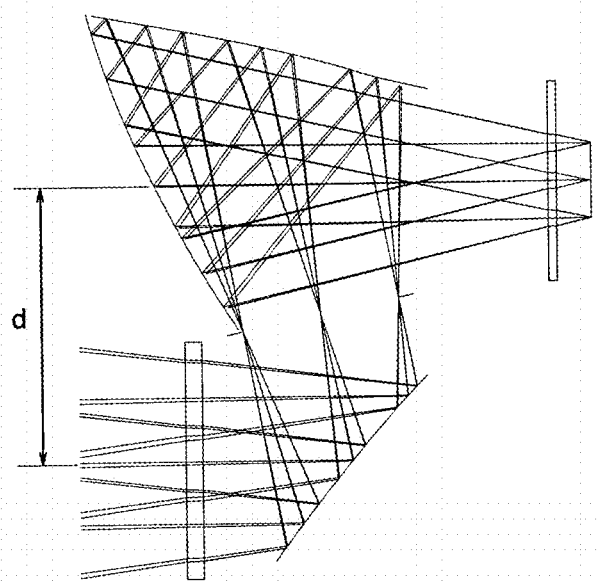

IMAGING OPTICAL SYSTEM AND RANGE FINDER

CROSS-REFERENCE RELATED APPLICATIONS

This is a Continuation-in-Part (CIP) application of International Application No. PCT/JP2008/070355, filed Nov. 7, 2008, and is also a Continuation-in-Part (CIP) application of International Application No. PCT/JP2007/071844, filed Nov. 9, 2007. The disclosure of the prior applications is hereby incorporated by reference herein in its entirety.

FIELD OF THE INVENTION

The present invention relates to an imaging optical system using reflecting mirrors. Particularly, the invention relates to a compact imaging optical system for infrared light using reflecting mirrors.

BACKGROUND ART

If an imaging optical system for infrared imaging devices is realized by transmission optical elements such as lenses, it is necessary to use germanium as a raw material and the price rises.

Accordingly, to realize a low-price imaging optical system, an imaging optical system using reflecting mirrors is preferable. An imaging optical system using reflecting mirrors is disclosed in JP2004-126510, for example.

However, the imaging optical system described above is not bright enough to be used for infrared imaging devices such as infrared cameras. An imaging optical system using reflecting mirrors which is compact enough to be mounted on vehicles or the like and is sufficiently bright has not been developed.

In order to achieve an object of the present invention, brightness (F-number, Fno.) of an imaging optical system used for infrared and far-infrared lights (7 to 14 micrometers) should be 2.2 or less (brighter) to prevent deterioration in resolution due to effects of diffraction. When F-number is greater than the value, the beam spot will be larger than the pixel size of the commercially available infrared imaging element and therefore the optical system cannot meet requirement of resolution of the infrared imaging element. For visible lights F-number of 6 or less is sufficient. So, imaging optical systems used for visible lights can hardly be used for far-infrared lights.

Further, in such optical systems using reflection as that of the present invention, stray lights often reach the image plane, and therefore to study how to remove stray lights is more important than to study how to correct aberration. On the contrary, in optical systems using refraction it is almost unnecessary to study effects of stray lights.

That is, in order to achieve the object of the present invention, it is necessary to study how to obtain F number of 2.2 or less and how to remove stray lights, which has not been studied in the prior art and therefore cannot be studied based on the prior art.

Accordingly, there is a need for an imaging optical system using reflecting mirrors which is compact enough to be mounted on vehicles or the like and is sufficiently bright and from which stray lights have been sufficiently removed.

SUMMARY OF THE INVENTION

An imaging optical system according to an aspect of the invention includes three reflecting mirrors having first to third reflection surfaces and is configured, such that in an XYZ orthogonal coordinate system using an optical axis at the center of the field of view as Z-axis, the optical axis at the center of the field of view and an optical axis of an image plane are in parallel to each other by changing orientation of the optical axis in a YZ section while maintaining the orientation of the optical axis in an XZ section. At least one of the three reflection surfaces is rotationally asymmetric. Assume that along the path of the beam traveling along the optical axis at the center of the field of view a distance between the second reflection surface and the third reflection surface is L2, a distance between the third reflection surface and the image plane is L3 and an equivalent F-number of the imaging optical system is represented as Fno. Then, the relational expression $$0.5 < Fno(L2/L3) < 1.3$$

is satisfied.

When the relational expressions described above are satisfied, an imaging optical system which is compact and is sufficiently bright for use with infrared light can be obtained.

According to the aspect of the invention, the layout size can be reduced and vignetting can be prevented. Further, the angle of view can be increased and telecentricity of the angle of view of light reaching the image plane (degree of how orthogonally the reaching light travels to the image plane) can be improved. Further, a space for setting a light shielding plate can be obtained between the first reflection surface and the second reflection surface. Further, stray light reaching the image plane can be shielded as much as possible.

Since the imaging optical system is configured such that the optical axis at the center of the field of view and the optical axis of the image plane are in parallel to each other, focusing can be easily performed by a simple mechanism such as screws.

Since at least one of the three reflection surfaces is rotationally asymmetric, curvature of field and comatic aberration can be easily removed.

An imaging device according to another aspect of the invention includes the imaging optical system according to the aspect of the invention described above.

The imaging device according to the aspect of the invention is bright enough to be used for infrared imaging devices such as infrared cameras.

BRIEF DESCRIPTION OF THE DRAWINGS

FIG. 80 shows a configuration of an imaging optical system according to an embodiment of the present invention and a configuration in which the imaging optical system is rotated to 180 degrees around the optical axis of the image plane;

DETAILED DESCRIPTION OF THE INVENTION

Figure 1:
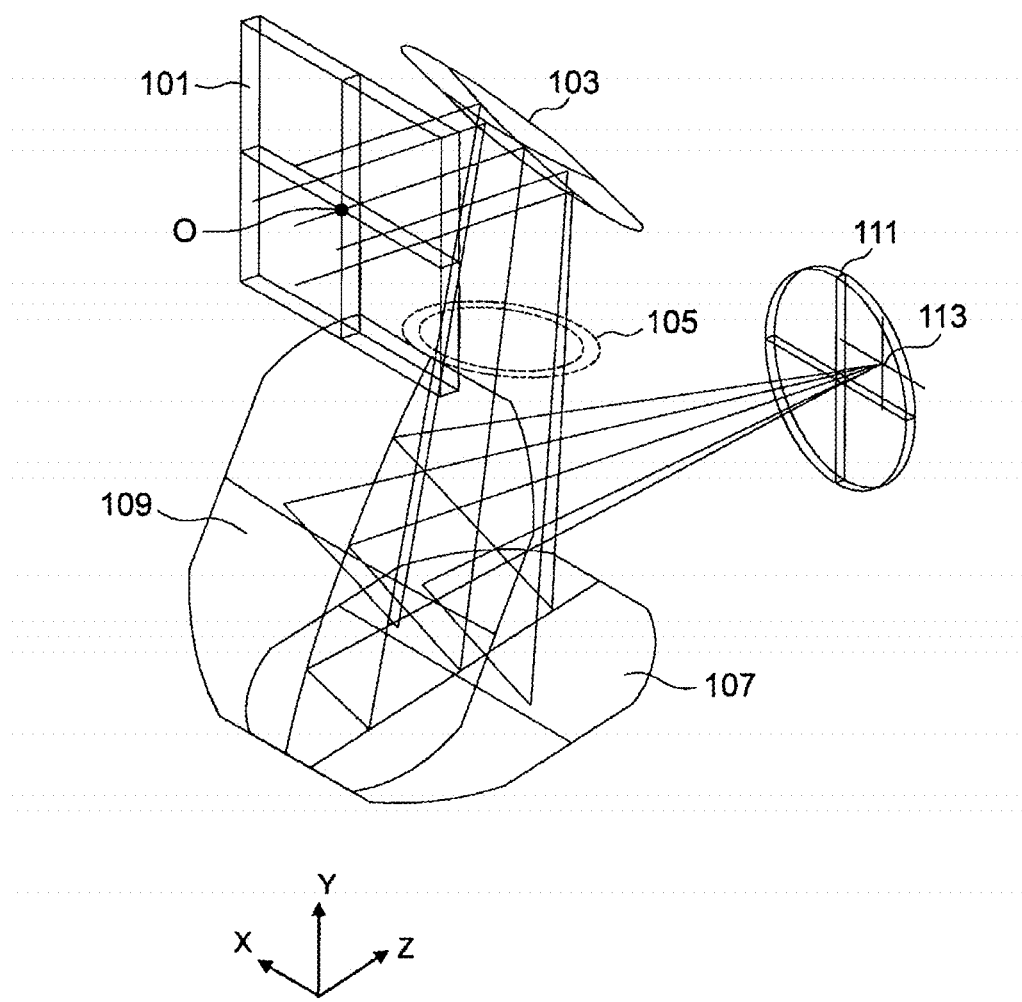
FIG. 1 shows a configuration of an imaging optical system according to one embodiment of the present invention.

FIG. 1 shows a configuration of an imaging optical system according to one embodiment of the invention. An orthogonal coordinate system in which the optical axis at the center of the field of view is set to Z-axis and the intersection of the Z-axis and the object side surface of a window plate 101 is set to the origin of coordinates O, is determined.

The light passing through the window plate 101 is reflected by a first reflecting mirror 103, a second reflecting mirror 107, and a third reflecting mirror 109, passes through a window plate 111, and then, forms an image on an image plane 113 of an infrared imaging device.

Figure 2A:
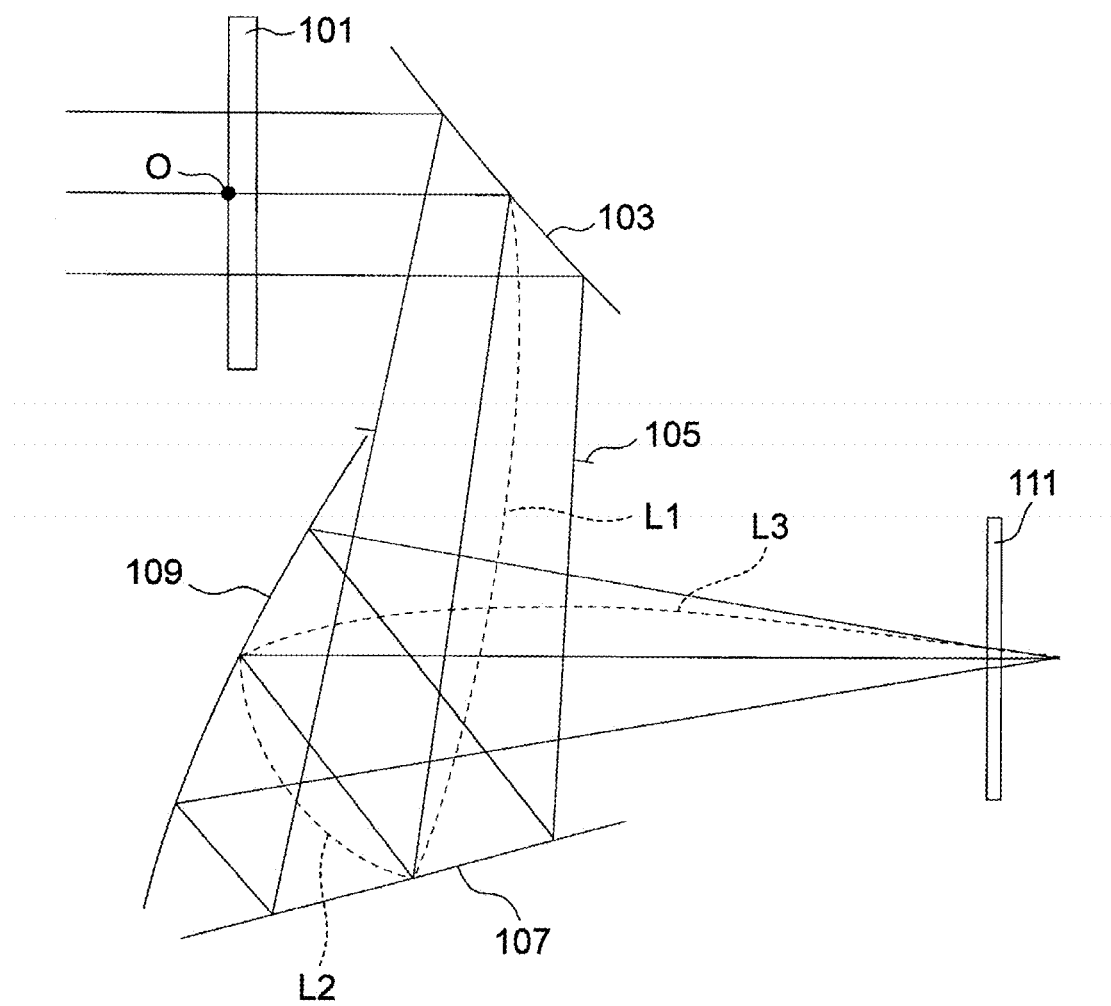
FIG. 2A is a YZ sectional view of the imaging optical system shown in FIG. 1.

FIG. 2A is a YZ sectional view of the imaging optical system shown in FIG. 1. In the embodiment, an aperture stop 105 is provided between the first reflecting mirror 103 and the second reflecting mirror 107.

As shown in FIG. 2A, while the orientation of the optical axis changes in the YZ section, the orientation of the optical axis does not change in the XZ section. Further, the optical system is configured such that the optical axis at the center of the field of view and the optical axis incident to the image plane may be in parallel.

The imaging optical system according to the present invention using reflecting mirrors is bright or has a small F-number and therefore it can be used for lights (electromagnetic waves) having a wide range of wavelength. It can be used for electromagnetic waves including millimeter waves and terahertz waves besides infrared lights.

The reflecting mirror may be formed by coating plastic with metal. Plastic is easy to be molded and therefore curved shapes of reflection surfaces can be realized with high precision. When a metal such as aluminum, silver, or gold that reflects visible light is used, the imaging optical system can be easily inspected and adjusted with visible light.

Material of the window plate is germanium (having refractive index of 4.003), silicon (having refractive index of 3.419) or the like.

The features of the embodiments of the present invention will be described below. Assume that along the path of the beam traveling along the optical axis at the center of the field of view a distance between the first reflecting mirror and the second reflecting mirror is L1, a distance between the second reflecting mirror and the third reflecting mirror is L2, a distance between the third reflecting mirror and the image plane is L3 and a distance between the first reflecting mirror and the image plane, that is, a sum of L1, L2 and L3 is L (FIG. 2A).

Length of L2

As L2 becomes larger, effect of vignetting in which light beam which has been reflected by the first reflection surface 103, travels toward the second reflection surface 107 and is blocked by the third reflection surface 109 becomes smaller. Accordingly, the diameter of light beam can be increased and as a result brightness can be improved.

In order to realize a desired brightness of the imaging optical system, L2 should be determined such that the following relational expression is satisfied assuming that a desired equivalent F-number is represented as Fno.

$$0.5 < Fno(L2/L3) < 1.3$$

When Fno(L2/L3) is less than the lower limit, the second reflection surface and the third reflection surface might contact with or overlap each other. When Fno(L2/L3) is greater than the upper limit, a sufficient angle of view (for example, 6 degrees or greater in absolute value) cannot be obtained for an appropriate L3 provided that equivalent F-number is equal to or less than 2.2. For example, in the sixth embodiment of JP2004-126510 shown in FIG. 24 the following relational expression is held.

$$Fno(L2/L3) = 1.45$$

In this case, F-number is 2 while the angle of view (opposite angle) is 1 degree. Further, when Fno(L2/L3) is greater than the upper limit, the imaging optical system tends to be affected by stray lights resulting in generating an image with flare and ghost.

Negative Refracting Power of the First Reflection Surface

Figure 65:
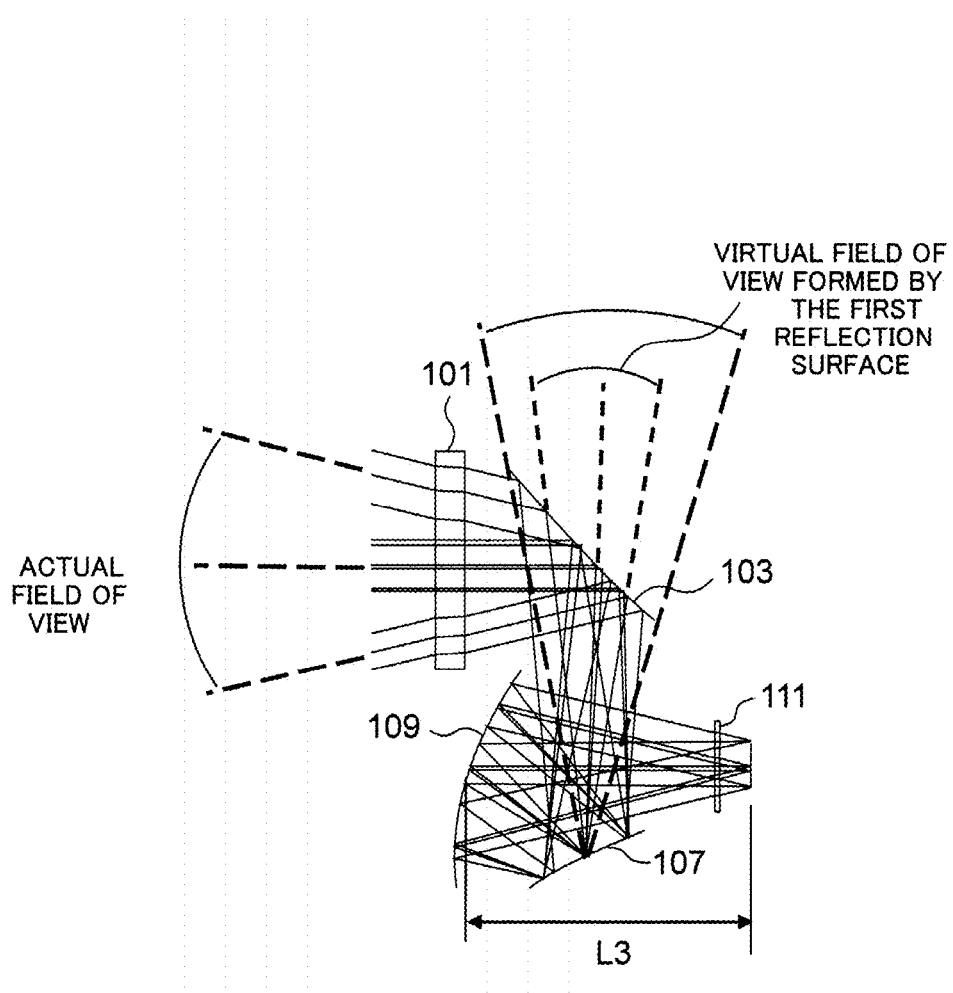
FIG. 65 is a drawing for illustrating function of the first reflection surface as a convex surface.

FIG. 65 is a drawing for illustrating function of the first reflection surface as a convex surface. As shown in FIG. 65, when the first reflection surface is a convex surface, a field of view of a virtual image formed by the first reflection surface is made smaller than the actual field of view. This allows reduction of layout dimension and prevention of vignetting of light beam. Vignetting specifically means the phenomenon in which light beam which has been reflected by the first reflection surface 103 and travels toward the second reflection surface 107 is blocked by the third reflection surface 109. Further, this allows increase in the angle of view and improves telecentricity of the angle of view of light reaching the image plane (degree of how orthogonally the reaching light travels to the image plane). Further, brightness (F-number) can be improved and a space for setting a light shielding plate can be obtained between the first reflection surface and the second reflection surface.

L3 determines the sensor layout and therefore a focal length of the convex surface of the first reflection surface should preferably be determined based on L3. in order to achieve the effects described above, fx1 and fy1 should be determined such that the following relational expressions are satisfied, assuming that the focal length of the first reflection surface in XZ section and that in YZ section are represented respectively as fx1 and fy1. In the text of specification and claims, a focal length of the reflection surface having negative refracting power is defined by a positive value.

$$0 < fx1/L3 < 5$$

$$0 < fy1/L3 < 10$$

A part of the negative refractive power of the first reflection surface may be carried by a window plate (represented as 101 in FIG. 1) set on the object side of the first reflection surface. In the case, assuming that the combined focal length of the first reflection surface in XZ section and that in YZ section are represented respectively as fx1' and fy1', fx1' and fy1' should be determined such that the following relational expressions are satisfied.

$$0 < fx1'/L3 < 5$$

$$0 < fy1'/L3 < 10$$

Figure 5:
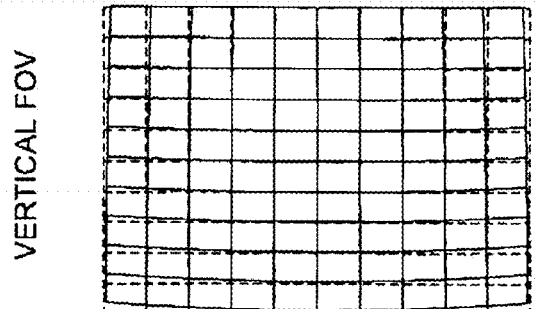
FIG. 5 shows distortion aberration of the imaging optical system of Example 1.
Figure 21:
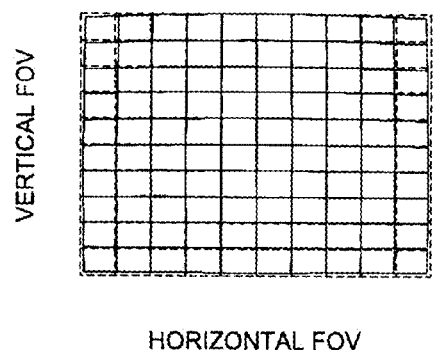
FIG. 21 shows distortion aberration of the imaging optical system of Example 5.

Distortion of the imaging optical system is generated by the refractive power of the convex surface of the first reflection surface. As described in detail later, distortion in the case that the window plate (represented as 101 in FIG. 1) is flat is shown in FIG. 5 of Example 1, for example, while distortion in the case that the window plate (represented as 101 in FIG. 1) carries a part of the negative refractive power is shown in FIG. 21 of Example 5, for example. Thus, distortion is remarkably reduced when a part of the negative refractive power is carried by the window plate (represented as 101 in FIG. 1).

Length of L1

In order to shield stray light as much as possible, L1 should be determines such that the following relational expression is satisfied.

$$0.35 < L1/L < 0.5$$

When L1/L is smaller than the lower limit, light beam passing through the window plate is not reflected by the first reflection surface and directly reaches the image plane. That is, a risk f stray light reaching the image plane will increase. When L1 becomes smaller, L2 becomes relatively large. As a result, the whole imaging optical system cannot be realized due to contacts between reflecting mirrors. When L1/L is greater than the upper limit, the layout size of the optical system (the minimum area required for installation of the optical system) becomes excessively large.

In order to achieve an object of the present invention, brightness (F-number, Fno.) of an imaging optical system used for infrared and far-infrared lights (7 to 14 micrometers) should be 2.2 or less (brighter) to prevent deterioration in resolution due to effect of diffraction. When F-number is greater than the value, the spot will be larger than the pixel size of the commercially available infrared imaging element and therefore the optical system cannot meet requirement of resolution of the infrared imaging element. For visible lights F-number of 6 or less is sufficient. So, imaging optical systems used for visible lights can hardly be used for far-infrared lights.

Further, in such optical systems using reflection as that of the present invention, stray lights often reach the image plane, and therefore to study how to remove stray lights is more important than to study how to correct aberration. On the contrary, in optical systems using refraction it is almost unnecessary to study effect of stray lights.

That is, in order to achieve the object of the present invention, it is necessary to study how to obtain F number of 2.2 or less and how to remove stray lights, which has not been studied in the prior art and therefore cannot be studied based on the prior art.

Stray lights are defined as below.

(1) Light beam which passes through the window plate and directly reaches the image plane without being reflected by a reflecting mirror (2) Light beam which passes through the window plate and directly reaches the image plane after having been reflected by the first reflecting mirror (3) Light beam which passes through the window plate and reaches the image plane after having been reflected by the first reflecting mirror and then by the second reflecting mirror (4) Light beam which passes through the window plate and reaches the image plane after having been reflected by the first reflecting mirror and then by the third reflecting mirror (5) Light beam which passes through the window plate and reaches the image plane after having been reflected by the second reflecting mirror and then by the third reflecting mirror In optical design there is a basic theory called a ray-tracing method used for correction of aberration which relates directly to performance of the optical element. However, there is no theory for removing stray light. Stray light has to be found and removed according to individual circumstances. Particularly in reflective optical systems, it is difficult to remove stray light. With larger diameter it is more difficult and conditions for larger diameter are further restricted.

By determining a range of length of L1, a range of length of L2 and a range of the negative refractive power of the first reflection surface, an imaging optical system with a large diameter can be obtained, which has a resolution of pixel size (37.5 micrometers or less square) for used wavelength (for example, 7 to 14 micrometers) of a commercially available infrared array sensor (which is not too big as an element and not expensive, consumes small amount of power, and has 360×160 pixels or more), has Fno. of 2.2 or less and generates no stray light even with large diameter.

Optical Axis of Center of Field being Parallel to Optical Axis of Image Plane

Figure 66:
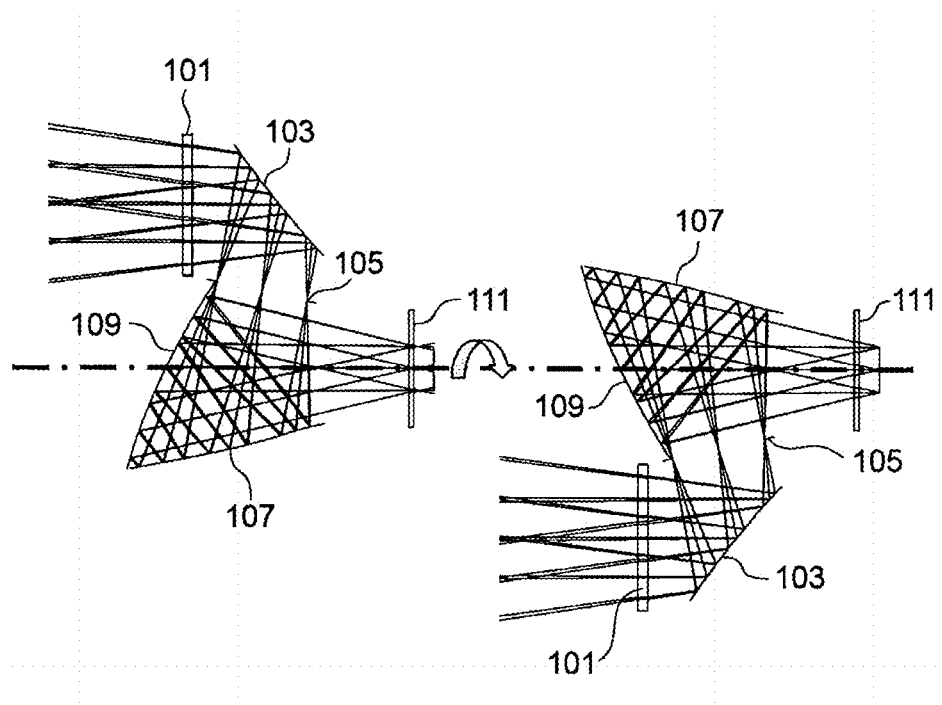
FIG. 66 is a drawing for illustrating function of the imaging optical system in the case that the optical axis of the center of field is parallel to the optical axis passing through the image plane.

FIG. 66 is a drawing for illustrating function of the imaging optical system in the case that the optical axis of the center of field is parallel to the optical axis passing through the image plane. As shown in FIG. 66, the optical axis of the center of field of the imaging optical system is parallel to the optical axis passing through the image plane. Thus, the field range (the angle of field) remains unchanged when the whole imaging optical system is moved in the direction of the optical axis passing through the image plane while being rotated around the optical axis. Accordingly, focusing can be performed by moving the whole imaging optical system in the direction of the optical axis using a rotating mechanism with screw.

Figure 67:
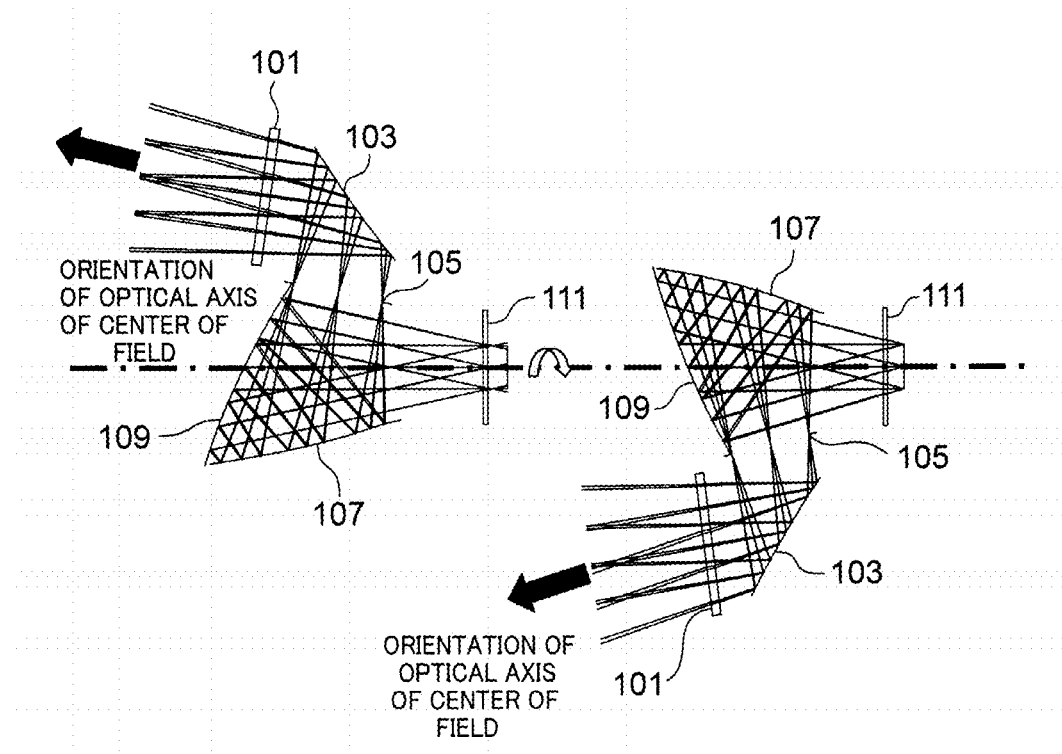
FIG. 67 is a drawing for illustrating function of the imaging optical system in the case that the optical axis of the center of field is not parallel to the optical axis passing through the image plane.
Figure 68:
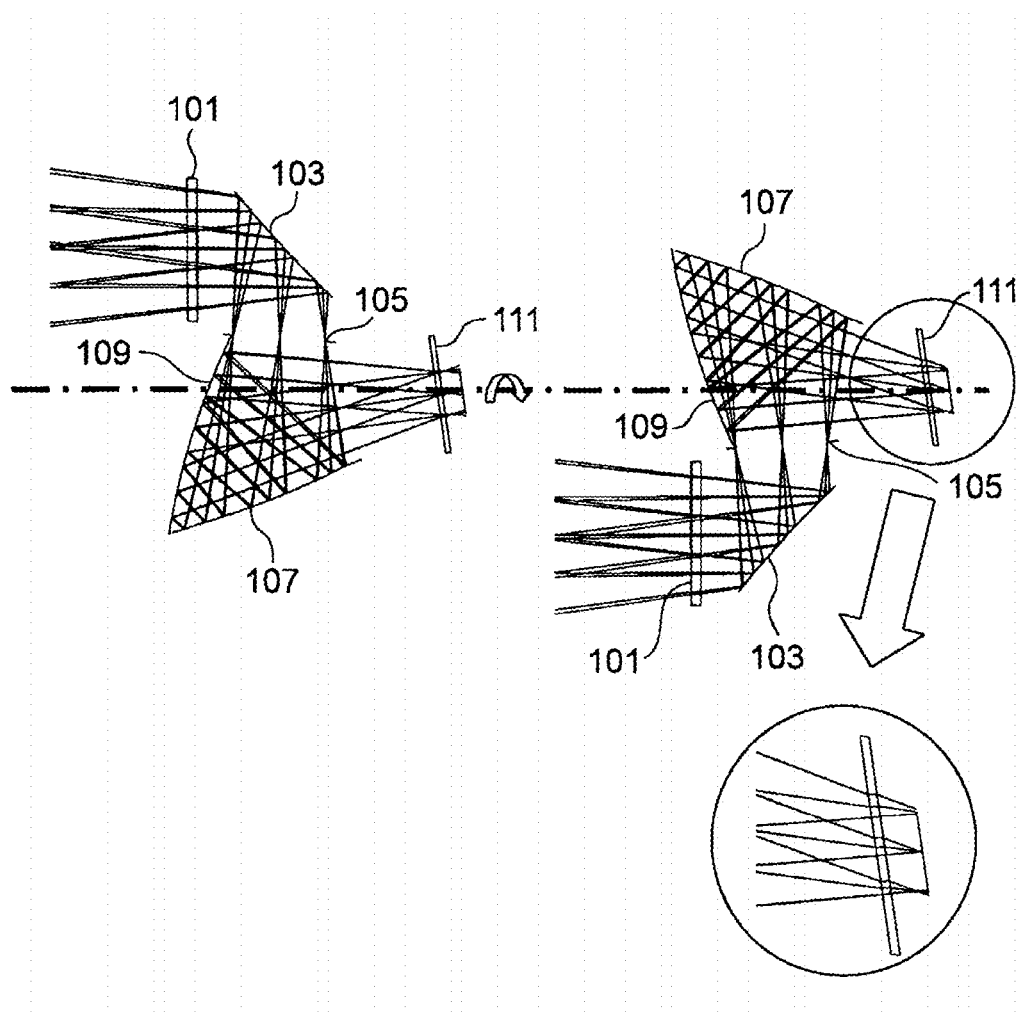
FIG. 68 is a drawing for illustrating function of the imaging optical system in the case that the optical axis of the center of field is not parallel to the optical axis passing through the image plane.

FIG. 67 and FIG. 68 are drawings for illustrating function of the imaging optical system in the case that the optical axis of the center of field is not parallel to the optical axis passing through the image plane. When the optical axis of the center of field of the imaging optical system is not parallel to the optical axis passing through the image plane, the orientation of the optical axis of the center of field will change by rotating the optical system like in the case that the optical axis of the center of field is parallel to the optical axis passing through the image plane (FIG. 67). If rotation is carried out such that the angle of field will remain unchanged, focusing cannot be performed because the focusing position of the upper end of the sensor differs from that of the lower end of the sensor (FIG. 68). Accordingly, focusing cannot be performed by moving the whole imaging optical system in the direction of the optical axis using a rotating mechanism with screw. As a result, a more complicated focusing mechanism is required.

Use of at Least One Rotationally Asymmetric Surface

When at least one of the three reflection surfaces is made rotationally asymmetric, curvature of field and comatic aberration can be reduced.

Use of Rotationally Symmetric Aspherical Surface

Roughness of reflection surfaces in reflective optical systems has to be made as small as a half of that of surfaces of transmission optical systems. Rotationally asymmetric surfaces like free-form surfaces have linear traces because the surfaces have been subjected to linear machining. If the three reflection surfaces are rotationally asymmetric surfaces like free-form surfaces and they are subjected to machining in X direction or in Y direction, orientations of linear traces on two reflecting mirrors are the same with each other. Thus, flare increases in the orientation orthogonal to that of the linear traces of the two reflecting mirrors, resulting in deterioration of resolution. On the other hand, additional costs are required to reduce linear traces. When one of the three reflecting mirrors is made a rotationally symmetric aspherical surface, a lathe can be used for machining the rotationally symmetric aspherical surface and the traces will be rotationally symmetric. As a result, deterioration of resolution can be prevented.

The first and third reflection surfaces should preferably be made rotationally asymmetric while the second reflection surface should preferably be made rotationally symmetric aspherical. The reason is that correction of comatic aberration should be performed on a surface near the aperture stop.

Figure 69:
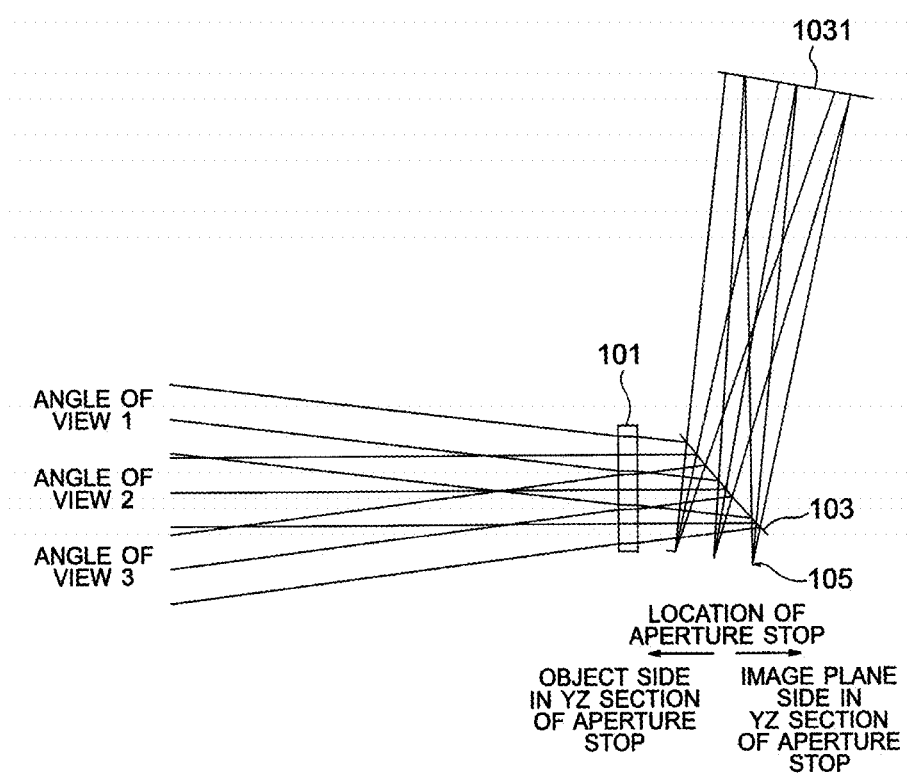
FIG. 69 is a diagram for illustrating optical paths which includes a virtual image plane formed by the first reflection surface for the aperture stop.

Displacement of the Center Position of the Rotationally Symmetric Aspherical Surface FIG. 69 is a diagram for illustrating optical paths which includes a virtual image plane 1031 formed by the first reflection surface 103 for the aperture stop 105. As shown in FIG. 69, comatic aberration is generated such that optical path becomes shorter toward the image plane side in YZ section of the aperture stop 105.

Then, the center position of rotationally a symmetric aspherical surface (concave surface) is displaced toward the image plane side in YZ section from the intersection of the path of the light beam traveling along the optical axis of the center of field (referred to the central light beam hereinafter) and the aspherical surface when the rotationally symmetric aspherical surface is set as the second reflecting surface. As a result, optical path on the image plane side in YZ section is made longer and therefore the aberration described above can be reduced.

Figure 70:
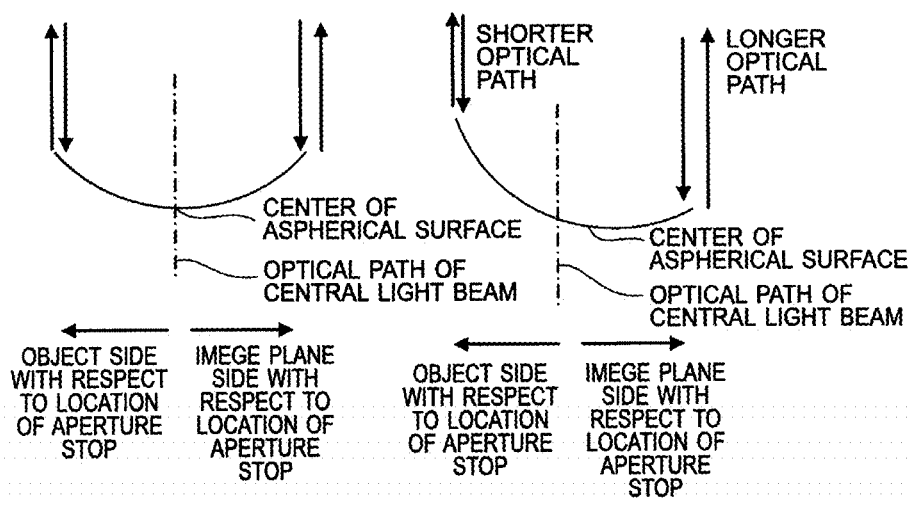
FIG. 70 is a drawing showing a relationship between the center of the aspherical surface and the central light beam.

FIG. 70 is a drawing showing a relationship between the center of the aspherical surface and the central light beam.

Further, the reason that the second reflection surface is made a rotationally symmetric aspherical surface is below. Correction of comatic aberration should preferably be performed on a surface near the aperture stop. In embodiments according to the present invention, the aperture stop is located on the second reflection surface or between the first reflection surface and the second reflection surface. An angle between the optical axis passing through the first reflection surface and the reference plane of the first reflection surface is large and a remarkable reduction of the comatic aberration cannot be expected. Accordingly, as a surface near the aperture stop besides the first reflection surface, the second reflection surface is made rotationally symmetric aspherical and the center position is displaced.

As described later, using a mechanism for intentionally displacing the second reflection surface, undesirable displacement of the first to the third reflecting mirrors can be compensated.

Rectangular Aperture Stop

A rectangular aperture stop is compared with a circular aperture stop brightness of which is the same as that of the former. For example, an aperture ratio in directions of sides of a square orthogonal to each other can be made smaller than that of the circular aperture stop. If the aperture ratio can be made smaller, a tolerance in manufacturing can be made larger. The imaging optical system according to the invention is used mainly for imaging elements, light receiving portions of which are rectangular. Accordingly, it is very important to maintain resolutions in directions of sides of the rectangle orthogonal to each other.

Figure 71:
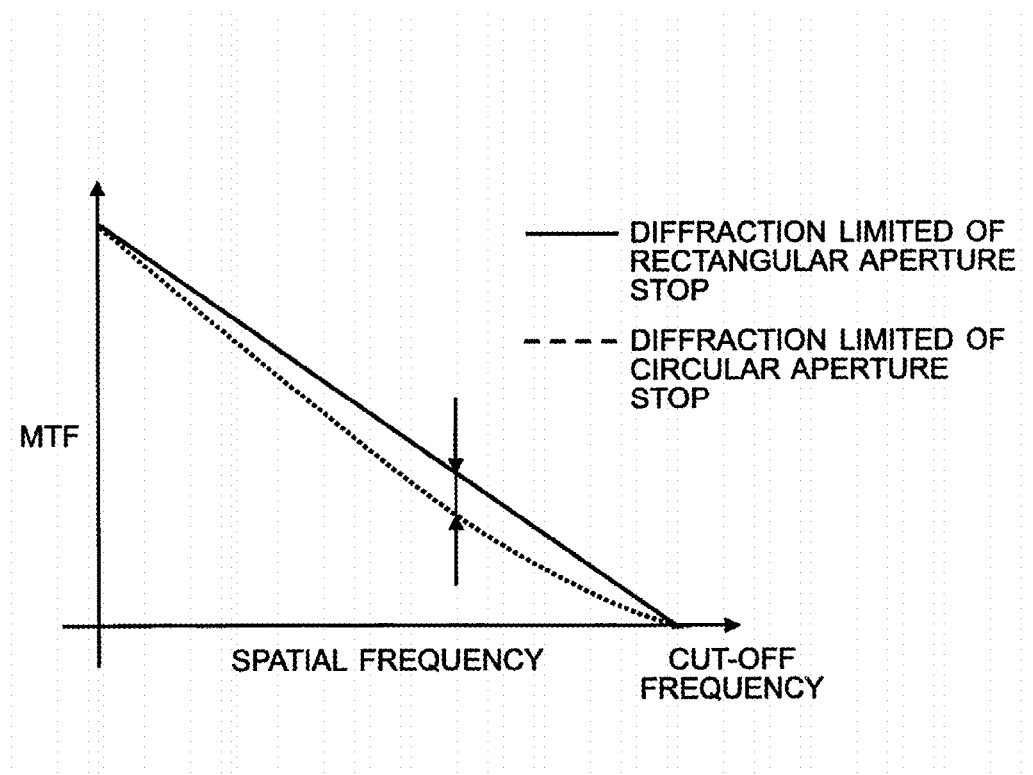
FIG. 71 is a drawing showing relationship between space frequency and MTF (contrast reproducibility) of a square aperture stop and a circular aperture stop.

FIG. 71 is a drawing showing relationship between space frequency and MTF (Modulation Transfer Function, contrast reproducibility) of a square aperture stop and a circular aperture stop having a diameter of length equal to that of a side of the square. MTF of the circular aperture stop is lower than that of the square aperture stop at frequencies lower than the cut-off frequency. Diffraction limited of the circular aperture stop is represented as below when wavelength is represented as $\lambda$, F-number is represented as Fno and space frequency is represented as fre.

$$2/\pi \times (\cos^{-1}(\lambda \times fre \times Fno) - \lambda \times fre \times Fno \times (1-(\lambda \times fre \times Fno)^2)^{1/2})$$

Diffraction limited of the square aperture stop is represented as below when the cut-off frequency is represented as fre0.

$$1-1/fre0$$

FEATURES OF EXAMPLES

Examples 1 to 16 according to the present invention will be described below.

Tables 1 to 4 show features of Examples 1 to 4.

TABLE 1

| Item | | Unit | Example 1 | Example 2 | Example 3 |
|---|---|---|---|---|---|
| Sensor size (full width) | horizontal | (mm) | 12 | ← | ← |
| | vertical | (mm) | 9 | ← | ← |
| | diagonal | (mm) | 15 | ← | ← |
| Angle of view (half width) | horizontal | (deg) | 10.05 | 9.99 | 9.99 |
| | vertical | (deg) | 7.55 | 7.47 | 7.55 |
| Optical distortion | Rad | (%) | <|3.41| | <|4.08| | <|6.16| |
| | Tan | (%) | <|3.27| | <|6.16| | <|6.74| |
| Equivalent Fno. | | | 2 | 3 | 2.2 |
| Fno. | | | 2 | 3 | 2.2 |
| Aperture stop diameter | | (mm) | φ19 | φ13.8 | φ19 |
| XZ focal length | | (mm) | 35.5 | 35.5 | 35.5 |
| YZ focal length | | (mm) | 35.6 | 35.6 | 35.6 |
| fx1 | | (mm) | 119.2 | 56.2 | 77.0 |
| fy1 | | (mm) | 237 | 118.6 | 103.0 |
| fx1' | | (mm) | — | — | — |
| fy1' | | (mm) | — | — | — |
| L1 | | (mm) | 47 | 45.9 | 51 |
| L2 | | (mm) | 18 | 18.8 | 21 |
| L3 (BF) | | (mm) | 33.1 | 58.5 | 52.1 |
| Relative illumination | | (%) | 97.4 | 93.3 | 98.6 |
| Optical layout dimension X × Y × Z | | (mm) | 35 × 64 × 45 | 37 × 65 × 62 | 44 × 69 × 61 |

TABLE 2

| Item | | Unit | Example 4 | Example 5 | Example 6 | Example 7 infrared | visible |
|---|---|---|---|---|---|---|---|
| Sensor size | horizontal | (mm) | 8 | ← | ← | ← | ← |
| (full width) | vertical | (mm) | 6 | ← | ← | ← | ← |
| | diagonal | (mm) | 10 | ← | ← | ← | ← |
| Angle of | horizontal | (deg) | 9.6 | 9.64 | 9.61 | 9.61 | ← |
| view (half width) | vertical | (deg) | 7.2 | 7.26 | 7.19 | 7.21 | ← |
| Optical | Rad | (%) | <|5.2| | <|2.75| | <|2.75| | <|7.57| | ← |
| distortion | Tan | (%) | <|7.31| | <|0.84| | <|0.84| | <|7.3| | ← |
| Equivalent Fno. | | — | 1.26 | 1.45 | 1.45 | 1.47 | |
| Fno. | | | 1.77 | 1.97 | 1.91 | 2.0 | |
| Aperture stop diameter | | (mm) | □16 × 25 | □18 × 26 | □18 × 24.5 | □16 × 24 | |
| XZ focal length | | (mm) | 24.0 | 24.0 | 23.9 | 24.0 | |
| YZ focal length | | (mm) | 24.1 | 23.8 | 23.9 | 24.1 | |
| fx1 | | (mm) | 62.7 | −312.6 | −509.0 | 35.3 | ← |
| fy1 | | (mm) | 104.7 | 517.5 | 510.4 | 50.2 | ← |
| fx1' | | (mm) | — | 94.7 | 87.9 | — | ← |
| fy1' | | (mm) | — | 58.7 | 61.9 | — | ← |
| L1 | | (mm) | 49 | 43.5 | 43.5 | 49 | ← |
| L2 | | (mm) | 21.5 | 18.5 | 18.5 | 22 | ← |
| L3 (BF) | | (mm) | 35.9 | 35.9 | 35.9 | 53.9 | 53.7 |
| Relative illumination | | (%) | 89.7 | 90.2 | 90.8 | 72.8 | 88.4 |
| Optical layout dimension X × Y × Z | | (mm) | 51 × 65 × 42 | 41 × 57 × 42 | 40 × 57 × 42 | 58 × 66 × 80 | |

TABLE 3

| Item | | Unit | Example 8 | Example 9 | Example 10 | Example 11 | Example 12 |
|---|---|---|---|---|---|---|---|
| Sensor size | horizontal | (mm) | 8 | 12 | 12 | 8 | 8 |
| (full width) | vertical | (mm) | 6 | 9 | 9 | 6 | 6 |
| | diagonal | (mm) | 10 | 15 | 15 | 10 | 10 |
| Angle of | horizontal | (deg) | 12 | 8 | 14 | 12 | 18 |
| view (half width) | vertical | (deg) | 9 | 6 | 10.5 | 9 | 13.5 |
| Optical | Rad | (%) | <|6.49| | <|4.39| | <|9.79| | <|8.93| | <|14.21| |
| distortion | Tan | (%) | <|8.88| | <|6.34| | <|9.64| | <|10.69| | <|15.19| |
| Equivalent Fno. | | — | 2.15 | 1.53 | 2.12 | 1.14 | 1.5 |
| Fno. | | | 2.5 | 1.9 | 2.5 | 1.48 | 2.08 |
| Aperture stop diameter | | (mm) | □9.4 × 10 | □29 × 35 | □12 × 13 | □26 × 35 | □13.6 × 22 |
| XZ focal length | | (mm) | 24.1 | 35.8 | 36.4 | 24.3 | 24.7 |
| YZ focal length | | (mm) | 24.4 | 36.0 | 36.7 | 24.6 | 25.2 |
| fx1 | | (mm) | 33.9 | 156 | 60.2 | 42.5 | 20.7 |
| fy1 | | (mm) | 50.2 | 128.9 | 108.6 | 83.4 | 76.5 |
| fx1' | | (mm) | — | — | — | — | — |
| fy1' | | (mm) | — | — | — | — | — |
| L1 | | (mm) | 27.5 | 85 | 47 | 50 | 40 |
| L2 | | (mm) | 13.5 | 29 | 21 | 21.5 | 20 |
| L3 (BF) | | (mm) | 33.4 | 57.1 | 40.1 | 38.9 | 38.4 |
| Relative illumination | | (%) | 87 | 95 | 83.3 | 87 | 88.4 |
| Optical layout dimension X × Y × Z | | (mm) | 25 × 37 × 39 | 57 × 105 × 66 | 38 × 62 × 45 | 34 × 68 × 43 | 35 × 68 × 44 |

TABLE 4

| Item | | Unit | Example 13 | Example 14 | Example 15 | Example 16 |
|---|---|---|---|---|---|---|
| Sensor size | horizontal | (mm) | 8 | 8 | 8 | 12 |
| (full width) | vertical | (mm) | 6 | 6 | 6 | 9 |
| | diagonal | (mm) | 10 | 10 | 10 | 15 |
| Angle of | horizontal | (deg) | 9.6 | 9.6 | 9.6 | 9.6 |
| view (half width) | vertical | (deg) | 7.23 | 7.2 | 7.2 | 7.2 |
| Optical | Rad | (%) | <|6.86| | <|4.36| | <|7.96| | <|5.26| |
| distortion | Tan | (%) | <|5.98| | <|6.93| | <|7.18| | <|5.3| |

TABLE 4-continued

| Item | Unit | Example 13 | Example 14 | Example 15 | Example 16 |
|---|---|---|---|---|---|
| Equivalent Fno. | — | 1.3 | 1.3 | 1.3 | 2.2 |
| Fno. | | 1.83 | 1.77 | 1.77 | 2.5 |
| Aperture stop diameter | (mm) | □14.6 × 22.8 | □15.8 × 23 | □16 × 23.2 | □19.4 × 17.8 |
| XZ focal length | (mm) | 23.9 | 23.9 | 24 | 35.6 |
| YZ focal length | (mm) | 24.0 | 23.6 | 24 | 35.6 |
| fx1 | (mm) | 76.1 | 114.7 | 106.3 | 187.6 |
| fy1 | (mm) | 309.2 | 114.7 | 89.2 | 250.0 |
| fx1' | (mm) | — | — | — | — |
| fy1' | (mm) | — | — | — | — |
| L1 | (mm) | 41.5 | 49 | 45 | 49 |
| L2 | (mm) | 18.5 | 21.5 | 20.5 | 21.5 |
| L3 (BF) | (mm) | 32.9 | 38.9 | 35.4 | 37.9 |
| Relative illumination | (%) | 88 | 89 | 89 | 79 |
| Optical layout dimension X × Y × Z | (mm) | 40 × 58 × 36 | 43 × 64 × 45 | 43 × 61 × 40 | 35 × 65 × 42 |

Figure 77:
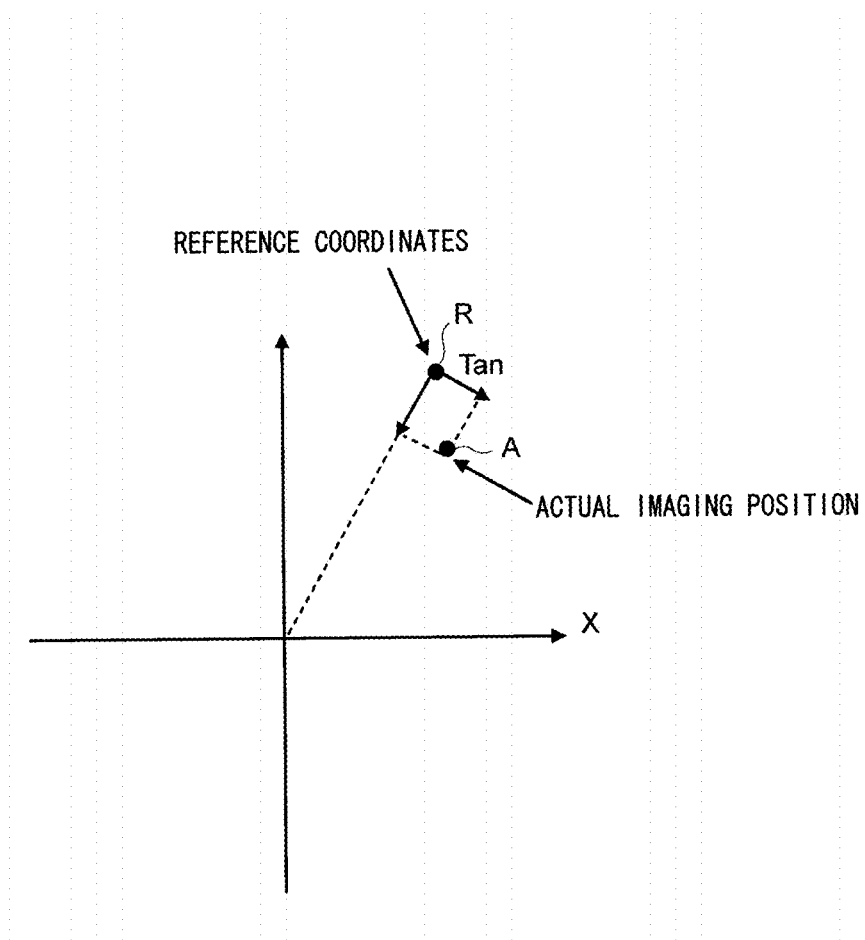
FIG. 77 is a drawing for illustrating optical distortion.

In Tables 1 to 4, the optical distortion is an amount of displacement of the imaging position relative to the reference coordinates, i.e., an amount of distortion aberration. Rad and Tan are determined as shown in FIG. 77. Equivalent F-number is F-number determined by the diameter of a circular aperture stop which has the same area of the aperture stop. In Examples 1 to 3, the aperture stops are circular and therefore the equivalent F-numbers are equal to the F-numbers.

XZ focal length is a parameter which represents a scale of the whole optical system in XZ section while YZ focal length is a parameter which represents a scale of the whole optical system in YZ section.

The focal length in XZ section fx1 of the first reflection surface is repre The focal length in XZ section fx1 of the first reflection surface is represented as below using coefficient C4 of $X^2$ term of the equation shown below, which represents the shape of the reflection surface.

$fx1 = (1/4)/C4$

The focal length in YZ section fy1 of the first reflection surface is represented as below using coefficient C6 of $Y^2$ term of the equation shown below, which represents the shape of the reflection surface.

$fy1 = (1/4)/C6$

As described above, L1, L2 and L3 are respectively a distance between the first reflection surface and the second reflection surface, a distance between the second reflection surface and the third reflection surface and a distance between the third reflection surface and the image plane along the path of the beam traveling along the optical axis at the center of the field of view.

The relative illumination is a ratio of the smallest quantity of light of beams at a location other than the center of the field of view, that pass through the aperture stop and collect on the image plane to the quality of light of beams at the center of the field of view, that pass through the aperture stop and collect on the image plane. The optical layout dimensions are dimensions of the area required by beams passing through the optical effective regions of the respective surfaces from the reflection surface of the first reflecting mirror to the image plane and the aperture stop and collecting on the respective points on the image plane.

In examples 1 to 3, the aperture stops are circular. In Examples 4 to 16, the aperture stops are of rectangle having a side perpendicular to the optical axis in YZ section and a side perpendicular to the YZ section. In Tables 2 to 4, the first term of "aperture stop diameter" item represents length of the side perpendicular to the optical axis in YZ section while the second term represents length of the side perpendicular to the YZ section.

In YZ section of the rectangular aperture stop, a length of the side perpendicular to the optical axis is determined such that stray light may hardly pass thorough the aperture stop, layout is feasible and deterioration of spot due to diffraction limited may not be generated. A length of the side perpendicular to YZ plane is determined such that a target F-number can be realized.

When a rectangular aperture stop is used and sizes of the rectangular aperture stop are determined as described above, F-number can be reduced while preventing stray light.

Table 5 shows values of the following terms described above. In the terms, F-number represents equivalent F-number. Further, as described above, L represents a distance between the first reflection surface and the image plane along the path of the beam traveling along the optical axis at the center of the field of view.

| | |
|---|---|
| Fno × (12/13) | Term (1) |
| fx1/L3 | Term (2) |
| fx1'/L3 | Term (3) |
| fy1/L3 | Term (4) |
| fy1'/L3 | Term (5) |
| L1/L | Term (6) |

TABLE 5

| | Term (1) | Term (2) | Term (3) | Term (4) | Term (5) | Term (6) |
|---|---|---|---|---|---|---|
| Example 1 | 1.09 | 3.6 | — | 7.2 | — | 0.48 |
| Example 2 | 0.96 | 1.0 | — | 2.0 | — | 0.37 |
| Example 3 | 0.89 | 1.5 | — | 2.0 | — | 0.41 |
| Example 4 | 0.75 | 1.7 | — | 2.9 | — | 0.46 |
| Example 5 | 0.75 | −8.7 | 2.6 | 14.4 | 1.6 | 0.44 |
| Example 6 | 0.75 | −14.2 | 2.4 | 14.2 | 1.7 | 0.44 |
| Example 7 | 0.60 | 0.7 | — | 0.9 | — | 0.39 |
| Example 8 | 0.87 | 1.0 | — | 1.5 | — | 0.37 |
| Example 9 | 0.78 | 2.7 | — | 2.3 | — | 0.50 |
| Example 10 | 1.12 | 1.5 | — | 2.7 | — | 0.44 |
| Example 11 | 0.64 | 1.1 | — | 2.1 | — | 0.45 |
| Example 12 | 0.78 | 0.5 | — | 2.0 | — | 0.41 |
| Example 13 | 0.73 | 2.3 | — | 9.4 | — | 0.45 |
| Example 14 | 0.72 | 2.9 | — | 2.9 | — | 0.45 |
| Example 15 | 0.75 | 3.0 | — | 2.5 | — | 0.45 |
| Example 16 | 1.25 | 4.9 | — | 6.6 | — | 0.45 |

In the tables below, an origin point position is a position of the origin point of local coordinates of each surface, with reference to the origin point O in FIGS. 1 and 2A unless otherwise defined. The position of the origin point of local coordinates of each surface is the intersection between the beam traveling along the optical axis at the center of the field of view and the surface unless otherwise defined. The rotation angle is a rotation angle around X-axis of local coordinates and a counterclockwise angle with reference to the coordinate system in FIGS. 1 and 2A in YZ section.

Example 1

Table 6 shows specifications of an imaging optical system of Example 1.

TABLE 6

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 2 | 0 | 1 | flat surface |
| Surface 3 | First reflection surface | 0 | 0 | 20 | 49 | 1 | XY polynomial surface |
| Stop surface | Aperture stop | 0 | −19.805 | 22.783 | 90 | 1 | flat surface |
| Surface 5 | Second reflection surface | 0 | −46.543 | 26.541 | 72 | 1 | XY polynomial surface |
| Surface 6 | Third reflection surface | 0 | −33.594 | 39.045 | 23 | 1 | XY polynomial surface |
| Surface 7 | Window plate | 0 | −33.594 | 11.045 | 0 | 4.003 | flat surface |
| Surface 8 | Window plate | 0 | −33.594 | 10.045 | 0 | 1 | flat surface |
| Image plane | Image plane | 0 | −33.594 | 5.945 | 0 | 1 | flat surface |

Table 7 shows coefficients that determine the shapes of the first to third reflection surfaces.

TABLE 7

| | Surface 3 | Surface 5 | Surface 6 |
|---|---|---|---|
| $X^2$ | 2.10E−03 | 5.15E−03 | −3.27E−03 |
| $Y^2$ | 1.05E−03 | 4.58E−03 | −2.20E−03 |
| $X^2Y$ | −6.10E−06 | −3.05E−05 | −6.85E−05 |
| $Y^3$ | −1.44E−06 | −2.49E−05 | −5.53E−05 |
| $X^4$ | 7.85E−07 | 1.38E−07 | −7.39E−08 |
| $X^2Y^2$ | 1.03E−06 | 1.30E−06 | 1.26E−06 |
| $Y^4$ | 2.22E−07 | 8.04E−07 | 5.37E−07 |
| $X^4Y$ | −1.38E−08 | −9.92E−09 | −2.20E−08 |
| $X^2Y^3$ | −2.12E−08 | −4.13E−08 | −5.23E−08 |
| $Y^5$ | −2.90E−09 | −2.59E−08 | −3.04E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 7, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 3:
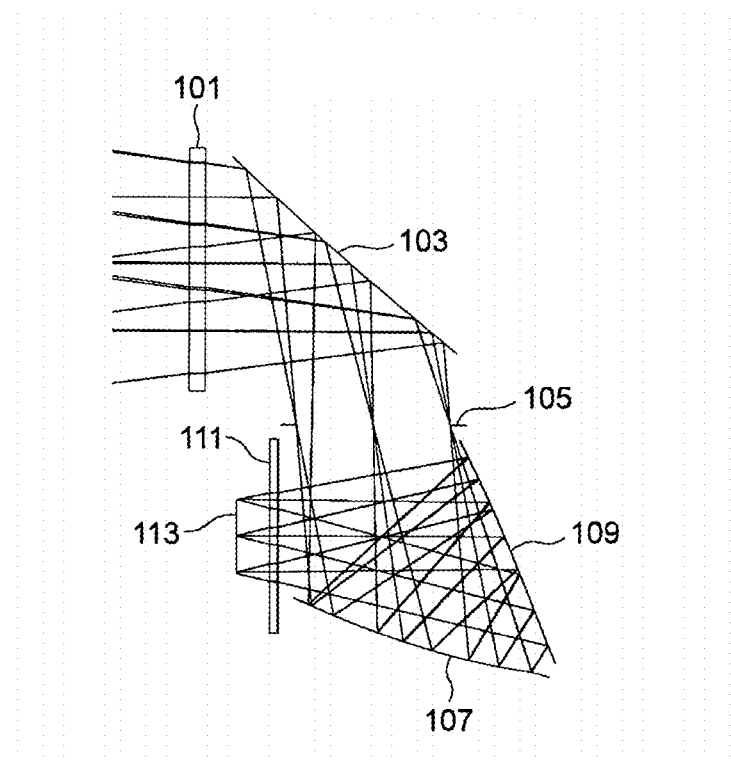
FIG. 3 is a YZ sectional view of the imaging optical system of Example 1.

FIG. 3 is a YZ sectional view of the imaging optical system of Example 1. In Example 1, the optical axis at the center of the field of view and the optical axis of the image plane are in parallel to each other but opposite in orientation.

Figure 4:
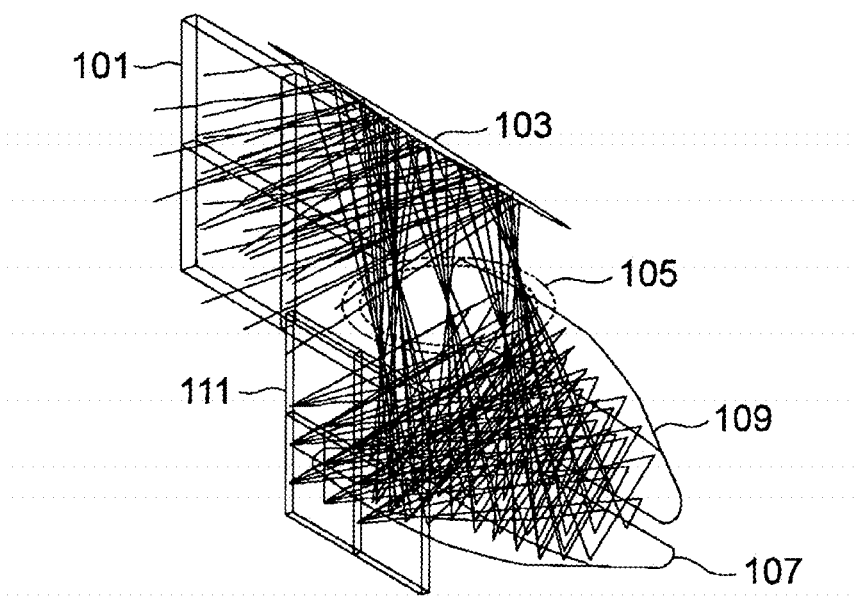
FIG. 4 shows a configuration of the imaging optical system of Example 1.

FIG. 4 shows a configuration of the imaging optical system of Example 1.

FIG. 5 shows distortion aberration of the imaging optical system of Example 1. The dashed line shows the reference lattice.

Figure 6:
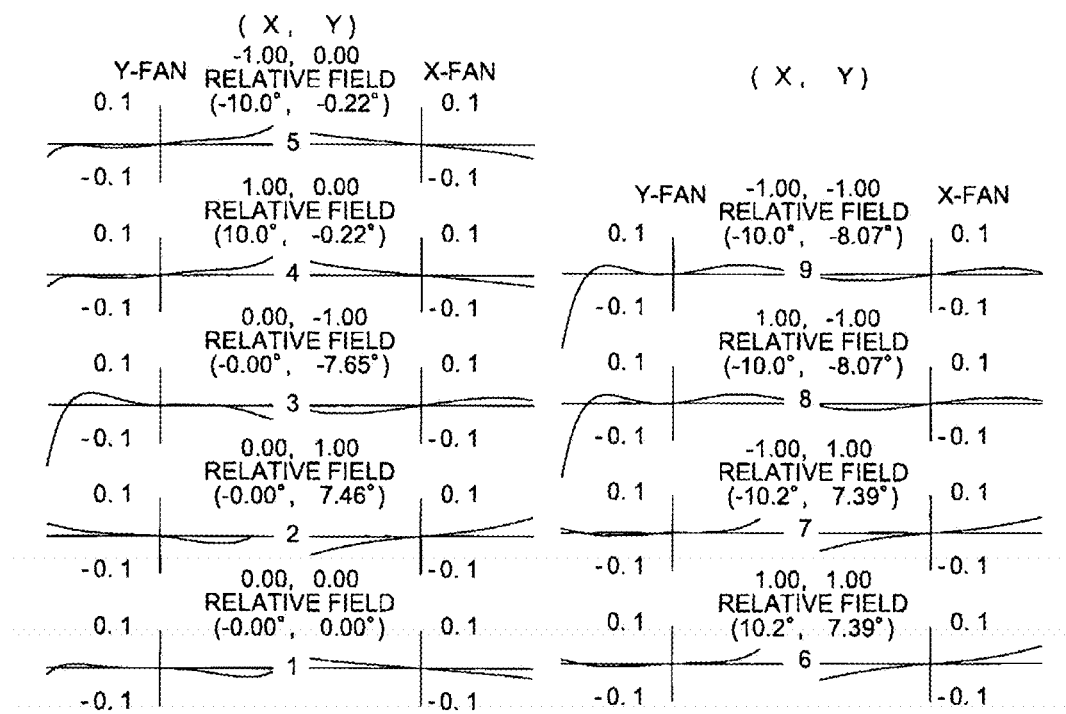
FIG. 6 shows transverse aberration of the imaging optical system of Example 1.

FIG. 6 shows transverse aberration of the imaging optical system of Example 1. FIG. 6 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 7B). In FIG. 6, (X,Y) show the positions on the image plane where transverse aberration is observed. That is, FIG. 6 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 2

Table 8 shows specifications of an imaging optical system of Example 2.

TABLE 8

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object Surface | 0 | 0 | infinity | 0 | 1 | flat surface |
| Surface 1 | Window Plate | 0 | 0 | 0 | 0 | 4.003 | flat surface |
| Surface 2 | Window Plate | 0 | 0 | 2 | 0 | 1 | flat surface |
| Surface 3 | First reflection surface | 0 | −3.186 | 20.570 | 39.636 | 1 | XY polynomial surface |
| Stop surface | Aperture Stop | 0 | −17.825 | 17.495 | 82.000 | 1 | flat surface |
| Surface 5 | Second Reflection surface | 0 | −45.766 | 21.469 | 104.381 | 1 | XY polynomial surface |
| Surface 6 | Third Reflection surface | 0 | −33.312 | 0.431 | 153.081 | 1 | XY polynomial surface |
| Surface 7 | Window plate | 0 | −32.763 | 54.067 | 0.000 | 4.003 | flat surface |
| Surface 8 | Window plate | 0 | −32.763 | 55.067 | 0.000 | 1 | flat surface |
| Image plane | Image plane | 0 | −32.763 | 59.167 | 0.000 | 1 | flat surface |

Table 9 shows coefficients that determine the shapes of the first to third reflection surfaces.

TABLE 9

| | Surface 3 | Surface 5 | Surface 6 |
|---|---|---|---|
| $X^2$ | 4.45E−03 | 2.30E−03 | −5.22E−03 |
| $Y^2$ | 2.11E−03 | 3.55E−03 | −5.17E−03 |
| $X^2Y$ | −1.09E−05 | −2.49E−05 | −9.28E−06 |
| $Y^3$ | −3.99E−05 | −1.37E−04 | −6.14E−05 |
| $X^4$ | 1.15E−06 | −2.11E−07 | −2.51E−07 |
| $X^2Y^2$ | 1.45E−06 | −3.47E−07 | −1.21E−06 |
| $Y^4$ | 1.05E−06 | 3.77E−06 | −1.58E−06 |
| $X^4Y$ | 3.28E−09 | 0.00E+00 | 2.60E−08 |
| $X^2Y^3$ | −4.25E−08 | −5.27E−08 | −3.10E−08 |
| $Y^5$ | −2.47E−08 | −1.39E−07 | −5.61E−08 |
| $Y^6$ | 0.00E+00 | 0.00E+00 | −1.17E−09 |
| $X^6Y$ | 0.00E+00 | 0.00E+00 | −1.54E−10 |
| $X^2Y^6$ | 0.00E+00 | 0.00E+00 | −3.51E−12 |
| $X^8Y$ | 0.00E+00 | 0.00E+00 | 2.88E−13 |
| $Y^9$ | 0.00E+00 | 0.00E+00 | −2.24E−13 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 9, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 7:
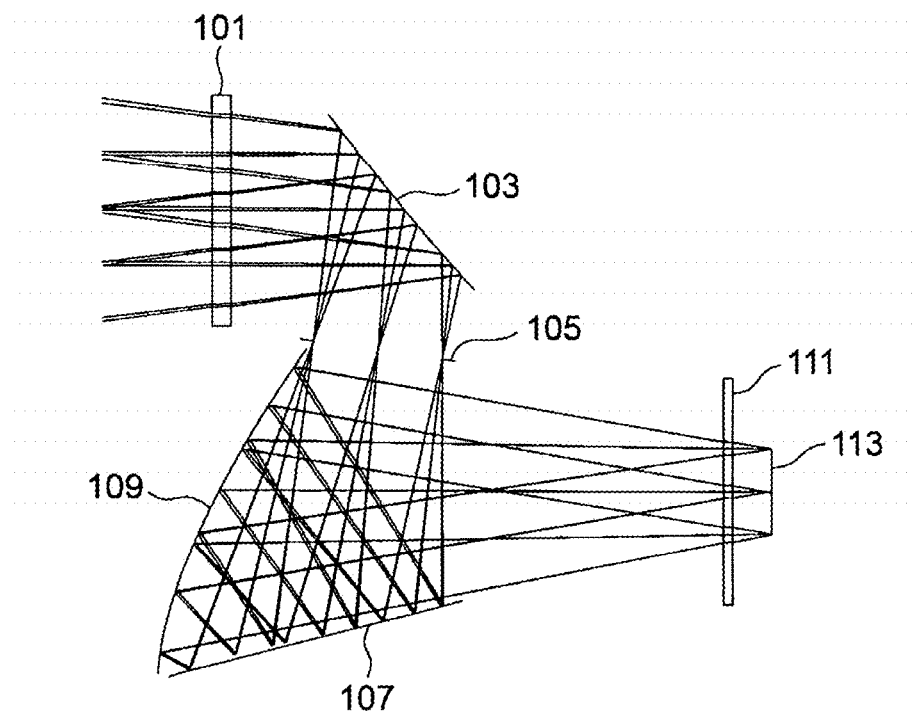
FIG. 7 is a YZ sectional view of the imaging optical system of Example 2.

FIG. 7 is a YZ sectional view of the imaging optical system of Example 2. In Example 2, the optical axis at the center of the field of view and the optical axis of the image plane are in parallel to each other and in the same orientation.

Figure 8:
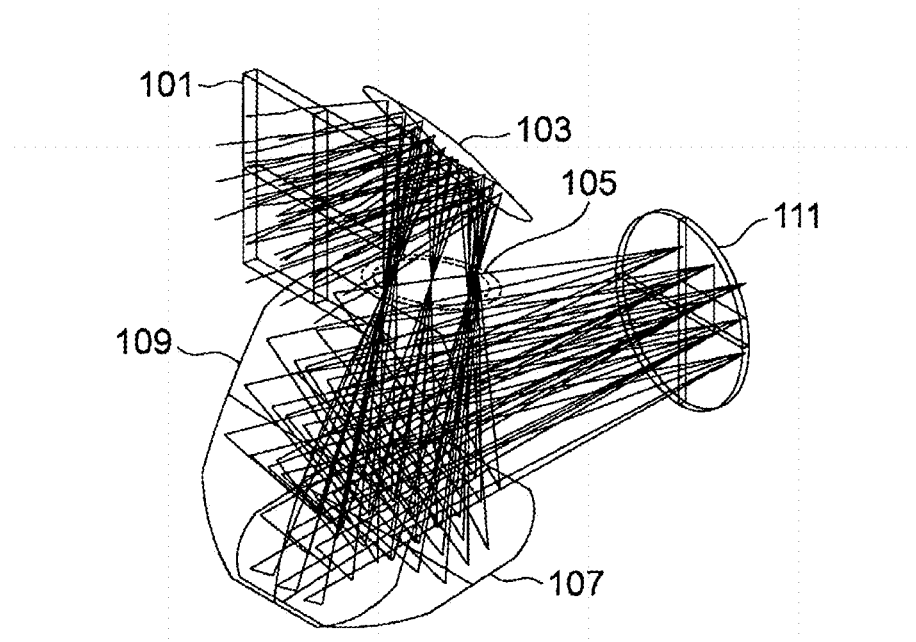
FIG. 8 shows a configuration of the imaging optical system of Example 2.

FIG. 8 shows a configuration of the imaging optical system of Example 2.

Figure 9:
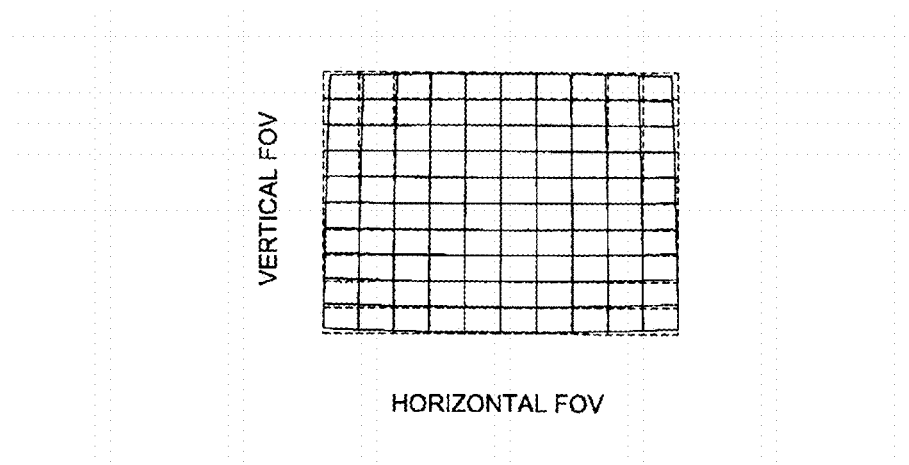
FIG. 9 shows distortion aberration of the imaging optical system of Example 2.

FIG. 9 shows distortion aberration of the imaging optical system of Example 2. The dashed line shows the reference lattice.

Figure 10:
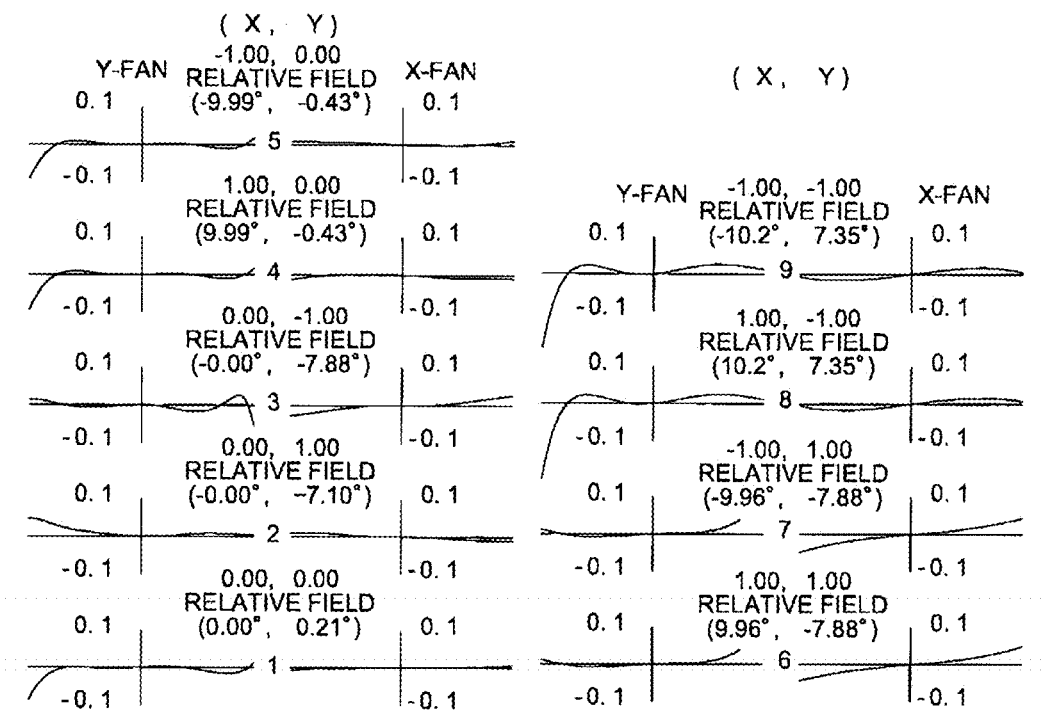
FIG. 10 shows transverse aberration of the imaging optical system of Example 2.
Figure 78:
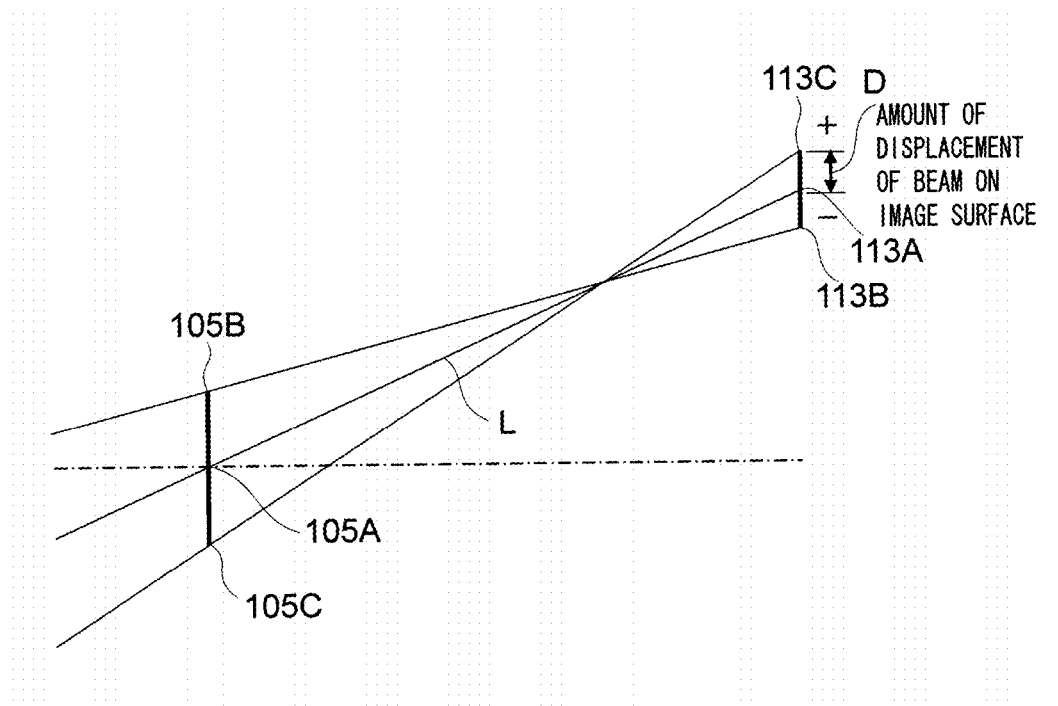
FIG. 78 is a drawing for illustrating transverse aberration.

FIG. 10 shows transverse aberration of the imaging optical system of Example 1. FIG. 10 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 10, (X,Y) show the positions on the image plane where transverse aberration is observed. That is, FIG. 10 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 3

Table 10 shows specifications of an imaging optical system of Example 3.

TABLE 10

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 2 | 0 | 1 | flat surface |
| Surface 3 | First reflection surface | 0 | 0.000 | 20.000 | 39.000 | 1 | XY polynomial surface |
| Stop surface | Aperture stop | 0 | −17.607 | 16.258 | 78.000 | 1 | Flat surface |
| Surface 5 | Second reflection surface | 0 | −49.886 | 9.397 | 103.000 | 1 | XY polynomial surface |
| Surface 6 | Third reflection surface | 0 | −33.337 | −3.532 | 154.000 | 1 | XY polynomial surface |
| Surface 7 | Window plate | 0 | −33.337 | 30.468 | 0.000 | 4.003 | flat surface |
| Surface 8 | Window plate | 0 | −33.337 | 43.468 | 0.000 | 1 | flat surface |
| Image plane | Image plane | 0 | −33.337 | 44.468 | 0.000 | 1 | flat surface |

Table 11 shows coefficients that determine the shapes of the first to third reflection surfaces.

TABLE 11

|  | Surface 3 | Surface 5 | Surface 6 |
|---|---|---|---|
| $X^2$ | 3.25E−03 | 2.11E−03 | −5.14E−03 |
| $Y^2$ | 2.43E−03 | 2.67E−03 | −3.36E−03 |
| $X^2Y$ | 5.12E−06 | −3.60E−06 | 1.97E−05 |
| $Y^3$ | −2.31E−05 | −3.39E−05 | −9.79E−06 |
| $X^4$ | 6.85E−07 | −1.16E−07 | −2.54E−07 |
| $X^2Y^2$ | 1.06E−06 | −3.72E−07 | −5.50E−07 |
| $Y^4$ | 6.22E−07 | −5.14E−07 | −5.92E−07 |
| $X^4Y$ | 3.64E−09 | 1.05E−09 | 2.03E−09 |
| $X^2Y^3$ | −7.70E−09 | −4.35E−09 | 8.36E−10 |
| $Y^5$ | −8.91E−09 | −2.21E−08 | −1.81E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 11, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 11:
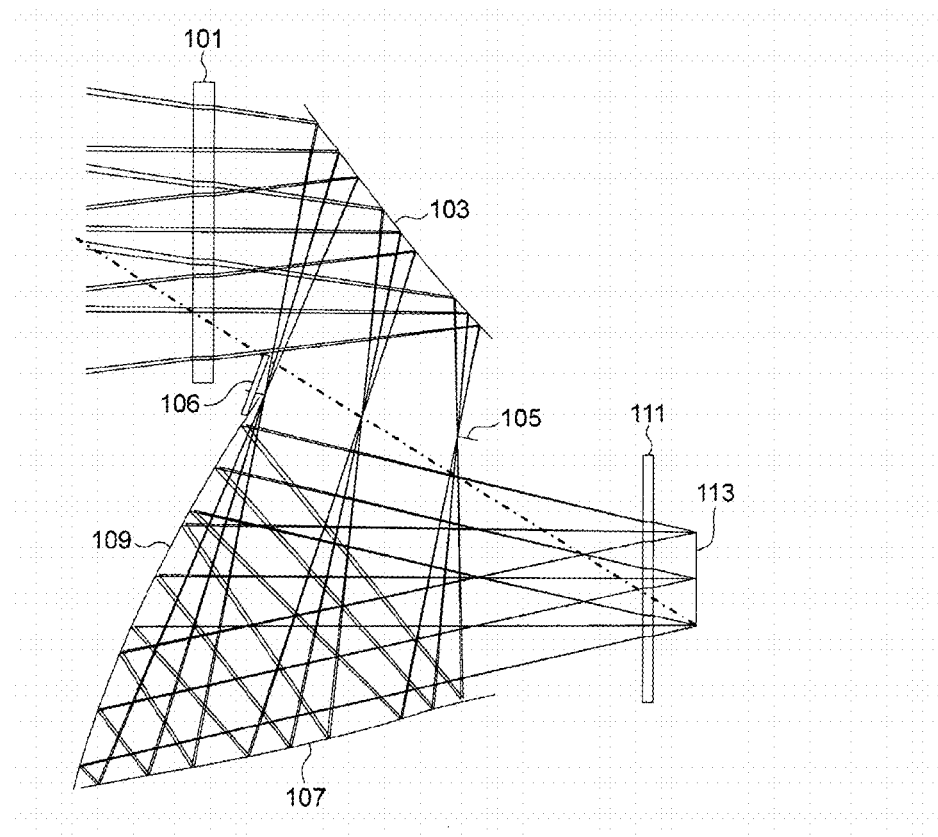
FIG. 11 is a YZ sectional view of the imaging optical system of Example 3.

FIG. 11 is a YZ sectional view of the imaging optical system of Example 3. In Example 3, the optical axis at the center of the field of view and the optical axis of the image plane are in parallel to each other and in the same orientation.

In Example 3, a light shielding plate 106 for blocking light traveling from the object side directly to the image plane. A space for the light shielding plate 106 is ensured by the aperture 105.

Figure 12:
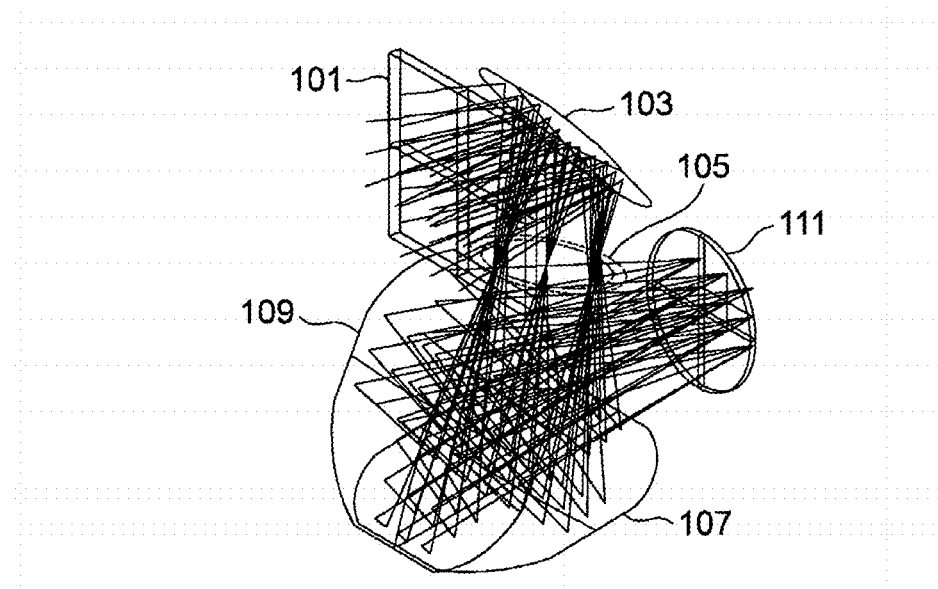
FIG. 12 shows a configuration of the imaging optical system of Example 3.

FIG. 12 shows a configuration of the imaging optical system of Example 3.

Figure 13:
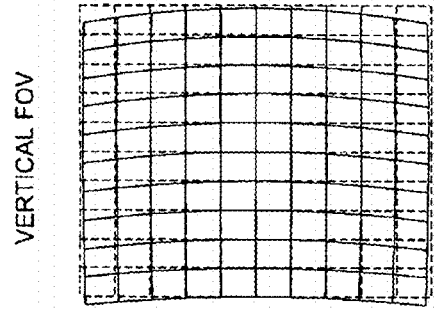
FIG. 13 shows distortion aberration of the imaging optical system of Example 3.

FIG. 13 shows distortion aberration of the imaging optical system of Example 13. The dashed line shows the reference lattice.

Figure 14:
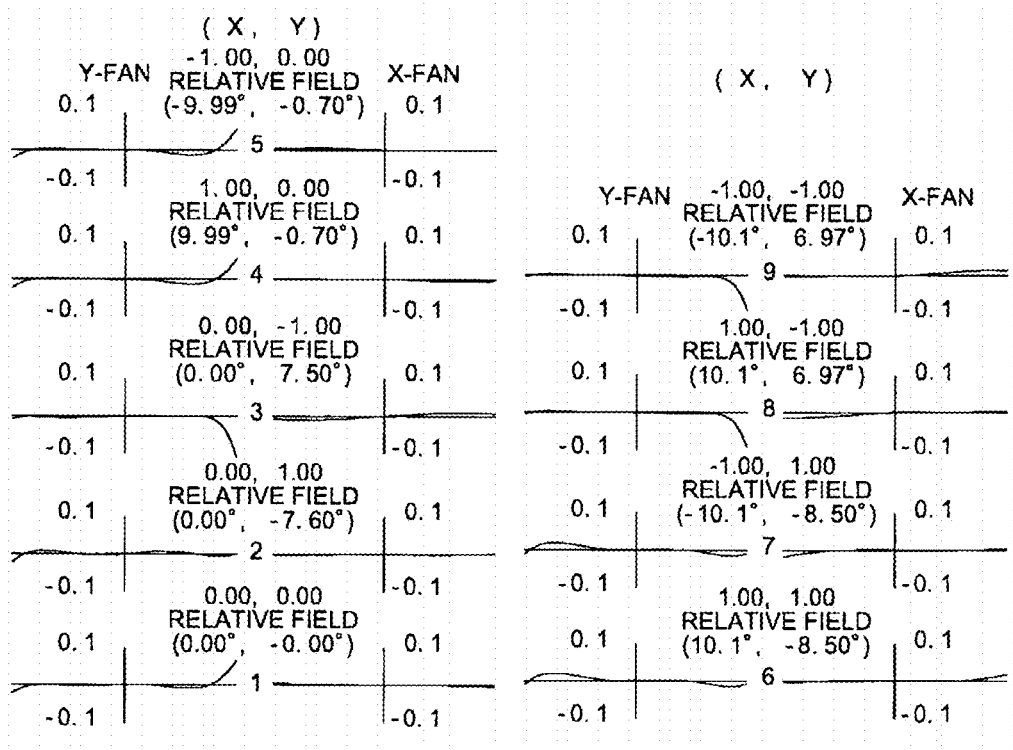
FIG. 14 shows transverse aberration of the imaging optical system of Example 3.

FIG. 14 shows transverse aberration of the imaging optical system of Example 3. FIG. 14 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 14, (X,Y) show the positions on the image plane where transverse aberration is observed. That is, FIG. 14 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 4

Table 12 shows specifications of an imaging optical system of Example 4.

TABLE 12

| Surface number | Note | Origin Point position X (mm) | Origin Point position Y (mm) | Origin Point position Z (mm) | Rotation angle YZ section (deg) | Refractive index | Surface shape |
| --- | --- | --- | --- | --- | --- | --- | --- |
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 40 | 1 | XY polynomial surface |
| Stop surface | Aperture stop | 0 | −14.28 | 19.482 | 80 | 1 | flat surface |
| Surface 5 | Second reflection surface | 0 | −48.256 | 13.491 | 104 | 1 | XY polynomial surface |
| Surface 6 | Third reflection surface | 0 | −31.313 | 0.255 | 154 | 1 | XY polynomial surface |
| Surface 7 | Window plate | 0 | −31.313 | 31.255 | 0 | 3.419 | flat surface |
| Surface 8 | Window plate | 0 | −31.313 | 31.915 | 0 | 1 | flat surface |
| Image plane | Image plane | 0 | −31.313 | 36.185 | 0 | 1 | flat surface |

Table 13 shows coefficients that determine the shapes of the first to third reflection surfaces.

TABLE 13

|  | Surface 3 | Surface 5 | Surface 6 |
| --- | --- | --- | --- |
| $X^2$ | 3.99E−03 | 3.09E−03 | −6.75E−03 |
| $Y^2$ | 2.39E−03 | 2.66E−03 | −5.39E−03 |
| $X^2Y$ | 4.13E−06 | −1.02E−05 | 4.06E−05 |
| $Y^3$ | −4.43E−05 | −8.03E−05 | −3.51E−05 |
| $X^4$ | 1.23E−06 | −4.45E−07 | −6.91E−07 |
| $X^2Y^2$ | 1.27E−06 | −1.90E−06 | −2.08E−06 |
| $Y^4$ | 1.14E−06 | −2.05E−06 | −1.27E−06 |
| $X^4Y$ | 2.07E−08 | −1.10E−08 | −5.18E−10 |
| $X^2Y^3$ | −1.46E−08 | −5.68E−08 | −2.05E−08 |
| $Y^5$ | −2.21E−08 | −6.50E−08 | −3.70E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 13, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 15:
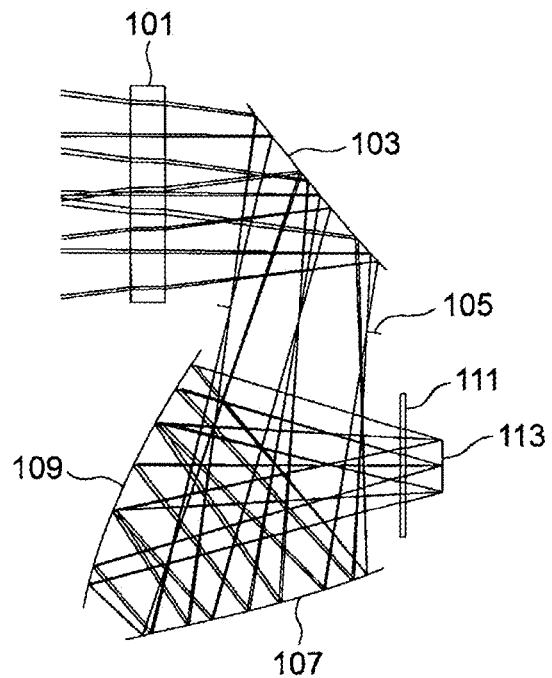
FIG. 15 is a YZ sectional view of the imaging optical system of Example 4.

FIG. 15 is a YZ sectional view of the imaging optical system of Example 4. In Example 4, the field of view (the object plane) and the image plane are in parallel to each other and the optical axis at the center of the field of view and the optical axis of the image plane are in parallel to each other and in the same orientation.

Figure 16:
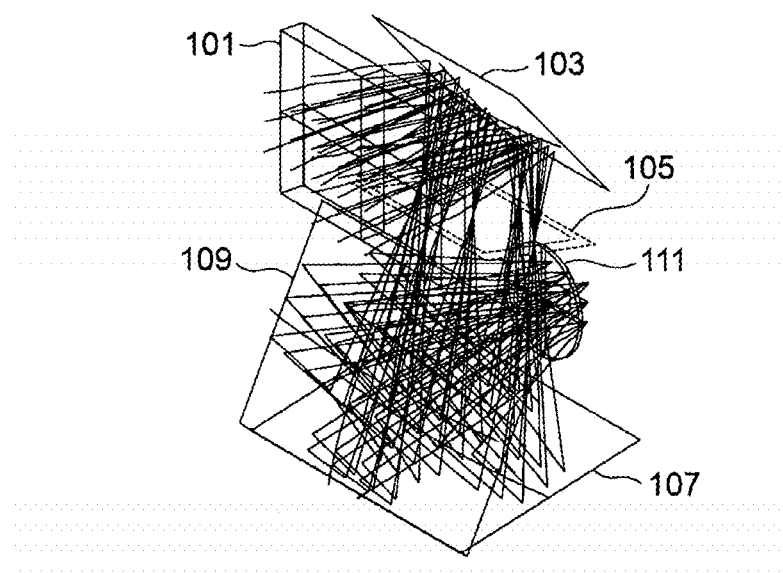
FIG. 16 shows a configuration of the imaging optical system of Example 4.

FIG. 16 shows a configuration of the imaging optical system of Example 4.

Figure 17:
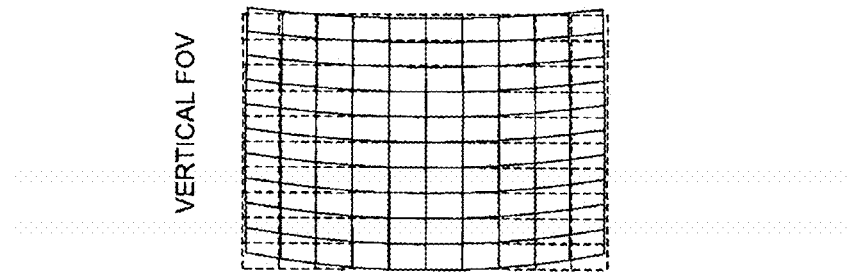
FIG. 17 shows distortion aberration of the imaging optical system of Example 4.

FIG. 17 shows distortion aberration of the imaging optical system of Example 4. The dashed line shows the reference lattice.

Figure 18:
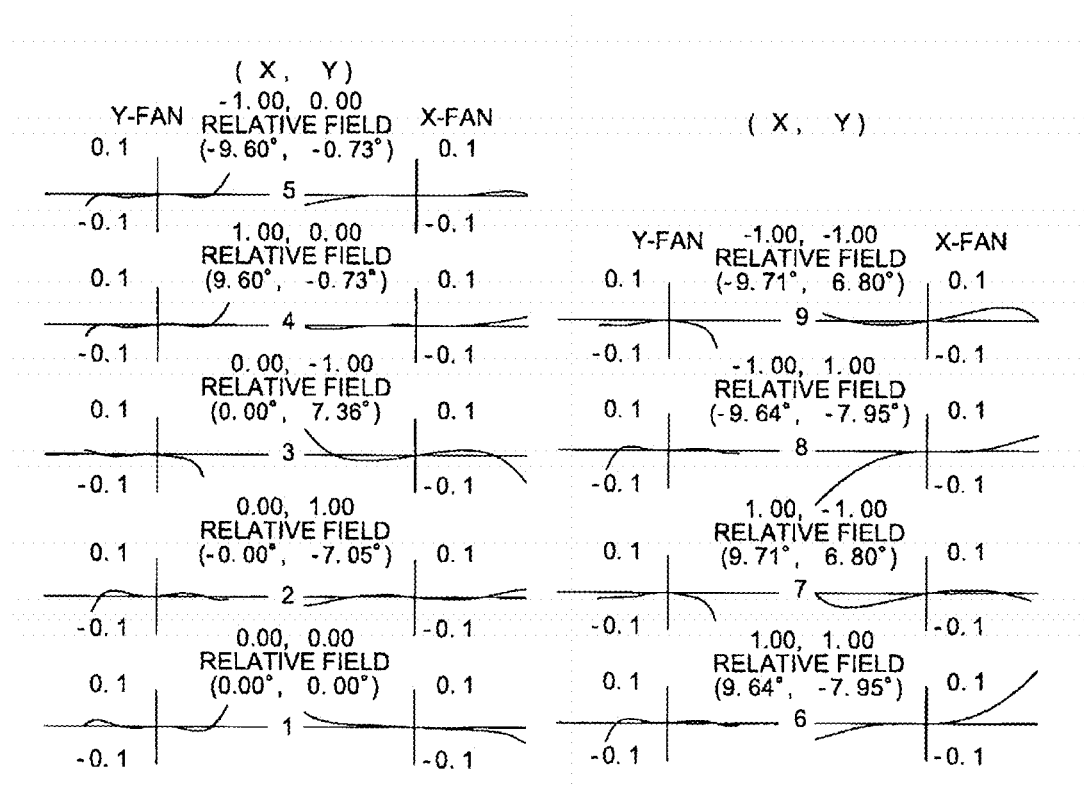
FIG. 18 shows transverse aberration of the imaging optical system of Example 4.

FIG. 18 shows transverse aberration of the imaging optical system of Example 4. FIG. 18 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 18, (X,Y) show the positions on the image plane where transverse aberration is observed. That is, FIG. 18 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 5

Table 12 shows specifications of an imaging optical system of Example 5.

TABLE 14

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 40 | 1 | XY polynomial surface |
| Stop surface | Aperture stop | 0 | −14.280 | 19.482 | 80 | 1 | flat surface |
| Surface 5 | Second reflection surface | 0 | −42.839 | 14.446 | 107 | 1 | XY polynomial surface |
| Surface 6 | Third reflection surface | 0 | −29.531 | 1.595 | 157 | 1 | XY polynomial surface |
| Surface 7 | Window plate | 0 | −29.531 | 32.595 | 0 | 3.419 | flat surface |
| Surface 8 | Window plate | 0 | −29.531 | 33.255 | 0 | 1 | flat surface |
| Image plane | Image plane | 0 | −29.531 | 37.525 | 0 | 1 | flat surface |

Table 15 shows R (radius) which determines a spherical shape of the image side surface (the second surface) of the window plate 101. In Example 5, the second surface is spherical and therefore the window plate 101 is a planoconcave lens. As a result, the window plate 101 has a negative refractive power and therefore the diverging power of the first reflecting mirror (having a concave surface) is made smaller. To make the diverging power of the first reflecting mirror smaller means to make the focal length greater and therefore distortion aberration of the first reflecting mirror can be reduced.

The reason that distortion aberration of the first reflecting mirror should be reduced is below. In the imaging optical system according to the present invention, optical axis deviation (an angle between the normal to the contact plane at the origin of the local coordinates of the reflection surface and light beam incident to the reflection surface at the angle of view of 0 degree) is large. Larger optical axis deviation corresponds to larger angle of view and larger angle of view leads to larger distortion aberration. Further, a reflecting mirror having a diverging power has a convex surface and the intersection point is more distant from the surface in comparison with a concave surface having a collecting power with the same curvature radius. In general, as a distance from the center becomes larger, a tangential line angle becomes larger. A larger tangential line angle corresponds to a larger power and therefore aberration of the convex surface is larger than that of the concave surface. Thus, the first reflecting mirror tends to generate large distortion aberration and therefore the distortion aberration in the first reflecting mirror should be reduced.

TABLE 15

| | Surface 2 |
|---|---|
| R | 2.06E+02 |

Table 16 shows coefficients that determine the shapes of the first to third reflection surfaces.

TABLE 16

| | Surface 3 | Surface 5 | Surface 6 |
|---|---|---|---|
| $X^2$ | −8.00E−04 | 4.28E−03 | −4.84E−03 |
| $Y^2$ | 4.83E−04 | 5.17E−03 | −1.94E−03 |
| $X^2Y$ | 6.09E−07 | 1.73E−05 | 6.06E−05 |
| $Y^3$ | −2.61E−05 | −1.29E−06 | 2.25E−05 |
| $X^4$ | 9.99E−07 | 1.60E−08 | −2.48E−07 |
| $X^2Y^2$ | 1.96E−06 | 9.45E−07 | 5.77E−07 |
| $Y^4$ | 1.02E−06 | 7.21E−07 | 6.18E−07 |
| $X^4Y$ | 1.36E−08 | −9.36E−10 | 3.09E−09 |
| $X^2Y^3$ | −5.26E−09 | 1.38E−09 | −8.28E−09 |
| $Y^5$ | −2.03E−08 | −7.48E−09 | −2.85E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 16, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 19:
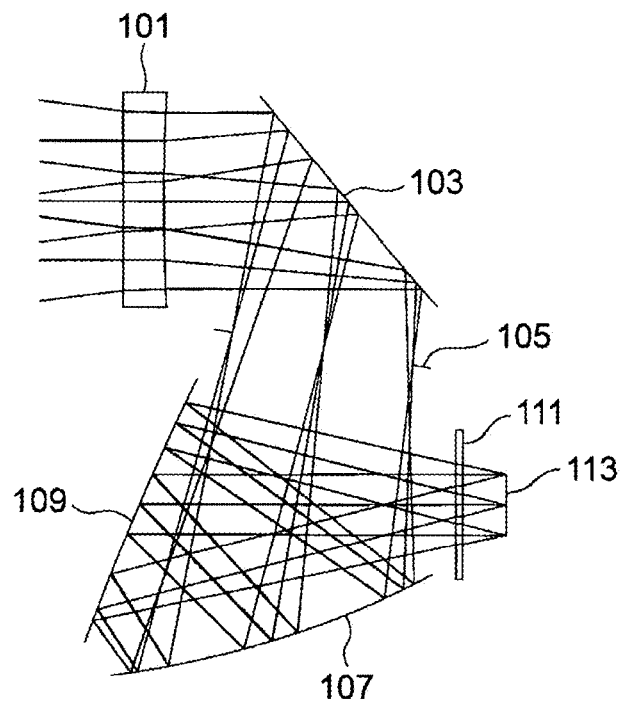
FIG. 19 is a YZ sectional view of the imaging optical system of Example 5.

FIG. 19 is a YZ sectional view of the imaging optical system of Example 5. In Example 5, the field of view (the object plane) and the image plane are in parallel to each other and the optical axis at the center of the field of view and the optical axis of the image plane are in parallel to each other and in the same orientation.

Figure 20:
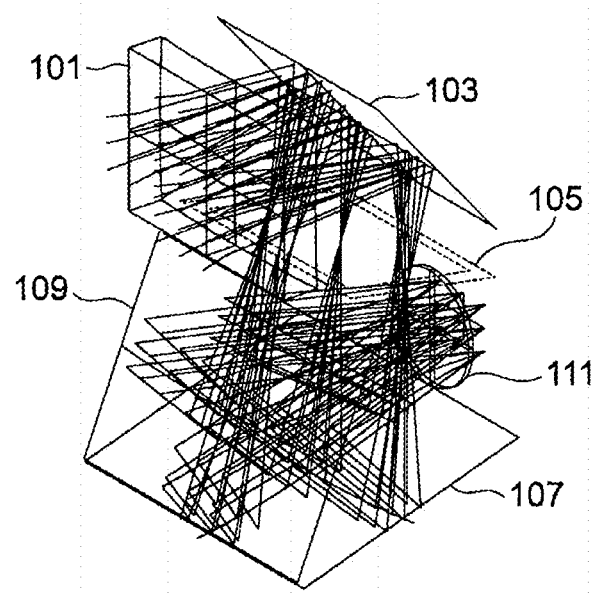
FIG. 20 shows a configuration of the imaging optical system of Example 5.

FIG. 20 shows a configuration of the imaging optical system of Example 5.

FIG. 21 shows distortion aberration of the imaging optical system of Example 5. The dashed line shows the reference lattice. The image side surface of the window plate 101 is made spherical such that the window plate 101 has a negative refractive power and therefore the diverging power of the first reflecting mirror is made smaller. As a result, distortion aberration is made smaller than in Examples 1 to 4.

Figure 22:
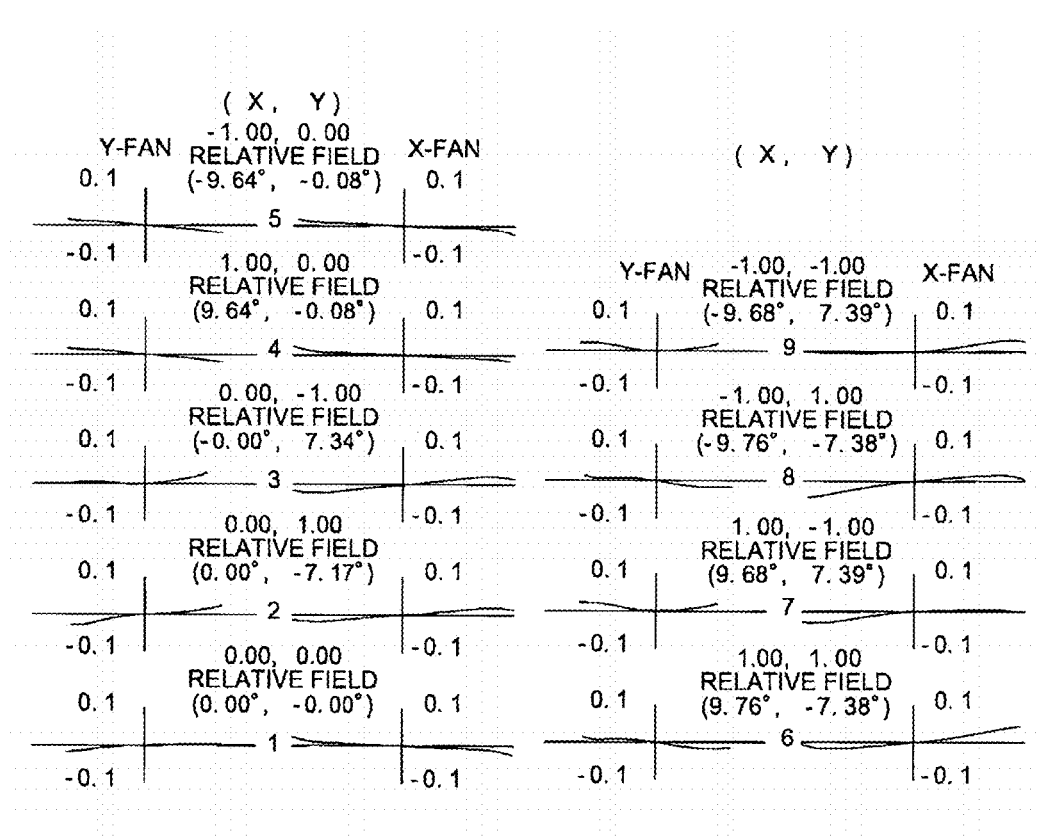
FIG. 22 shows transverse aberration of the imaging optical system of Example 5.

FIG. 22 shows transverse aberration of the imaging optical system of Example 5. FIG. 22 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 22, (X,Y) show the positions on the image plane where transverse aberration is observed. That is, FIG. 22 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 6

Table 17 shows specifications of an imaging optical system of Example 6.

TABLE 17

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | spherical surface |
| Surface 2 | Window plate | 0 | 0 | 4 | 0 | 1 | spherical surface |
| Surface 3 | First reflection surface | 0 | 0 | 22 | 40 | 1 | XY polynomial surface |
| Stop surface | Aperture stop | 0 | −14.280 | 19.482 | 80 | 1 | flat surface |
| Surface 5 | Second reflection surface | 0 | −42.839 | 14.446 | 107 | 1 | XY polynomial surface |
| Surface 6 | Third reflection surface | 0 | −29.531 | 1.595 | 157 | 1 | XY polynomial surface |
| Surface 7 | Window plate | 0 | −29.531 | 32.595 | 0 | 3.419 | flat surface |
| Surface 8 | Window plate | 0 | −29.531 | 33.255 | 0 | 1 | flat surface |
| Image plane | Image plane | 0 | −29.531 | 37.525 | 0 | 1 | flat surface |

Table 18 shows R (radius) which determines spherical shapes of the object side surface (the first surface) and the image side surface (the second surface) of the window plate 101. In Example 5, the first surface and the second surface are spherical and therefore the window plate 101 is a meniscus spherical lens. As a result, the window plate 101 has a negative refractive power and therefore the diverging power of the first reflecting mirror (having a concave surface) is made smaller. To make the diverging power of the first reflecting mirror smaller means to make the focal length greater and therefore distortion aberration of the first reflecting mirror can be reduced.

TABLE 18

|  | Surface 1 | Surface 2 |
|---|---|---|
| R | 9.36E+01 | 6.34E+01 |

Table 19 shows coefficients that determine the shapes of the first to third reflection surfaces.

TABLE 19

|  | Surface 3 | Surface 5 | Surface 6 |
|---|---|---|---|
| $X^2$ | −4.91E−04 | 4.16E−03 | −5.14E−03 |
| $Y^2$ | 4.90E−04 | 4.83E−03 | −2.55E−03 |
| $X^2Y$ | 1.91E−06 | 1.39E−05 | 5.59E−05 |
| $Y^3$ | −2.66E−05 | −9.37E−06 | 1.24E−05 |
| $X^4$ | 1.12E−06 | 1.87E−07 | −4.20E−08 |
| $X^2Y^2$ | 2.19E−06 | 1.10E−06 | 8.18E−07 |
| $Y^4$ | 1.01E−06 | 5.98E−07 | 5.76E−07 |
| $X^4Y$ | 1.23E−08 | 5.10E−10 | 6.68E−09 |
| $X^2Y^3$ | −1.52E−08 | 3.42E−10 | −5.22E−09 |
| $Y^5$ | −1.58E−08 | −7.24E−09 | −1.92E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 19, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 23:
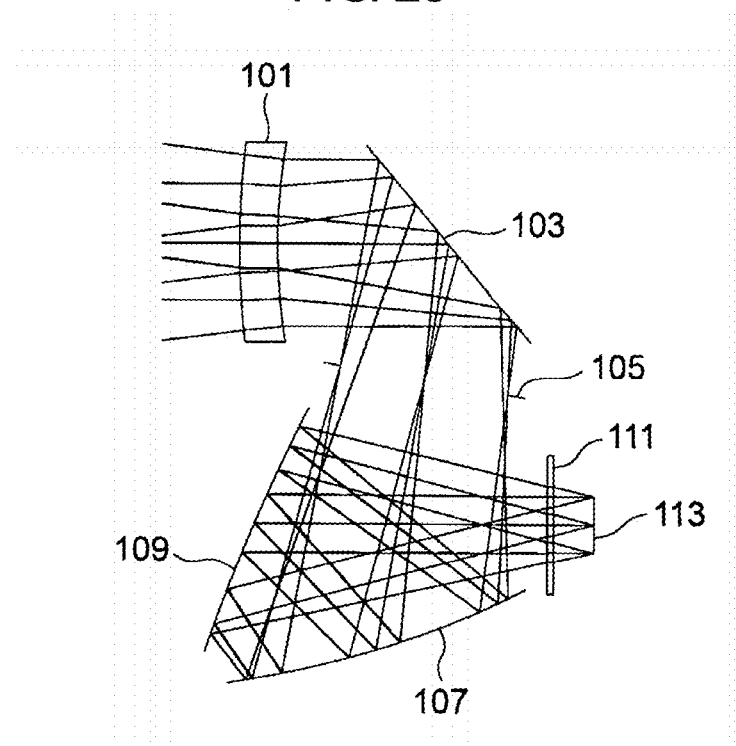
FIG. 23 is a YZ sectional view of the imaging optical system of Example 6.

FIG. 23 is a YZ sectional view of the imaging optical system of Example 6. In Example 5, the field of view (the object plane) and the image plane are in parallel to each other and the optical axis at the center of the field of view and the optical axis of the image plane are in parallel to each other and in the same orientation.

Figure 24:
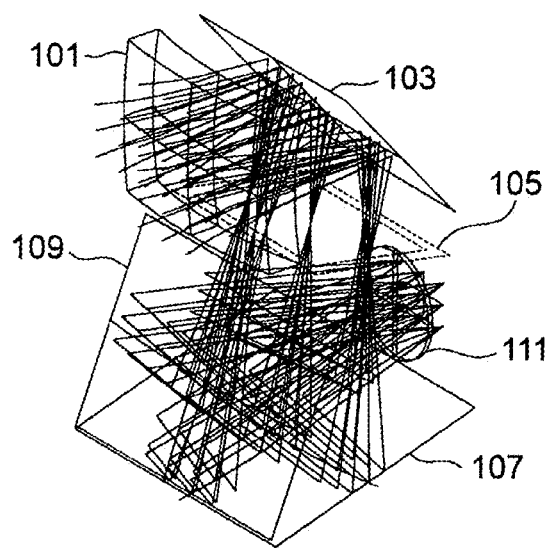
FIG. 24 shows a configuration of the imaging optical system of Example 6.

FIG. 24 shows a configuration of the imaging optical system of Example 6.

Figure 25:
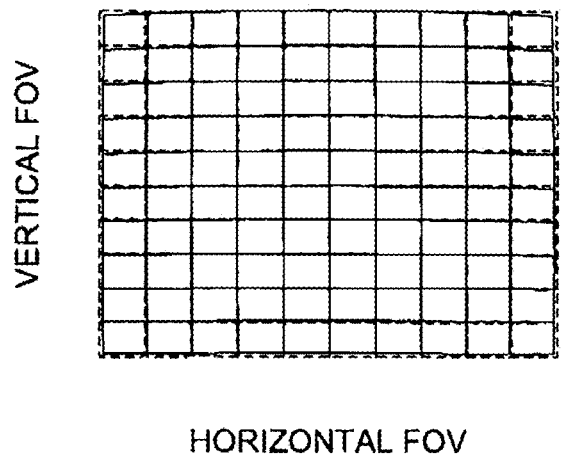
FIG. 25 shows distortion aberration of the imaging optical system of Example 6.

FIG. 25 shows distortion aberration of the imaging optical system of Example 5. The dashed line shows the reference lattice. The image side surface of the window plate 101 is made spherical such that the window plate 101 has a negative refractive power and therefore the diverging power of the first reflecting mirror is made smaller. As a result, distortion aberration is made smaller than in Examples 1 to 4.

Figure 26:
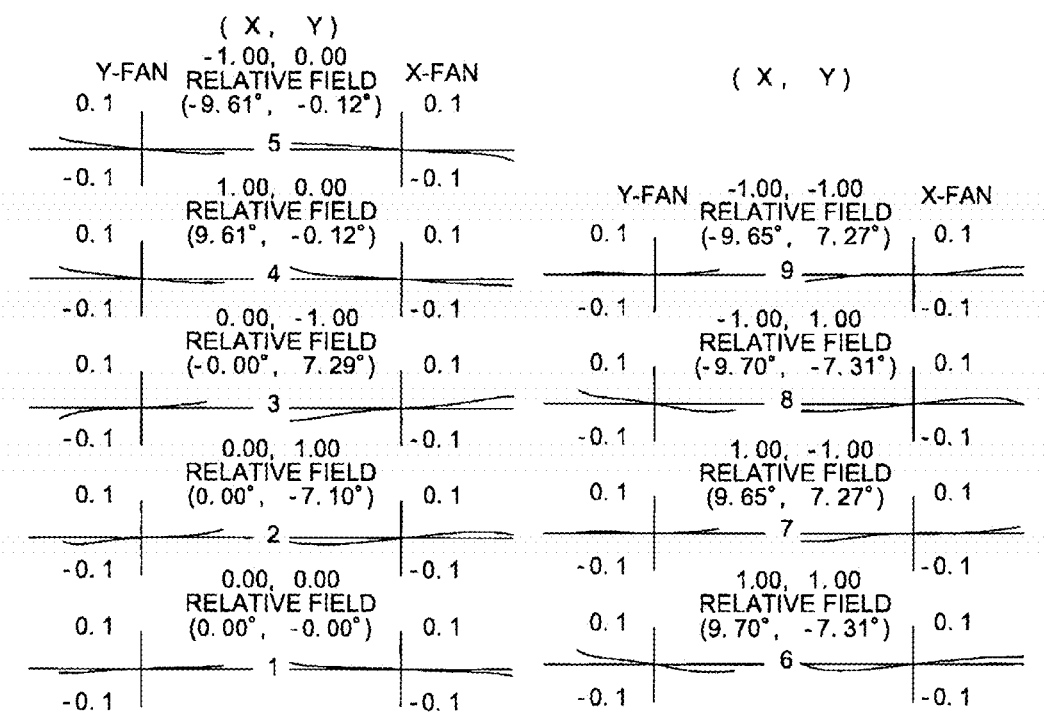
FIG. 26 shows transverse aberration of the imaging optical system of Example 6.

FIG. 26 shows transverse aberration of the imaging optical system of Example 6. FIG. 26 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 26, (X,Y) show the positions on the image plane where transverse aberration is observed. That is, FIG. 26 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 7

Table 20 shows specifications of an imaging optical system for infrared light of Example 7. Table 21 shows specifications of an imaging optical system for visible light of Example 7.

TABLE 20

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22.000 | 40 | 1 | XY polynomial surface |
| Stop surface | Aperture stop | 0 | −14.28 | 19.482 | 80 | 1 | flat surface |
| Surface 5 | Second Reflection surface | 0 | −48.256 | 13.491 | 104 | 1 | XY polynomial surface |
| Surface 6 | Third reflection surface | 0 | −30.919 | −0.053 | 154 | 1 | XY polynomial surface |
| Surface 7 | Filter (Transmission) | 0 | −30.919 | 39.9467 | 45 | — | flat surface |
| Surface 8 | Window plate | 0 | −30.919 | 48.947 | 0 | 3.419 | flat surface |

TABLE 20-continued

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Surface 9 | Window plate | 0 | −33.337 | 49.607 | 0 | 1 | flat surface |
| Image plane | Image plane | 0 | −33.337 | 53.877 | 0 | 1 | flat surface |

TABLE 21

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22.000 | 40 | 1 | XY polynomial surface |
| Stop surface | Aperture stop | 0 | −14.28 | 19.482 | 80 | 1 | flat surface |
| Surface 5 | Second reflection surface | 0 | −48.256 | 13.491 | 104 | 1 | XY polynomial surface |
| Surface 6 | Third reflection surface | 0 | −30.919 | −0.053 | 154 | 1 | XY polynomial surface |
| Surface 7 | Filter (Transmission) | 0 | −30.919 | 39.947 | 45 | — | flat surface |
| Surface 8 | Window plate | 0 | −42.984 | 39.947 | 90 | 1.518 | flat surface |
| Surface 9 | Window plate | 0 | −43.584 | 39.947 | 90 | 1 | flat surface |
| Image plane | Image plane | 0 | −44.584 | 39.947 | 90 | 1 | flat surface |

Figure 2B:
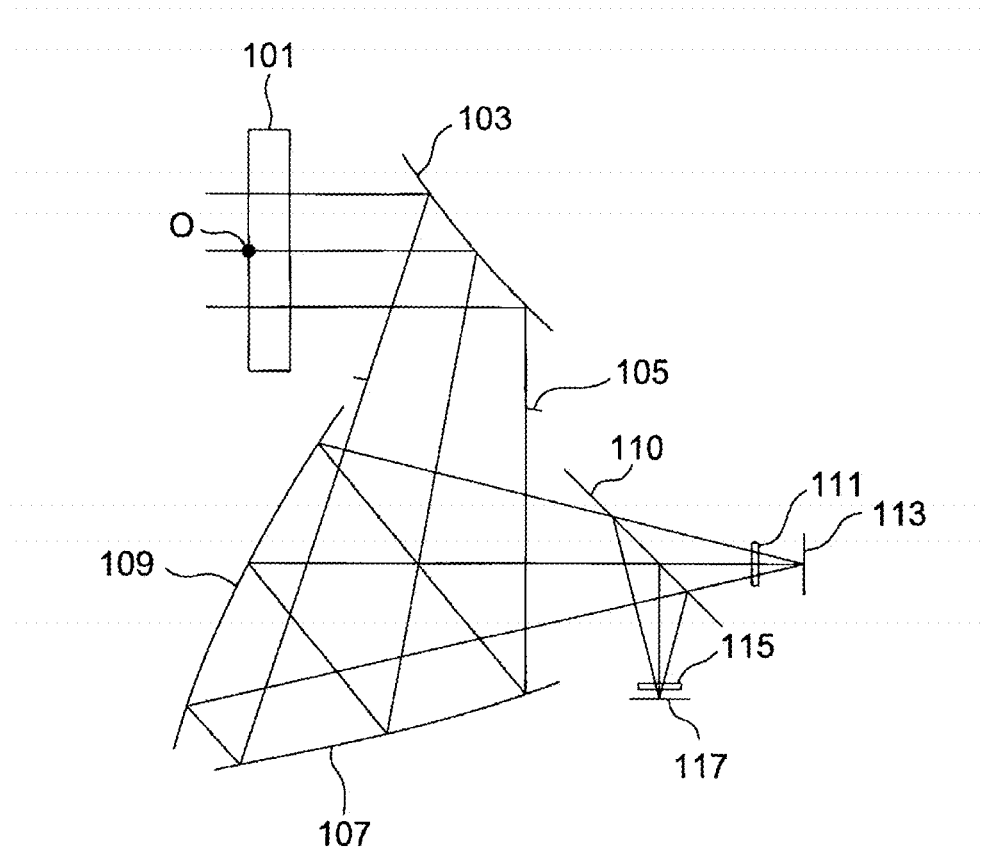
FIG. 2B is a YZ sectional view of an imaging optical system both for infrared light and visible light.

In Tables 20 and 21, an origin point position is a position of the origin point of local coordinates of each surface, with reference to the origin point O in FIG. 2B. The rotation angle is a rotation angle around X-axis of local coordinates and a counterclockwise angle with reference to the coordinate system in FIG. 2B in YZ section.

Table 22 shows coefficients that determine the shapes of the first to third reflection surfaces.

TABLE 22

|  | Surface 3 | Surface 5 | Surface 6 |
|---|---|---|---|
| $X^2$ | 7.08E−03 | 1.86E−03 | −6.15E−03 |
| $Y^2$ | 4.98E−03 | 2.79E−03 | −4.02E−03 |
| $X^2Y$ | 4.94E−06 | 4.05E−06 | 2.33E−05 |
| $Y^3$ | −5.09E−05 | −5.26E−05 | −1.83E−05 |
| $X^4$ | 2.42E−06 | −1.25E−07 | −3.30E−07 |
| $X^2Y^2$ | 2.21E−06 | −1.14E−06 | −8.62E−07 |
| $Y^4$ | 1.63E−06 | −8.53E−07 | −7.41E−07 |
| $X^4Y$ | 6.39E−08 | −3.30E−09 | 1.95E−09 |
| $X^2Y^3$ | 2.24E−08 | −1.86E−08 | −1.15E−08 |
| $Y^5$ | −2.20E−08 | −3.21E−08 | −2.27E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 13, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 27:
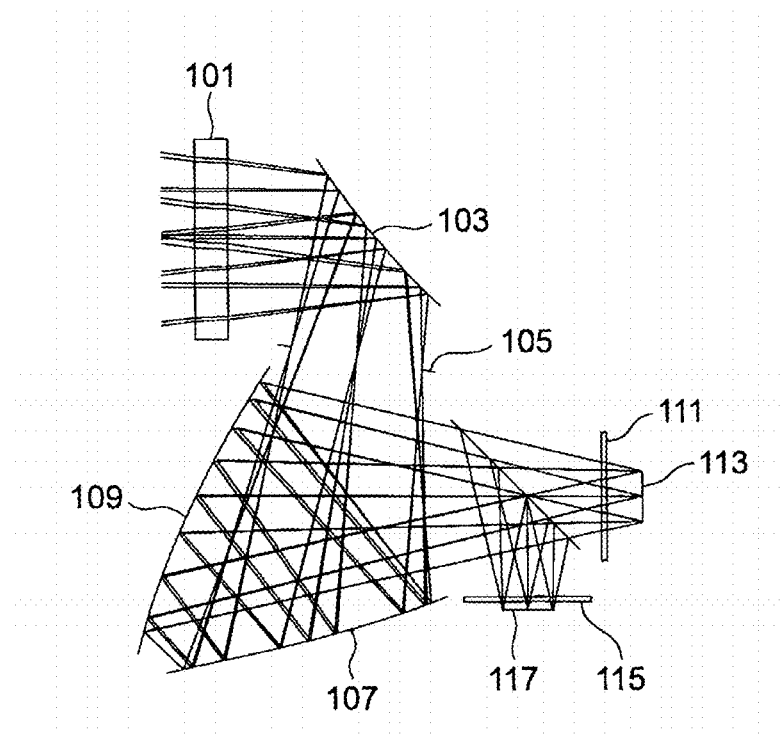
FIG. 27 is a YZ sectional view of the imaging optical system of Example 7.

FIG. 27 is a YZ sectional view of the imaging optical system of Example 7. In Example 4, the field of view (the object plane) and the image plane are in parallel to each other and the optical axis at the center of the field of view and the optical axis of the image plane are in parallel to each other and in the same orientation.

Figure 28:
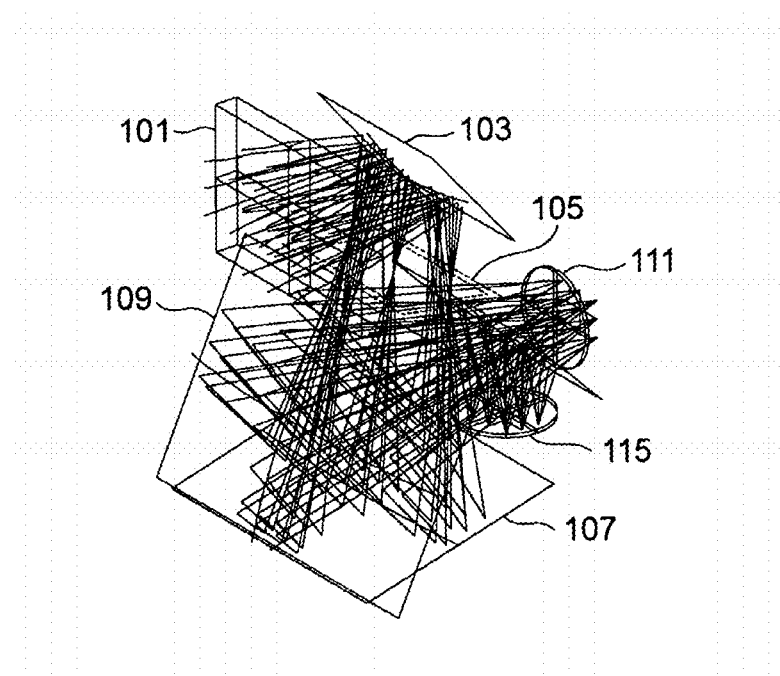
FIG. 28 shows a configuration of the imaging optical system of Example 7.

FIG. 28 shows a configuration of the imaging optical system of Example 7.

Figure 29:
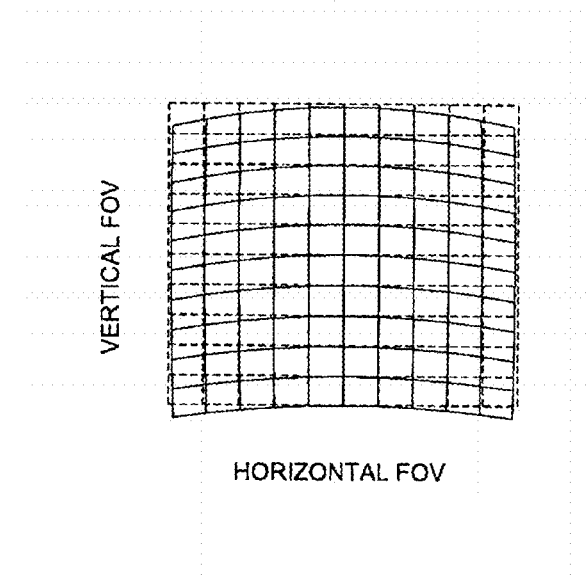
FIG. 29 shows distortion aberration of the imaging optical system for infrared light of Example 7.
Figure 30:
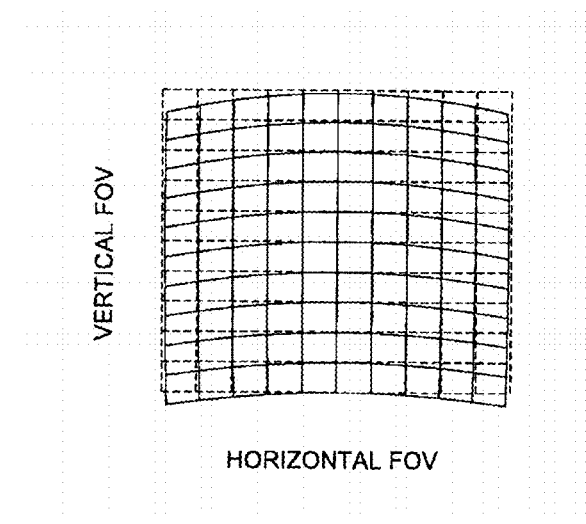
FIG. 30 shows distortion aberration of the imaging optical system for visible light of Example 7.

FIG. 29 shows distortion aberration of the imaging optical system for infrared light of Example 7. FIG. 30 shows distortion aberration of the imaging optical system for visible light of Example 7. The dashed line shows the reference lattice.

Figure 31:
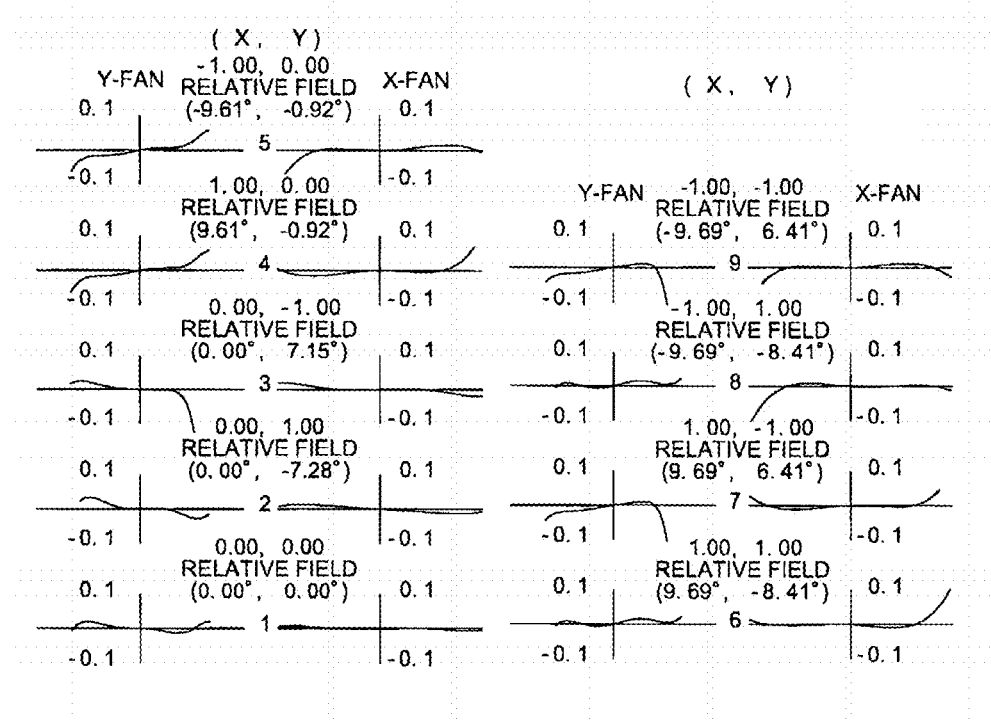
FIG. 31 shows transverse aberration of the imaging optical system for infrared light of Example 7.
Figure 32:
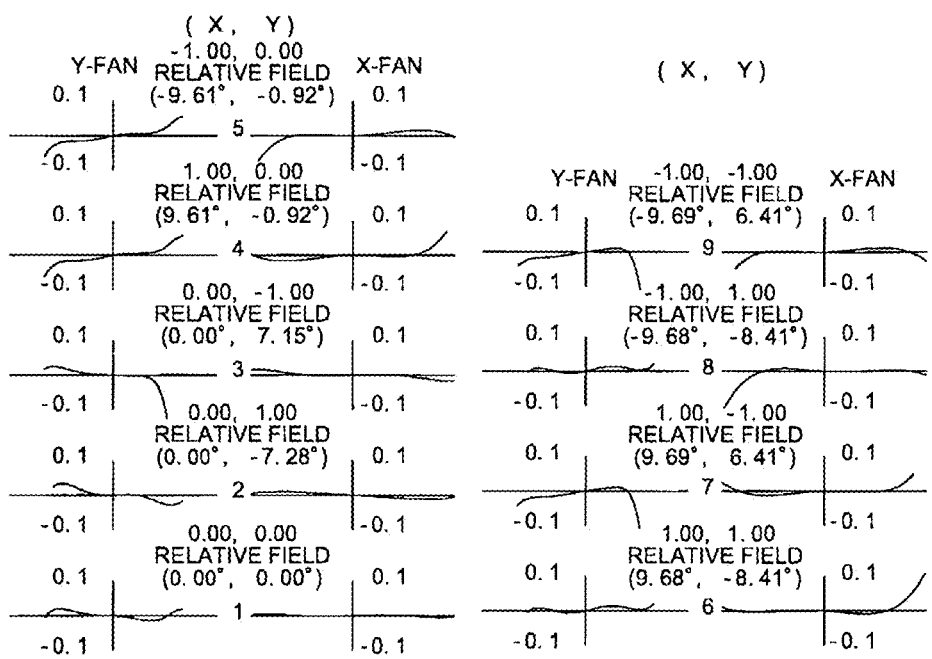
FIG. 32 shows transverse aberration of the imaging optical system for visible light of Example 7.

FIG. 31 shows transverse aberration of the imaging optical system for infrared light of Example 7. FIG. 32 shows transverse aberration of the imaging optical system for visible light of Example 7. FIGS. 31 and 32 show transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIGS. 31 and 32, (X,Y) show the positions on the image plane where transverse aberration is observed. That is, FIGS. 31 and 32 show transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 8

Table 23 shows specifications of an imaging optical system of Example 8.

Table 24 shows coefficients that determine the shapes of the first to third reflection surfaces.

TABLE 24

|  | Surface 3 | Surface 5 | Surface 6 |
| --- | --- | --- | --- |
| $X^2$ | 7.37E−03 | 2.65E−03 | −9.44E−03 |
| $Y^2$ | 4.98E−03 | 3.54E−03 | −6.79E−03 |
| $X^2Y$ | 1.56E−05 | −3.31E−05 | 2.92E−05 |
| $Y^3$ | −2.03E−04 | −2.73E−04 | −1.59E−04 |
| $X^4$ | 4.65E−06 | −5.86E−07 | −1.29E−06 |
| $X^2Y^2$ | 5.56E−06 | −5.96E−06 | −4.16E−06 |
| $Y^4$ | 9.40E−06 | −7.48E−06 | −3.48E−06 |
| $X^4Y$ | −1.33E−08 | 4.02E−09 | 1.32E−08 |
| $X^2Y^3$ | −1.90E−07 | −2.56E−07 | −1.33E−07 |
| $Y^5$ | −3.61E−07 | −4.09E−07 | −3.22E−07 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 24, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 33:
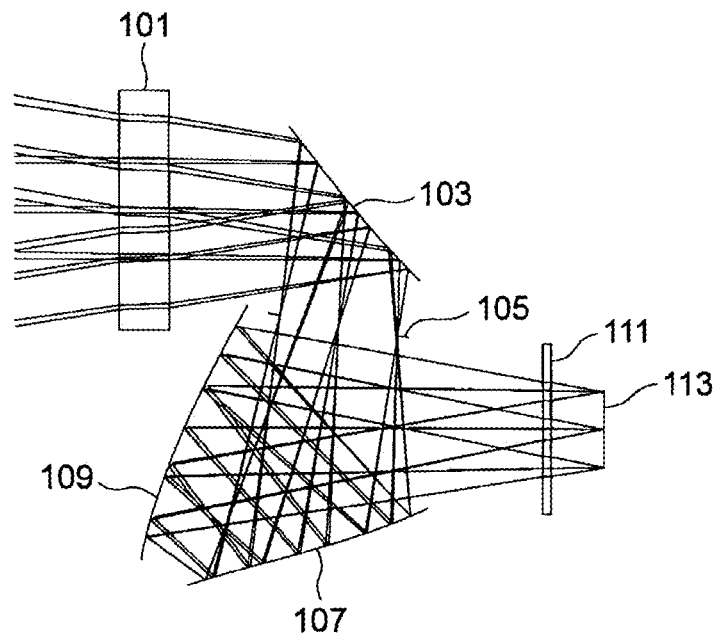
FIG. 33 is a YZ sectional view of the imaging optical system of Example 8.

FIG. 33 is a YZ sectional view of the imaging optical system of Example 8. In Example 8, the field of view (the object plane) and the image plane are in parallel to each other

TABLE 23

| Surface number | Note | Origin Point position X (mm) | Origin Point position Y (mm) | Origin Point position Z (mm) | Rotation angle YZ section (deg) | Refractive index | Surface shape |
| --- | --- | --- | --- | --- | --- | --- | --- |
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 19 | 40 | 1 | XY polynomial surface |
| Stop surface | Aperture stop | 0 | −8.863 | 17.437 | 80 | 1 | flat surface |
| Surface 5 | Second reflection surface | 0 | −27.082 | 14.225 | 106 | 1 | XY polynomial surface |
| Surface 6 | Third reflection surface | 0 | −17.050 | 5.191 | 156 | 1 | XY polynomial surface |
| Surface 7 | Window plate | 0 | −17.050 | 33.691 | 0 | 3.419 | flat surface |
| Surface 8 | Window plate | 0 | −17.050 | 34.351 | 0 | 1 | flat surface |
| Image plane | Image plane | 0 | −17.050 | 38.621 | 0 | 1 | flat surface | and the optical axis at the center of the field of view and the optical axis of the image plane are in parallel to each other and in the same orientation.

Figure 34:
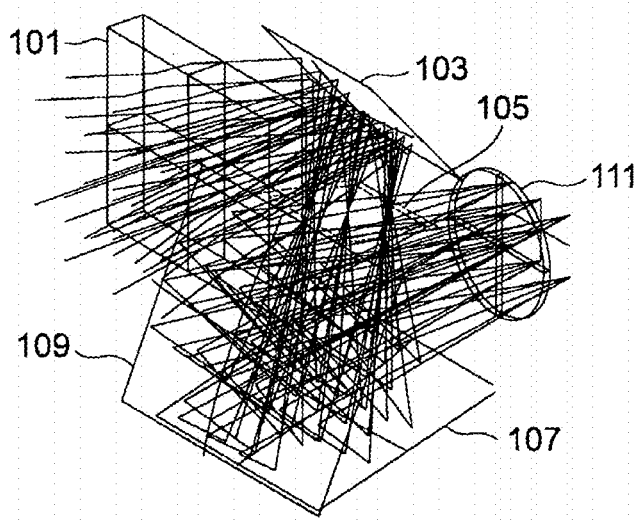
FIG. 34 shows a configuration of the imaging optical system of Example 8.

FIG. 34 shows a configuration of the imaging optical system of Example 8.

Figure 35:
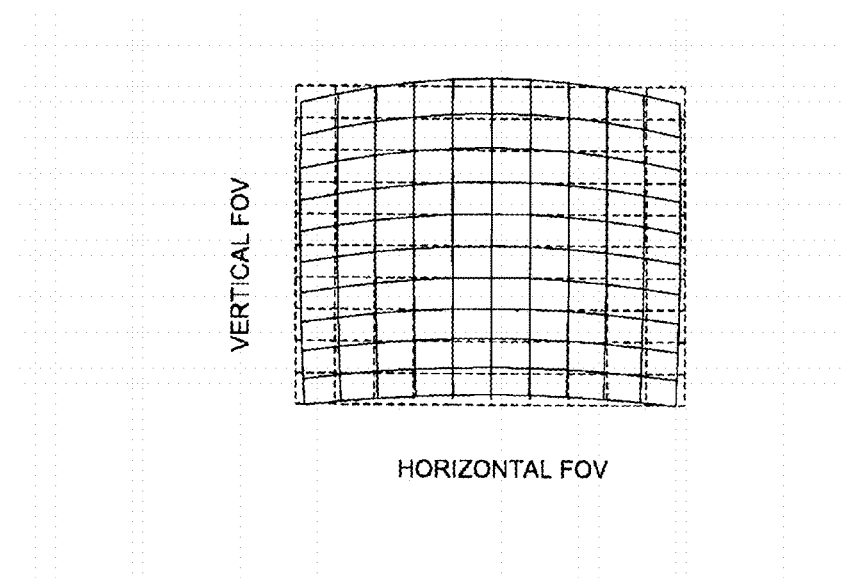
FIG. 35 shows distortion aberration of the imaging optical system of Example 8.

FIG. 35 shows distortion aberration of the imaging optical system of Example 8. The dashed line shows the reference lattice.

Figure 36:
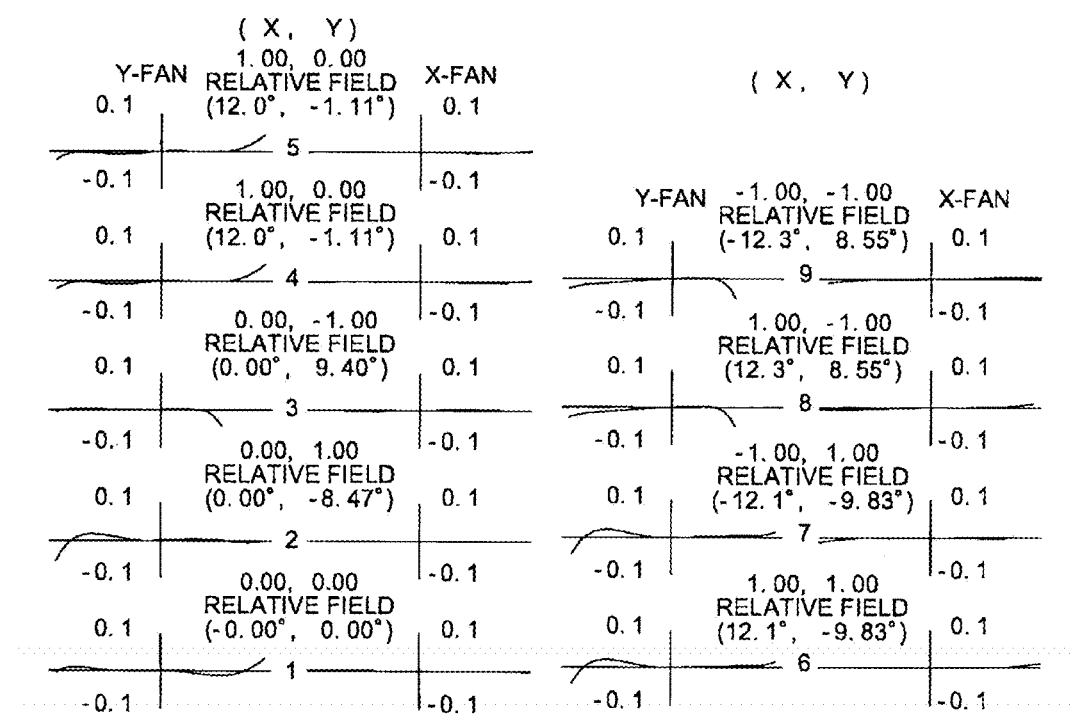
FIG. 36 shows transverse aberration of the imaging optical system of Example 8.

FIG. 36 shows transverse aberration of the imaging optical system of Example 8. FIG. 36 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 36, (X,Y) show the positions on the image plane where transverse aberration is observed. That is, FIG. 36 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 9

Table 25 shows specifications of an imaging optical system of Example 9.

Table 26 shows coefficients that determine the shapes of the first to third reflection surfaces.

TABLE 26

|  | Surface 3 | Surface 5 | Surface 6 |
|---|---|---|---|
| $X^2$ | 1.60E−03 | 1.73E−03 | −4.02E−03 |
| $Y^2$ | 1.94E−03 | 3.52E−03 | −6.90E−04 |
| $X^2Y$ | 7.11E−06 | 1.45E−05 | 3.20E−05 |
| $Y^3$ | −2.16E−05 | −5.48E−06 | −6.69E−06 |
| $X^4$ | 1.88E−07 | −9.88E−08 | −1.62E−07 |
| $X^2Y^2$ | 2.87E−07 | −1.75E−08 | −1.73E−07 |
| $Y^4$ | 4.06E−07 | 4.26E−08 | 3.97E−08 |
| $X^4Y$ | 3.81E−09 | 1.06E−09 | 7.28E−11 |
| $X^2Y^3$ | −1.67E−09 | −3.64E−10 | −1.26E−09 |
| $Y^5$ | −5.17E−09 | −1.54E−09 | −1.77E−09 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 26, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 37:
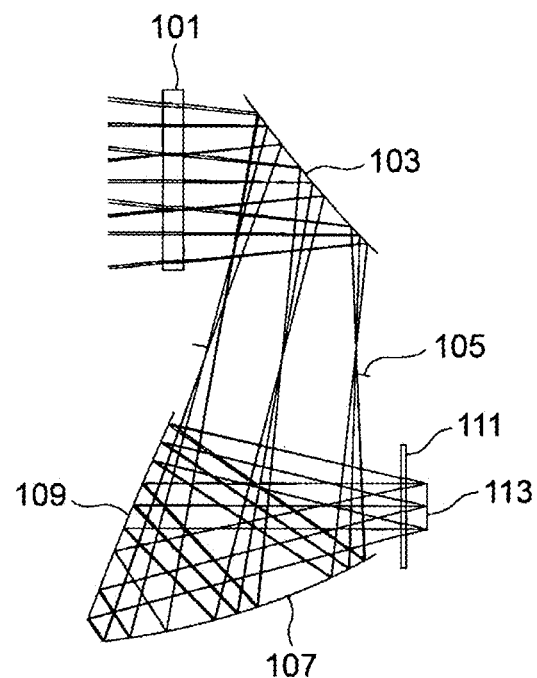
FIG. 37 is a YZ sectional view of the imaging optical system of Example 9.

FIG. 37 is a YZ sectional view of the imaging optical system of Example 9. In Example 4, the field of view (the object plane) and the image plane are in parallel to each other

TABLE 25

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 29 | 40 | 1 | XY polynomial surface |
| Stop surface | Aperture stop | 0 | −34.468 | 22.922 | 80 | 1 | flat surface |
| Surface 5 | Second reflection surface | 0 | −83.709 | 14.240 | 107 | 1 | XY polynomial surface |
| Surface 6 | Third reflection surface | 0 | −62.848 | −5.905 | 157 | 1 | XY polynomial surface |
| Surface 7 | Window plate | 0 | −62.848 | 46.095 | 0 | 3.419 | flat surface |
| Surface 8 | Window plate | 0 | −62.848 | 47.095 | 0 | 1 | flat surface |
| Image plane | Image plane | 0 | −62.848 | 51.195 | 0 | 1 | flat surface | and the optical axis at the center of the field of view and the optical axis of the image plane are in parallel to each other and in the same orientation.

Figure 38:
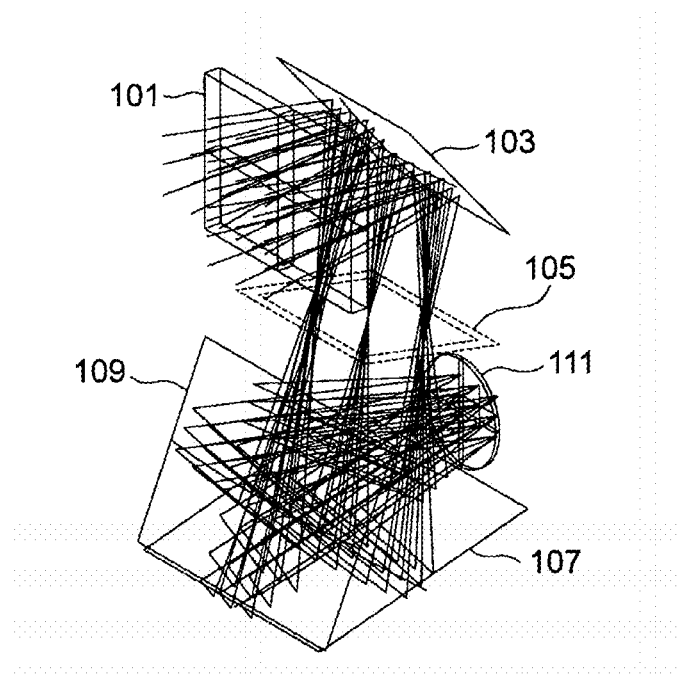
FIG. 38 shows a configuration of the imaging optical system of Example 9.

FIG. 38 shows a configuration of the imaging optical system of Example 9.

Figure 39:
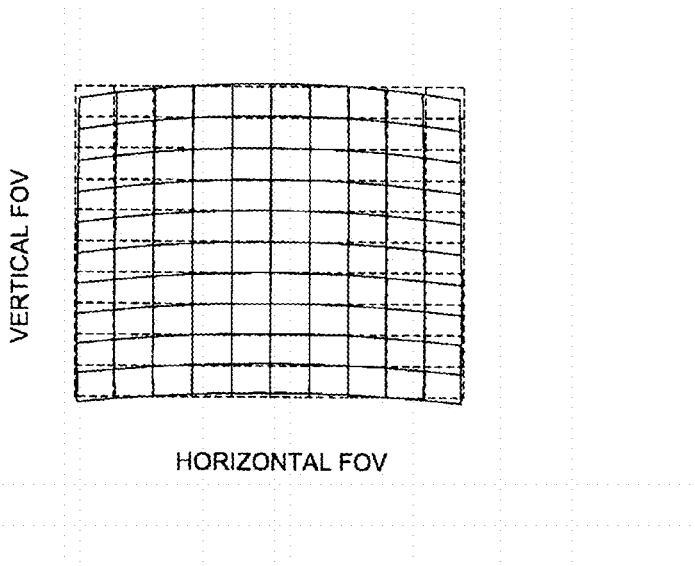
FIG. 39 shows distortion aberration of the imaging optical system of Example 9.

FIG. 39 shows distortion aberration of the imaging optical system of Example 9. The dashed line shows the reference lattice.

Figure 40:
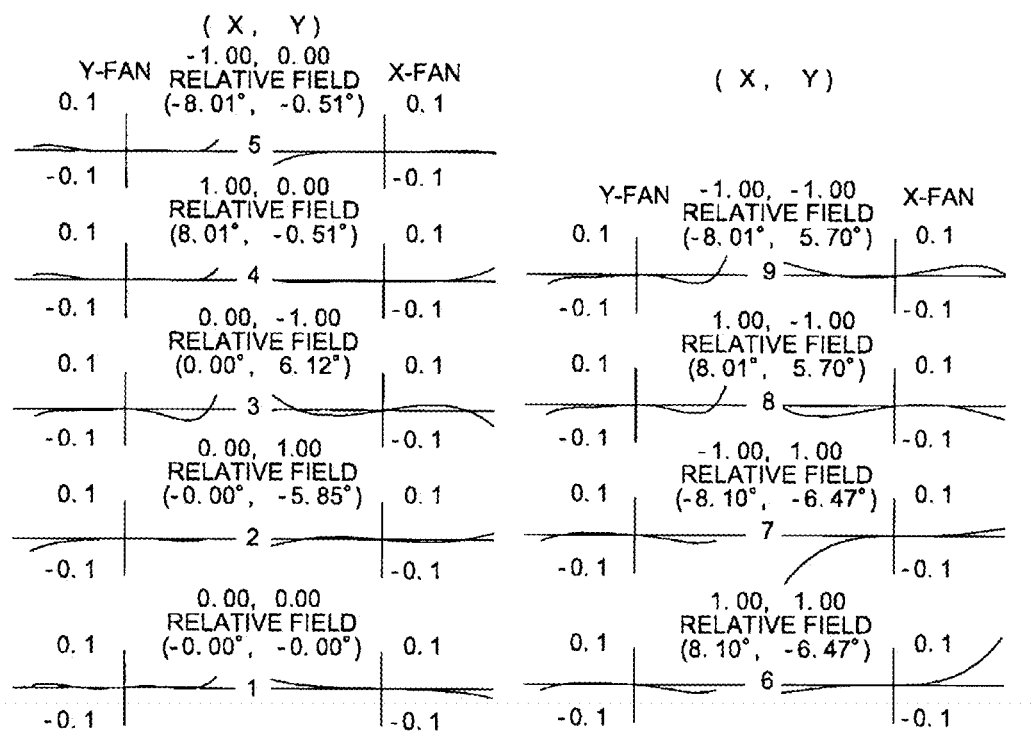
FIG. 40 shows transverse aberration of the imaging optical system of Example 9.

FIG. 40 shows transverse aberration of the imaging optical system of Example 9. FIG. 40 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 40, (X,Y) show the positions on the image plane where transverse aberration is observed. That is, FIG. 40 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 10

Table 27 shows specifications of an imaging optical system of Example 10.

TABLE 27

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 24 | 40 | 1 | XY polynomial surface |
| Stop surface | Aperture stop | 0 | −15.757 | 21.222 | 80 | 1 | flat surface |
| Surface 5 | Second reflection surface | 0 | −46.286 | 15.839 | 107 | 1 | XY polynomial surface |
| Surface 6 | Third reflection surface | 0 | −31.180 | 1.251 | 157 | 1 | XY polynomial surface |
| Surface 7 | Window plate | 0 | −31.180 | 36.251 | 0 | 3.419 | flat surface |
| Surface 8 | Window plate | 0 | −31.180 | 37.251 | 0 | 1 | flat surface |
| Image plane | Image plane | 0 | −31.180 | 41.351 | 0 | 1 | flat surface |

Table 28 shows coefficients that determine the shapes of the first to third reflection surfaces.

TABLE 28

| | Surface 3 | Surface 5 | Surface 6 |
|---|---|---|---|
| $X^2$ | 4.16E−03 | 2.31E−03 | −6.83E−03 |
| $Y^2$ | 2.30E−03 | 1.67E−03 | −5.90E−03 |
| $X^2Y$ | −4.40E−06 | −2.69E−05 | 1.75E−05 |
| $Y^3$ | −6.83E−05 | −1.29E−04 | −7.36E−05 |
| $X^4$ | 1.02E−06 | −3.42E−07 | −5.34E−07 |
| $X^2Y^2$ | 1.44E−06 | −2.01E−06 | −1.61E−06 |
| $Y^4$ | 1.73E−06 | −2.63E−06 | −8.17E−07 |
| $X^4Y$ | 3.72E−09 | −7.29E−09 | −7.59E−10 |
| $X^2Y^3$ | −7.67E−08 | −8.13E−08 | −3.65E−08 |
| $Y^5$ | −7.06E−08 | −1.19E−07 | −7.38E−08 |
| $X^6$ | −2.20E−10 | −4.21E−10 | −2.58E−10 |
| $X^4Y^2$ | −8.01E−09 | −2.27E−09 | −1.16E−09 |
| $X^2Y^4$ | 4.55E−09 | −3.11E−09 | −2.19E−09 |
| $Y^6$ | 2.54E−09 | −3.09E−09 | −2.02E−09 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 13, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 41:
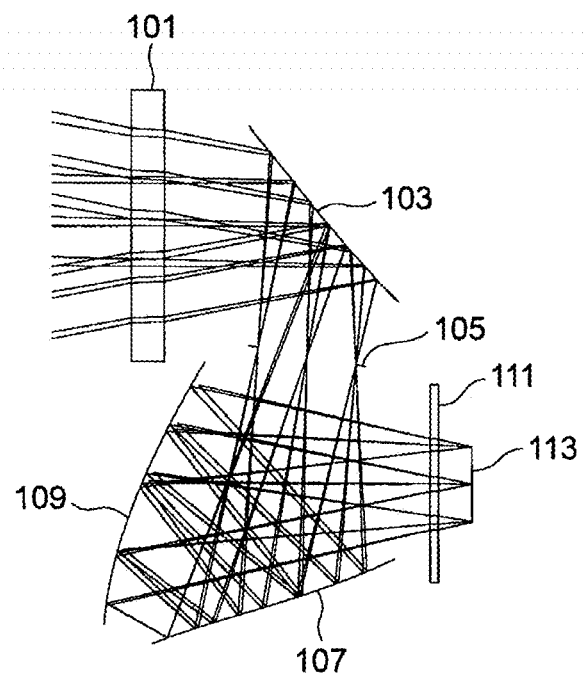
FIG. 41 is a YZ sectional view of the imaging optical system of Example 10.

FIG. 41 is a YZ sectional view of the imaging optical system of Example 10. In Example 10, the field of view (the object plane) and the image plane are in parallel to each other and the optical axis at the center of the field of view and the optical axis of the image plane are in parallel to each other and in the same orientation.

Figure 42:
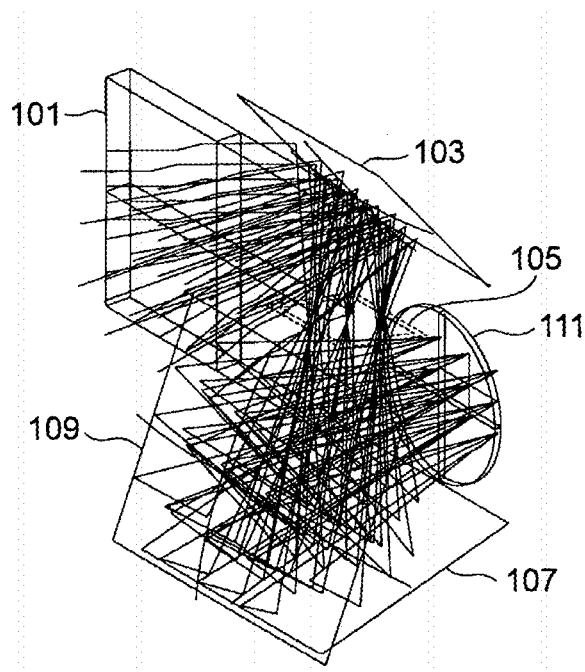
FIG. 42 shows a configuration of the imaging optical system of Example 10.

FIG. 42 shows a configuration of the imaging optical system of Example 4.

Figure 43:
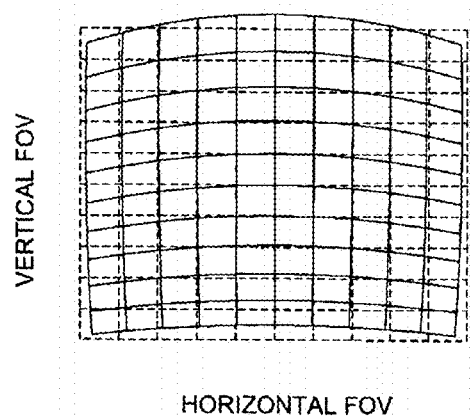
FIG. 43 shows distortion aberration of the imaging optical system of Example 10.

FIG. 43 shows distortion aberration of the imaging optical system of Example 10. The dashed line shows the reference lattice.

Figure 44:
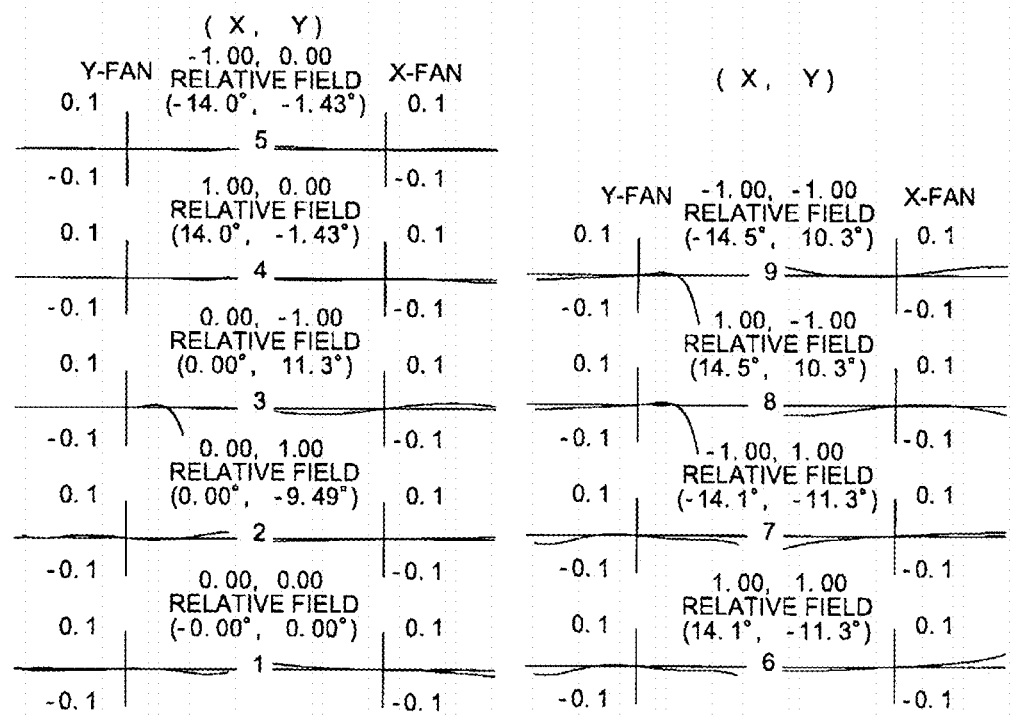
FIG. 44 shows transverse aberration of the imaging optical system of Example 10.

FIG. 44 shows transverse aberration of the imaging optical system of Example 10. FIG. 44 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 44, (X,Y) show the positions on the image plane where transverse aberration is observed. That is, FIG. 44 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 11

Table 29 shows specifications of an imaging optical system of Example 11.

In Example 11, an aperture is provided on the reflection surface of the second reflecting mirror 107.

Table 30 shows coefficients that determine the shapes of the first to third reflection surfaces.

TABLE 30

|  | Surface 3 | Stop surface | Surface 6 |
| --- | --- | --- | --- |
| $X^2$ | 5.89E−03 | 1.84E−03 | −7.64E−03 |
| $Y^2$ | 3.00E−03 | 1.04E−03 | −7.02E−03 |
| $X^2Y$ | 1.91E−05 | −1.33E−05 | 2.69E−05 |
| $Y^3$ | −5.09E−05 | −9.50E−05 | −3.77E−05 |
| $X^4$ | 1.95E−06 | −8.81E−07 | −9.15E−07 |
| $X^2Y^2$ | 1.31E−06 | −3.03E−06 | −2.40E−06 |
| $Y^4$ | 1.36E−06 | −2.40E−06 | −1.81E−06 |
| $X^4Y$ | 4.10E−08 | −1.70E−08 | −3.71E−09 |
| $X^2Y^3$ | −1.15E−09 | −6.94E−08 | −3.41E−08 |
| $Y^5$ | −2.41E−08 | −7.86E−08 | −5.63E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 30, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

TABLE 29

| Surface number | Note | Origin Point position X (mm) | Origin Point position Y (mm) | Origin Point position Z (mm) | Rotation angle YZ section (deg) | Refractive index | Surface shape |
| --- | --- | --- | --- | --- | --- | --- | --- |
| Object Surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 42 | 1 | XY polynomial surface |
| Stop surface | Second reflection surface | 0 | −49.726 | 16.774 | 112 | 1 | XY polynomial surface |
| Surface 5 | Third reflection surface | 0 | −35.906 | 0.304 | 160 | 1 | XY polynomial surface |
| Surface 6 | Window plate | 0 | −35.906 | 34.304 | 0 | 3.419 | flat surface |
| Surface 7 | Window plate | 0 | −35.906 | 34.964 | 0 | 1 | flat surface |
| Image plane | Image plane | 0 | −35.906 | 39.234 | 0 | 1 | flat surface |

Figure 45:
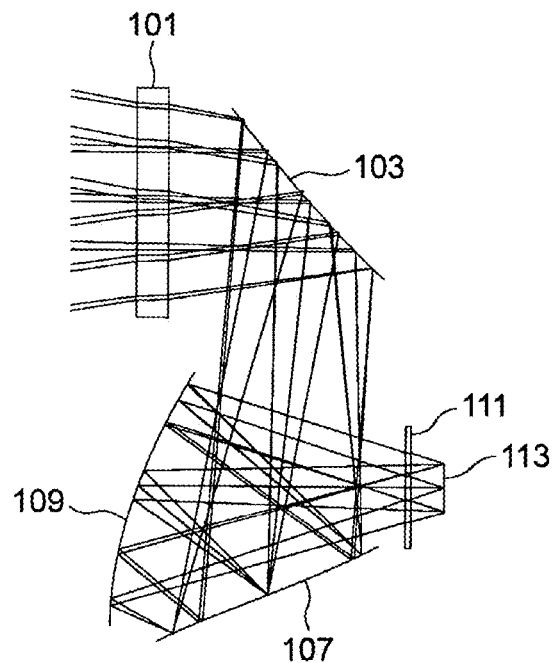
FIG. 45 is a YZ sectional view of the imaging optical system of Example 11.

FIG. 45 is a YZ sectional view of the imaging optical system of Example 11. In Example 11, the field of view (the object plane) and the image plane are in parallel to each other and the optical axis at the center of the field of view and the optical axis of the image plane are in parallel to each other and in the same orientation.

Figure 46:
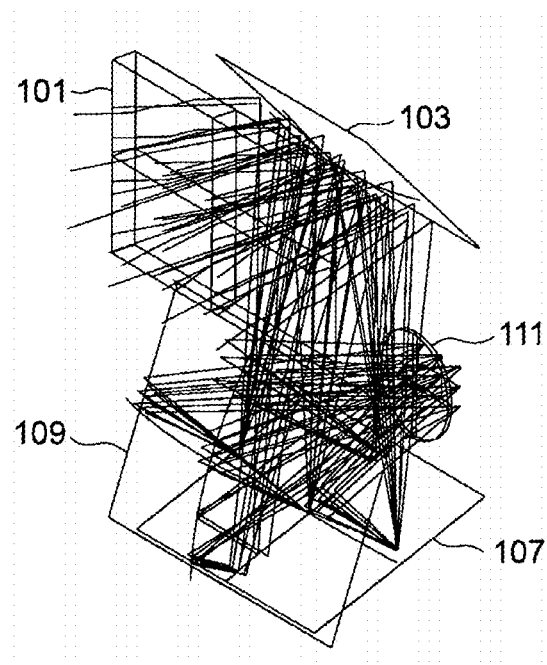
FIG. 46 shows a configuration of the imaging optical system of Example 11.

FIG. 46 shows a configuration of the imaging optical system of Example 11.

Figure 47:
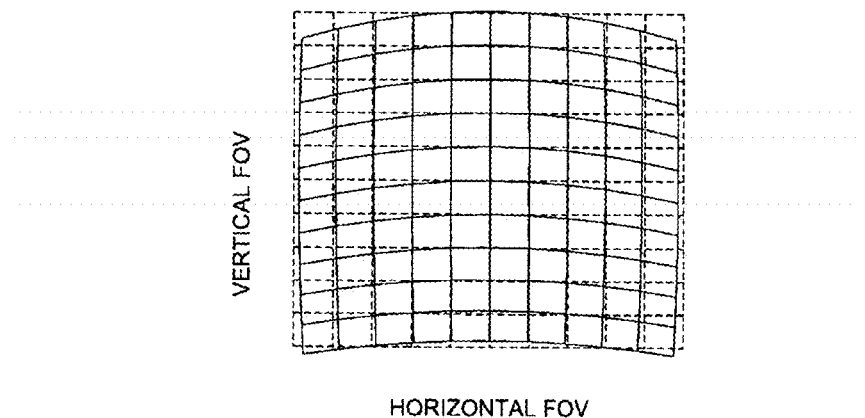
FIG. 47 shows distortion aberration of the imaging optical system of Example 11.

FIG. 47 shows distortion aberration of the imaging optical system of Example 11. The dashed line shows the reference lattice.

Figure 48:
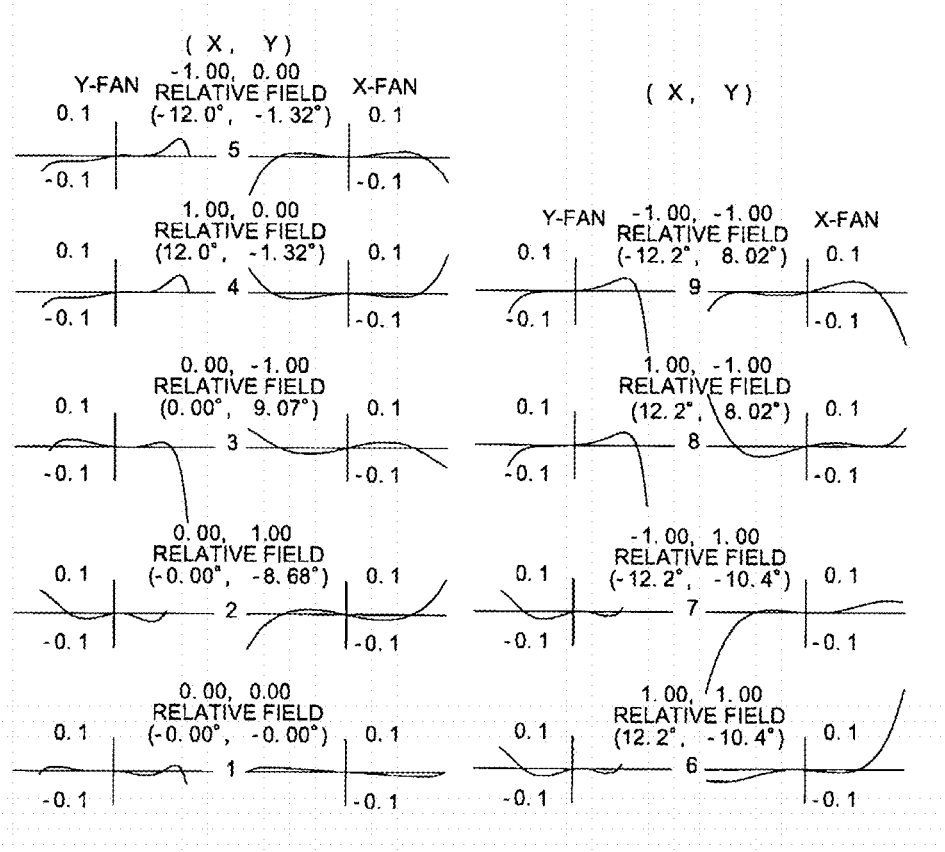
FIG. 48 shows transverse aberration of the imaging optical system of Example 11.

FIG. 48 shows transverse aberration of the imaging optical system of Example 11. FIG. 48 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 48, (X,Y) show the positions on the image plane where transverse aberration is observed. That is, FIG. 48 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 12

Table 31 shows specifications of an imaging optical system of Example 12.

In Example 12, an aperture is provided on a surface of the second reflection surface 107.

Table 32 shows coefficients that determine the shapes of the first to third reflection surfaces.

TABLE 32

|  | Surface 3 | Stop surface | Surface 6 |
|---|---|---|---|
| $X^2$ | 1.21E−02 | 8.63E−04 | −9.43E−03 |
| $Y^2$ | 3.27E−03 | −5.17E−03 | −1.10E−02 |
| $X^2Y$ | −2.93E−05 | −1.61E−04 | −1.10E−05 |
| $Y^3$ | −1.13E−04 | −3.56E−04 | −7.60E−05 |
| $X^4$ | 7.15E−06 | −2.33E−06 | −1.45E−06 |
| $X^2Y^2$ | 1.57E−06 | −1.17E−05 | −4.36E−06 |
| $Y^4$ | 3.79E−06 | −9.74E−06 | −3.27E−06 |
| $X^4Y$ | 7.63E−09 | −1.19E−07 | −1.34E−08 |
| $X^2Y^3$ | 3.20E−08 | −4.29E−07 | −7.77E−08 |
| $Y^5$ | −7.23E−08 | −3.71E−07 | −9.49E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 32, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

TABLE 31

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 44 | 1 | XY polynomial surface |
| Stop surface | Second reflection surface | 0 | −39.976 | 20.604 | 115 | 1 | XY polynomial surface |
| Surface 5 | Third reflection surface | 0 | −27.662 | 4.844 | 161 | 1 | XY polynomial surface |
| Surface 6 | Window plate | 0 | −27.662 | 38.344 | 0 | 3.419 | flat surface |
| Surface 7 | Window plate | 0 | −27.662 | 39.004 | 0 | 1 | flat surface |
| Image plane | Image plane | 0 | −27.662 | 43.274 | 0 | 1 | flat surface |

Figure 49:
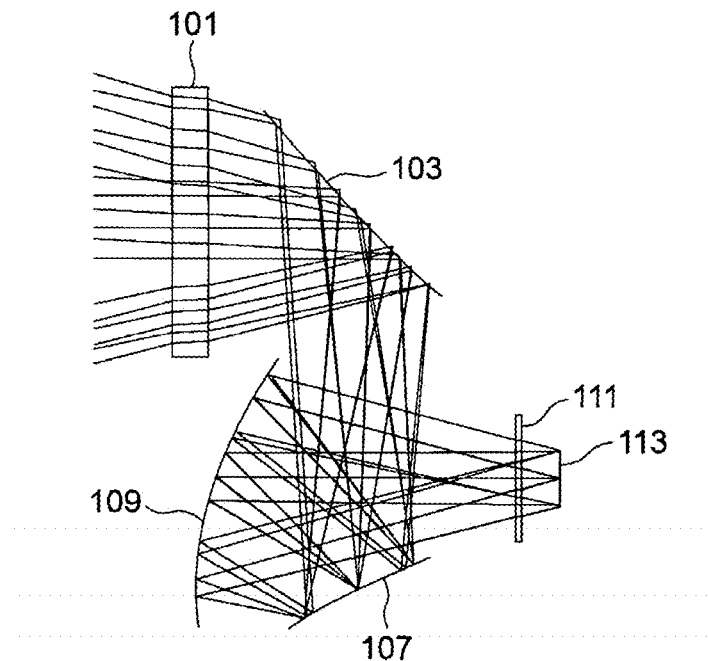
FIG. 49 is a YZ sectional view of the imaging optical system of Example 12.

FIG. 49 is a YZ sectional view of the imaging optical system of Example 12. In Example 4, the field of view (the object plane) and the image plane are in parallel to each other and the optical axis at the center of the field of view and the optical axis of the image plane are in parallel to each other and in the same orientation.

Figure 50:
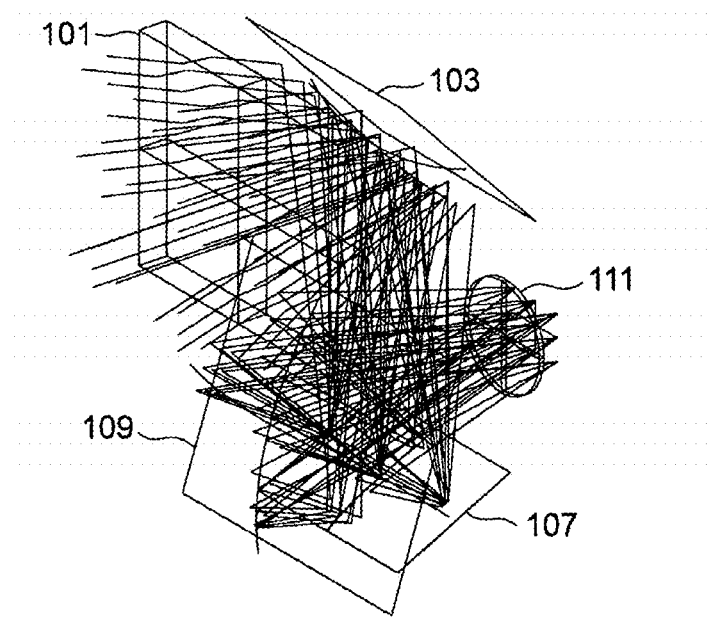
FIG. 50 shows a configuration of the imaging optical system of Example 12.

FIG. 50 shows a configuration of the imaging optical system of Example 12.

Figure 51:
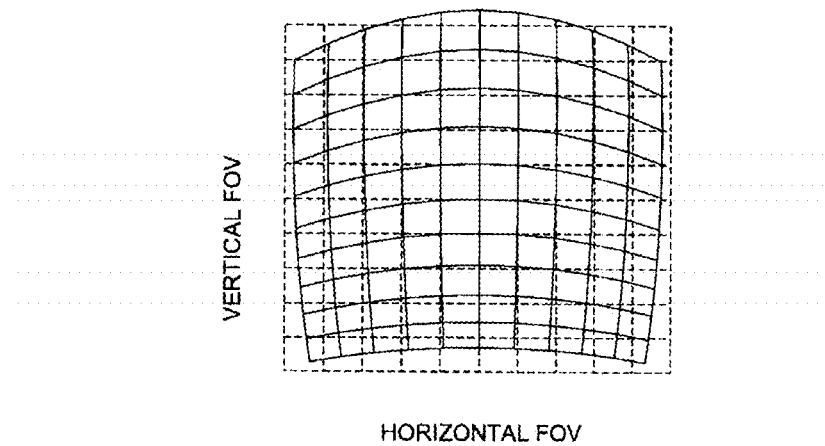
FIG. 51 shows distortion aberration of the imaging optical system of Example 12.

FIG. 51 shows distortion aberration of the imaging optical system of Example 12. The dashed line shows the reference lattice.

Figure 52:
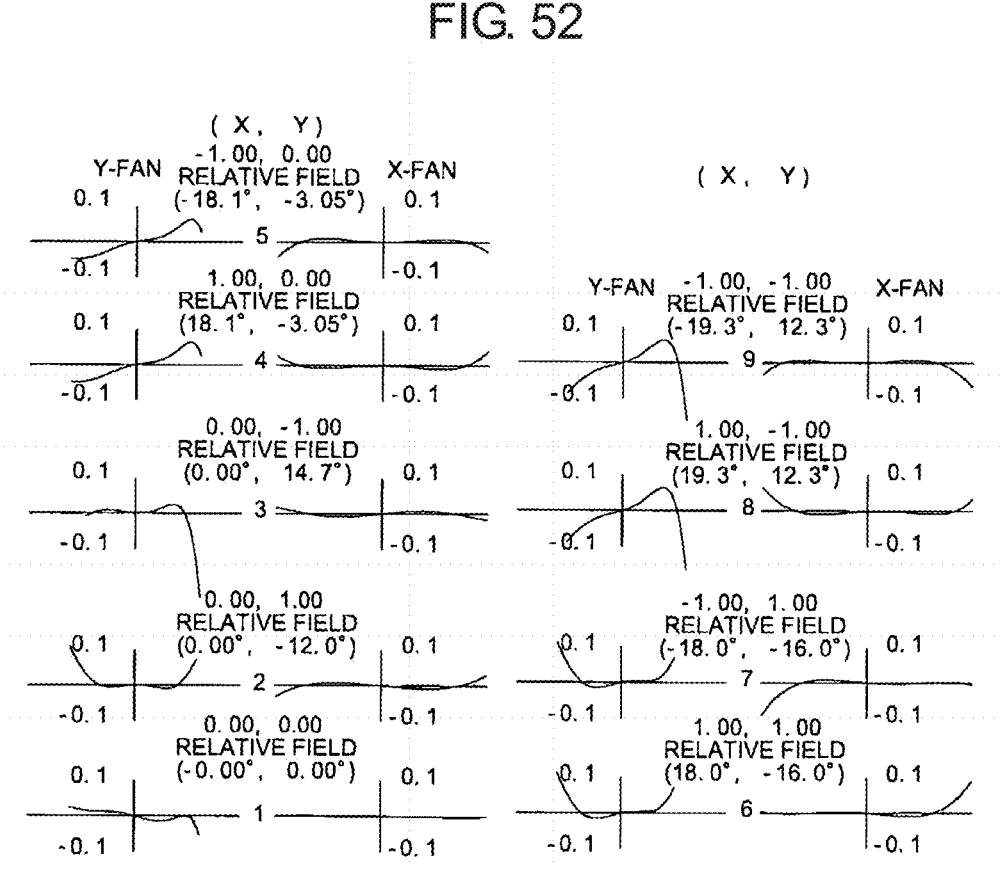
FIG. 52 shows transverse aberration of the imaging optical system of Example 12.

FIG. 52 shows transverse aberration of the imaging optical system of Example 12. FIG. 52 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 52, (X,Y) show the positions on the image plane where transverse aberration is observed. That is, FIG. 52 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 13

Table 33 shows specifications of an imaging optical system of Example 12.

Table 34 shows coefficients that determine a toroidal surface shape of the first reflection surface.

TABLE 34

|  | Surface 3 |
| --- | --- |
| Rx | 1.52E+02 |
| Ry | 6.18E+02 |
| $X^4$ | 1.25E−06 |
| $X^6$ | 2.03E−10 |
| $X^8$ | −4.02E−12 |

Table 35 shows coefficients that determine the shapes of the second and third reflection surfaces.

TABLE 35

|  | Surface 5 | Surface 6 |
| --- | --- | --- |
| $X^2$ | 2.37E−03 | −7.77E−03 |
| $Y^2$ | −1.05E−03 | −8.94E−03 |
| $X^2Y$ | −3.76E−05 | 2.63E−05 |
| $Y^3$ | −6.35E−05 | −1.01E−05 |
| $X^4$ | −7.26E−07 | −9.29E−07 |
| $X^2Y^2$ | −2.64E−06 | −2.86E−06 |
| $Y^4$ | −2.36E−06 | −2.19E−06 |
| $X^4Y$ | −2.74E−08 | −2.87E−09 |
| $X^2Y^3$ | −6.39E−08 | −3.19E−08 |
| $Y^5$ | −7.54E−08 | −5.04E−08 |
| $X^6$ | −2.89E−10 | −2.83E−10 |
| $X^4Y^2$ | −2.07E−09 | −2.14E−09 |
| $X^2Y^4$ | −1.66E−09 | −2.60E−09 |
| $Y^6$ | −3.88E−09 | −3.30E−09 |

The shapes of the second and third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 35, the equation expressing the shapes of the second and third reflection surfaces contains terms of

TABLE 33

| Surface number | Note | Origin Point position X (mm) | Origin Point position Y (mm) | Origin Point position Z (mm) | Rotation angle YZ section (deg) | Refractive index | Surface Shape |
| --- | --- | --- | --- | --- | --- | --- | --- |
| Object surface | Object surface | 0 | 0 | infinity | 0 | 1 | flat surface |
| Surface 1 | Window Plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 19 | 43 | 1 | Toroidal surface |
| Stop surface | Aperture stop | 0 | −16.460 | 17.849 | 86 | 1 | flat surface |
| Surface 5 | Second reflection surface | 0 | −41.399 | 16.105 | 113 | 1 | XY polynomial surface |
| Surface 6 | Third reflection surface | 0 | −29.507 | 1.933 | 160 | 1 | XY polynomial surface |
| Surface 7 | Window plate | 0 | −29.507 | 29.933 | 0 | 3.419 | flat surface |
| Surface 8 | Window plate | 0 | −29.507 | 30.593 | 0 | 1 | flat surface |
| Image plane | Image plane | 0 | −29.507 | 34.863 | 0 | 1 | flat surface | powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 53:
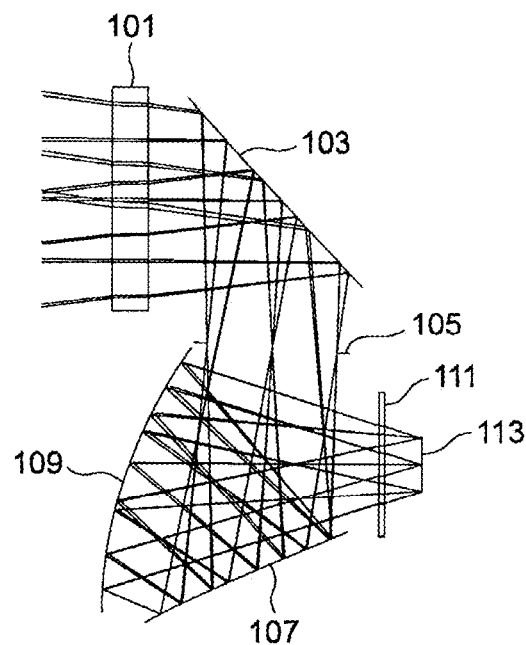
FIG. 53 is a YZ sectional view of the imaging optical system of Example 13.

FIG. 53 is a YZ sectional view of the imaging optical system of Example 4. In Example 4, the field of view (the object plane) and the image plane are in parallel to each other and the optical axis at the center of the field of view and the optical axis of the image plane are in parallel to each other and in the same orientation.

Figure 54:
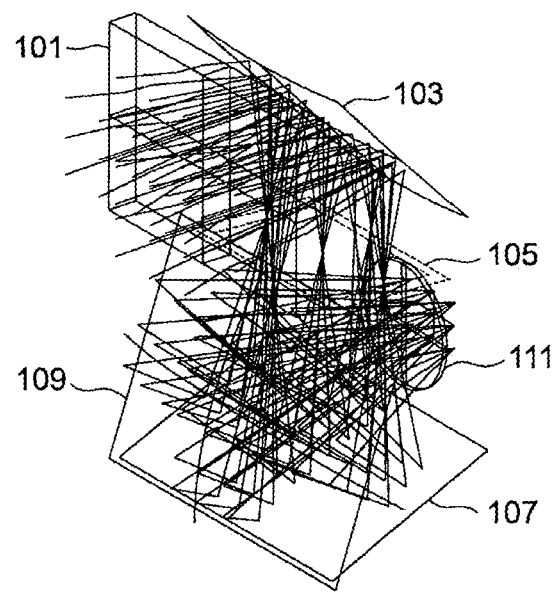
FIG. 54 shows a configuration of the imaging optical system of Example 13.

FIG. 54 shows a configuration of the imaging optical system of Example 13.

Figure 55:
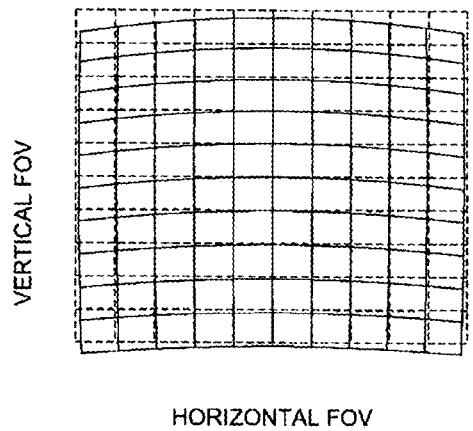
FIG. 55 shows distortion aberration of the imaging optical system of Example 13.

FIG. 55 shows distortion aberration of the imaging optical system of Example 13. The dashed line shows the reference lattice.

Figure 56:
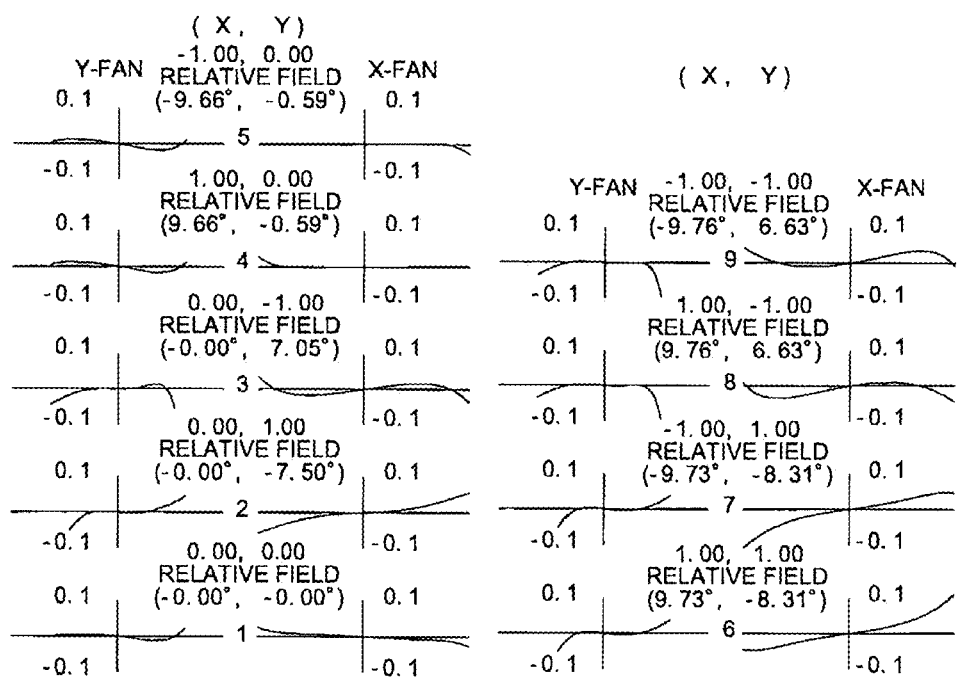
FIG. 56 shows transverse aberration of the imaging optical system of Example 13.

FIG. 56 shows transverse aberration of the imaging optical system of Example 13. FIG. 56 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 56, (X,Y) show the positions on the image plane where transverse aberration is observed. That is, FIG. 56 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 14

Table 36 shows specifications of an imaging optical system of Example 14.

TABLE 36

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object Surface | Object Surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 40 | 1 | XY polynomial surface |
| Stop surface | Aperture stop | 0 | −14.280 | 19.482 | 80 | 1 | flat surface |
| Surface 5 | Second reflection surface | 0 | −22.980 | 71.197 | 123.9 | 1 | aspherical surface |
| Surface 6 | Third reflection surface | 0 | −31.313 | 0.255 | 154 | 1 | XY polynomial surface |
| Surface 7 | Window plate | 0 | −31.313 | 34.255 | 0 | 3.419 | flat surface |
| Surface 8 | Window plate | 0 | −31.313 | 34.915 | 0 | 1 | flat surface |
| Image plane | Image plane | 0 | −31.313 | 39.185 | 0 | 1 | flat surface |

In Table 36, an origin point position is a position of the origin point of local coordinates of each surface, with reference to the origin point O in FIGS. 1 and 2A. The rotation angle is a rotation angle around X-axis of local coordinates and a counterclockwise angle with reference to the coordinate system in FIGS. 1 and 2A in YZ section.

The intersection of the light beam traveling along the optical axis of the center of field and the second reflection surface is (0, −48.25, 13.49) while the origin point of the second reflection surface (the point through which the central axis of the rotational aspherical surface) is (0, −22.98, 71.20). Thus, the origin point of the second reflection surface is largely off-centered toward the image plane side.

Table 37 shows coefficients that determine the rotationally symmetric aspherical shape of the second reflection surface.

TABLE 37

| | Surface 5 |
|---|---|
| R | 2.29E+02 |
| K | 1.63E+00 |
| $Y^4$ | 3.85E−07 |
| $Y^6$ | −7.22E−11 |

TABLE 37-continued

| | Surface 5 |
|---|---|
| $Y^8$ | 5.72E−15 |
| $Y^{10}$ | −4.75E−19 |
| $Y^{12}$ | 3.07E−24 |
| $Y^{14}$ | −2.35E−27 |

Table 38 shows coefficients that determine the shapes of the first and third reflection surfaces.

TABLE 38

| | Surface 3 | Surface 6 |
|---|---|---|
| $X^2$ | 4.48E−03 | −6.71E−03 |
| $Y^2$ | 1.52E−03 | −7.12E−03 |
| $X^2Y$ | −2.74E−06 | 1.76E−05 |
| $Y^3$ | −3.40E−05 | −4.71E−05 |
| $X^4$ | 1.09E−06 | −3.37E−07 |
| $X^2Y^2$ | 8.56E−07 | −1.93E−06 |
| $Y^4$ | 8.10E−07 | −1.74E−06 |
| $X^4Y$ | 5.45E−09 | −2.08E−10 |
| $X^2Y^3$ | 4.23E−08 | −8.26E−09 |
| $Y^5$ | 3.16E−08 | −2.47E−08 |
| $X^6$ | 1.40E−08 | 7.55E−11 |
| $X^4Y^2$ | 1.91E−08 | −3.38E−10 |
| $X^2Y^4$ | −4.09E−11 | −5.63E−10 |
| $Y^6$ | −2.92E−09 | −2.63E−10 |
| $X^6Y$ | 2.39E−11 | −3.79E−12 |
| $X^4Y^3$ | −1.55E−10 | −2.37E−11 |
| $X^2Y^5$ | −6.52E−11 | −7.60E−11 |
| $Y^7$ | −2.25E−10 | −5.04E−11 |
| $X^8$ | −6.73E−11 | −1.79E−13 |
| $X^6Y^2$ | −1.81E−10 | −4.39E−13 |
| $X^4Y^4$ | −4.69E−11 | −1.68E−12 |
| $X^2Y^6$ | 3.31E−11 | −3.77E−12 |
| $Y^8$ | 1.62E−11 | −3.28E−12 |

The shapes of the first and third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 38, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 57:
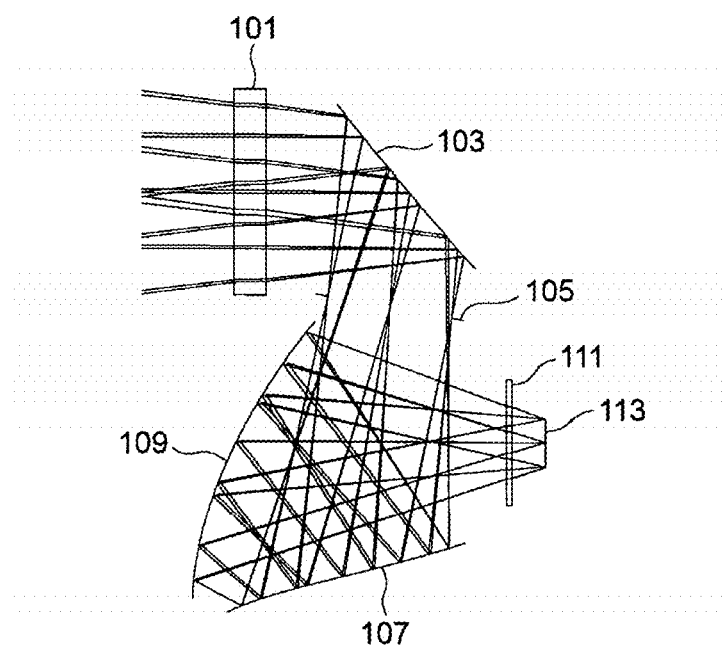
FIG. 57 is a YZ sectional view of the imaging optical system of Example 14.

FIG. 57 is a YZ sectional view of the imaging optical system of Example 14. In Example 14, the field of view (the object plane) and the image plane are in parallel to each other and the optical axis at the center of the field of view and the optical axis of the image plane are in parallel to each other and in the same orientation.

Figure 58:
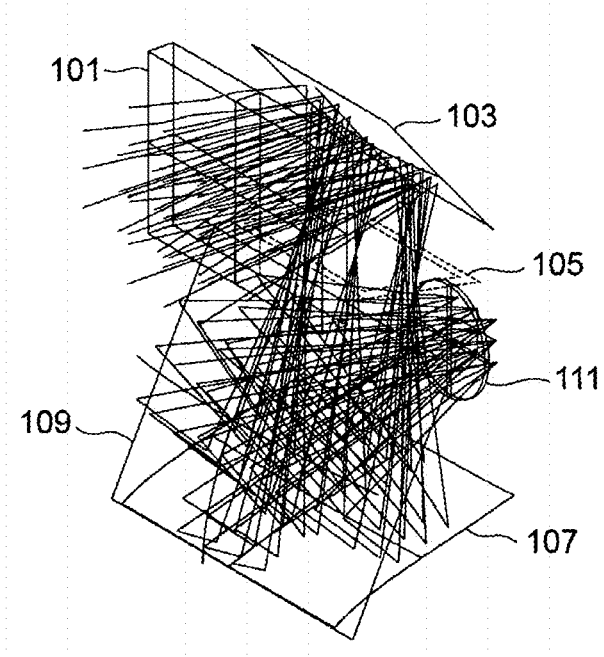
FIG. 58 shows a configuration of the imaging optical system of Example 14.

FIG. 58 shows a configuration of the imaging optical system of Example 14.

Figure 59:
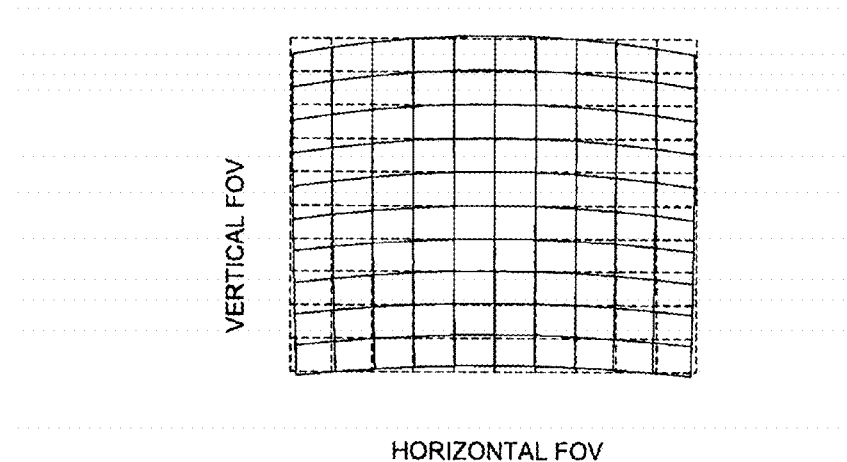
FIG. 59 shows distortion aberration of the imaging optical system of Example 14.

FIG. 59 shows distortion aberration of the imaging optical system of Example 14. The dashed line shows the reference lattice.

Figure 60:
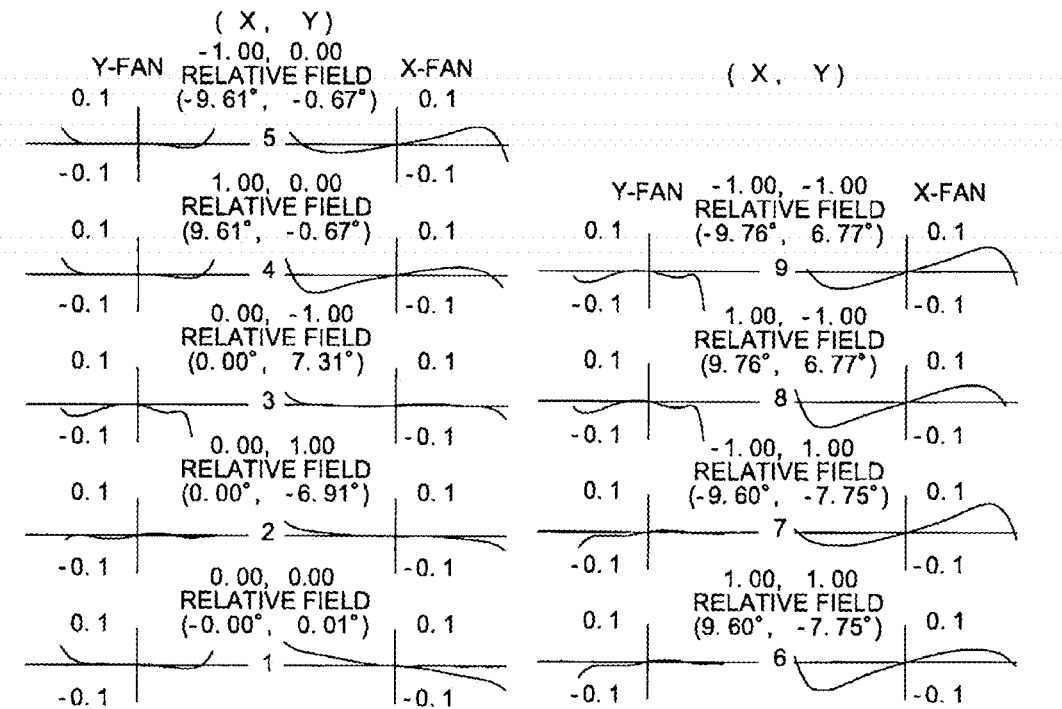
FIG. 60 shows transverse aberration of the imaging optical system of Example 14.

FIG. 60 shows transverse aberration of the imaging optical system of Example 14. FIG. 60 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 60, (X,Y) show the positions on the image plane where transverse aberration is observed. That is, FIG. 60 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 15

Table 39 shows specifications of an imaging optical system of Example 15.

TABLE 39

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 42 | 1 | XY polynomial surface |
| Stop surface | Aperture stop | 0 | −14.421 | 20.484 | 84 | 1 | flat surface |

TABLE 39-continued

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Surface 5 | Second reflection surface | 0 | −44.753 | 17.296 | 111 | 1 | X toroidal surface |
| Surface 6 | Third reflection surface | 0 | −31.036 | 2.062 | 159 | 1 | XY polynomial surface |
| Surface 7 | Window plate | 0 | −31.036 | 32.562 | 0 | 3.419 | flat surface |
| Surface 8 | Window plate | 0 | −31.036 | 33.222 | 0 | 1 | flat surface |
| Image plane | Image plane | 0 | −31.036 | 37.492 | 0 | 1 | flat surface |

Table 40 shows coefficients that determine a toroidal surface shape of the second reflection surface.

TABLE 40

| | Surface 5 |
|---|---|
| Rx | 2.13E+02 |
| Ry | 1.78E+02 |
| $X^4$ | −5.93E−07 |
| $X^6$ | −4.92E−11 |
| $X^8$ | 6.21E−14 |

Table 41 shows coefficients that determine the shapes of the first and third reflection surfaces (free-form surfaces).

TABLE 41

| | Surface 3 | Surface 6 |
|---|---|---|
| $X^2$ | 3.64E−03 | −7.37E−03 |
| $Y^2$ | 2.49E−03 | −5.61E−03 |
| $X^2Y$ | 7.31E−06 | 3.97E−05 |
| $Y^3$ | 1.69E−06 | 4.16E−05 |
| $X^4$ | 1.30E−06 | −7.74E−07 |
| $X^2Y^2$ | 2.50E−06 | −6.45E−07 |
| $Y^4$ | 4.44E−07 | −3.39E−07 |
| $X^4Y$ | 2.42E−08 | 2.43E−10 |
| $X^2Y^3$ | −2.09E−10 | 1.63E−08 |
| $Y^5$ | 2.25E−09 | 7.55E−09 |
| $X^6$ | −6.12E−10 | −1.35E−10 |
| $X^4Y^2$ | −4.01E−09 | −4.70E−10 |
| $X^2Y^4$ | −2.09E−09 | −7.76E−10 |
| $Y^6$ | 4.21E−10 | −3.70E−10 |

The shapes of the first and third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 41, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 61:
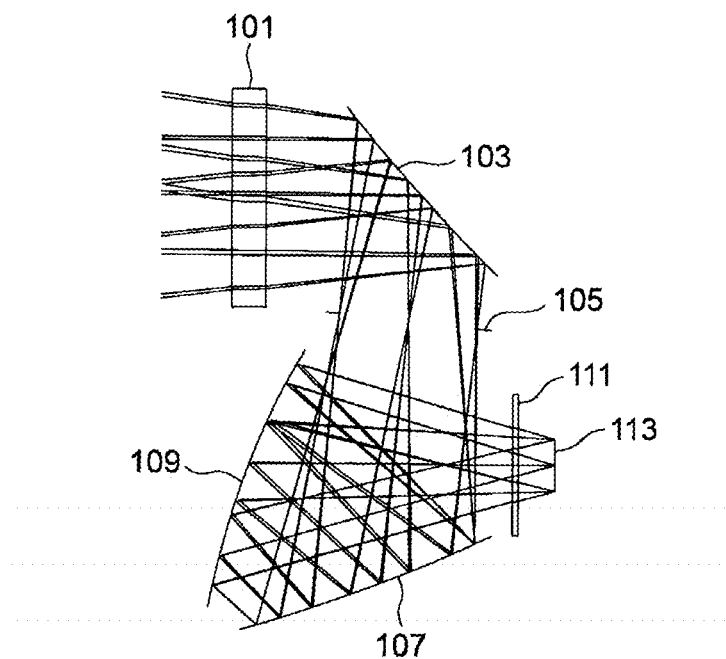
FIG. 61 is a YZ sectional view of the imaging optical system of Example 15.

FIG. 61 is a YZ sectional view of the imaging optical system of Example 15. In Example 15, the field of view (the object plane) and the image plane are in parallel to each other and the optical axis at the center of the field of view and the optical axis of the image plane are in parallel to each other and in the same orientation.

Figure 62:
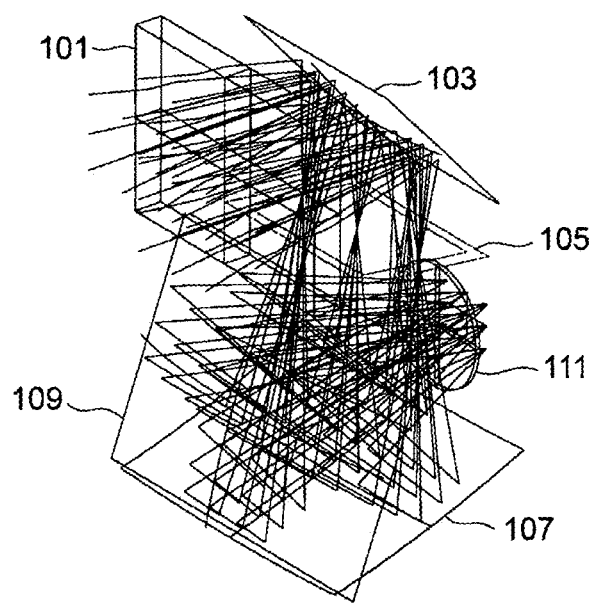
FIG. 62 shows a configuration of the imaging optical system of Example 15.

FIG. 62 shows a configuration of the imaging optical system of Example 15.

Figure 63:
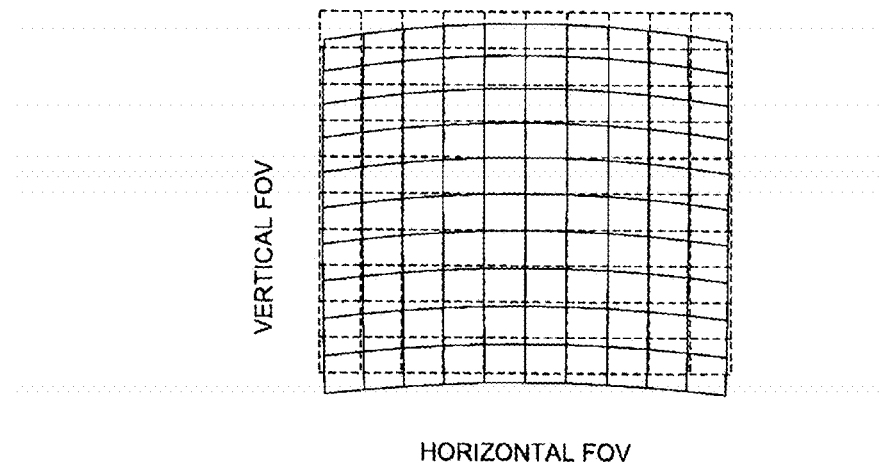
FIG. 63 shows distortion aberration of the imaging optical system of Example 15.

FIG. 63 shows distortion aberration of the imaging optical system of Example 15. The dashed line shows the reference lattice.

Figure 64:
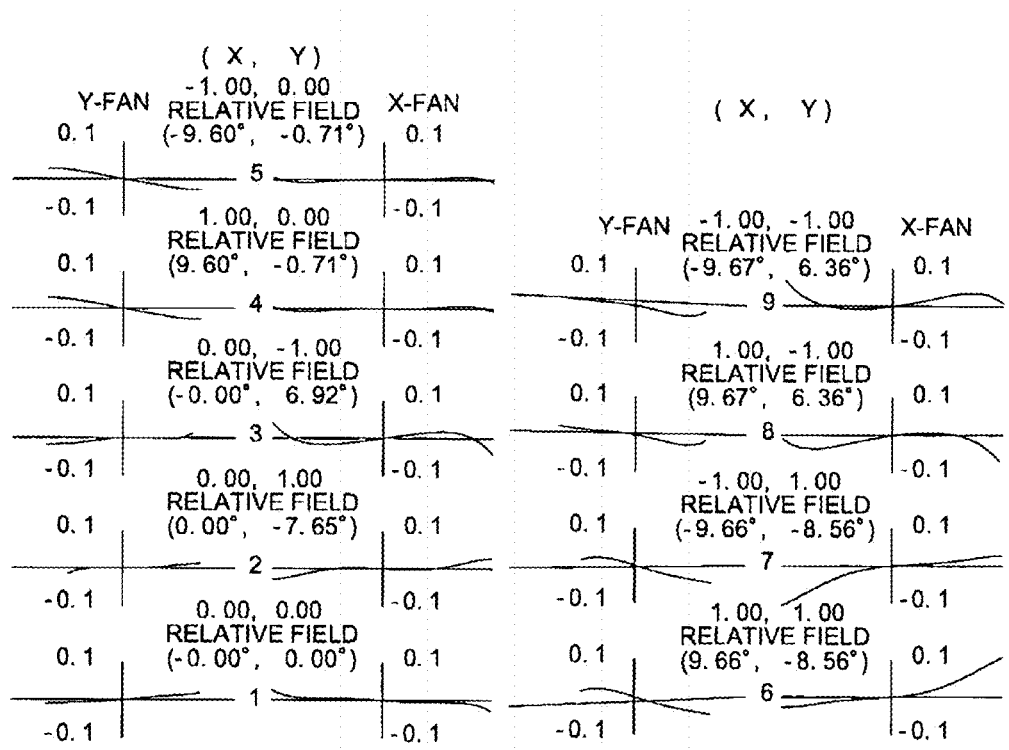
FIG. 64 shows transverse aberration of the imaging optical system of Example 15.

FIG. 64 shows transverse aberration of the imaging optical system of Example 15. FIG. 64 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 64, (X,Y) show the positions on the image plane where transverse aberration is observed. That is, FIG. 64 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Example 16

Table 42 shows specifications of an imaging optical system of Example 16.

TABLE 42

| Surface number | Note | Origin Point position X (mm) | Origin Point position Y (mm) | Origin Point position Z (mm) | Rotation angle YZ section (deg) | Refractive index | Surface shape |
|---|---|---|---|---|---|---|---|
| Object surface | Object surface | 0 | 0 | infinity | 0 | 1 | flat surface |
| Surface 1 | Window plate | 0 | 0 | 0 | 0 | 4.003 | flat surface |
| Surface 2 | Window plate | 0 | 0 | 4 | 0 | 1 | flat surface |
| Surface 3 | First reflection surface | 0 | 0 | 22 | 42 | 1 | XY polynomial surface |
| Stop surface | Second reflection surface | 0 | −48.732 | 16.878 | 110 | 1 | XY polynomial surface |
| Surface 5 | Third reflection surface | 0 | −33.796 | 1.412 | 158 | 1 | XY polynomial surface |
| Surface 6 | Window plate | 0 | −33.796 | 34.412 | 0 | 3.419 | flat surface |
| Surface 7 | Window plate | 0 | −33.796 | 35.072 | 0 | 1 | flat surface |
| Image plane | Image plane | 0 | −33.796 | 39.342 | 0 | 1 | flat surface |

In Example 16, an aperture is provided on the reflection surface of the second reflecting mirror 107.

Table 43 shows coefficients that determine the shapes of the first to third reflection surfaces.

TABLE 43

| | Surface 3 | Stop surface | Surface 5 |
|---|---|---|---|
| $X^2$ | 1.33E−03 | 2.45E−03 | −5.52E−03 |
| $Y^2$ | 1.00E−03 | 2.69E−03 | −4.06E−03 |
| $X^2Y$ | 4.51E−06 | 9.63E−06 | 4.17E−05 |
| $Y^3$ | −2.95E−05 | −6.43E−05 | −5.25E−05 |
| $X^4$ | 4.21E−07 | −2.10E−07 | −4.25E−07 |
| $X^2Y^2$ | 6.11E−07 | −4.68E−07 | −9.15E−07 |
| $Y^4$ | 7.51E−07 | −1.04E−06 | −5.28E−07 |
| $X^4Y$ | −1.03E−09 | −1.96E−09 | 6.69E−09 |
| $X^2Y^3$ | −1.58E−08 | −2.25E−08 | −2.39E−09 |
| $Y^5$ | −1.38E−08 | −4.65E−08 | −4.13E−08 |

The shapes of the first to third reflection surfaces can be expressed by the following equation with local coordinates of the respective surfaces.

$$Z = C4 \times X^2 + C5 \times XY + C6 \times Y^2 + C7 \times X^3 + C8 \times X^2Y + C9 \times XY^2 + C10 \times Y^3 + C11 \times X^4 + C12 \times X^3Y + C13 \times X^2Y^2 + C14 \times XY^3 + C15 \times Y^4 + \ldots + C66 \times Y^{10}$$

According to Table 43, the equation expressing the shapes of the first to third reflection surfaces contains terms of powers of odd numbers of Y. This indicates that the YZ section shapes of the first to third reflection surfaces are asymmetric with respect to Z-axis of local coordinates. In the embodiment, a change in inclination of the optical axis in the YZ section becomes larger because the aperture is provided between the first reflecting mirror 103 and the second reflecting mirror 107 so as to block stray light. Therefore, when the YZ section shape is symmetric with respect to Z-axis of local coordinates, the comatic aberration or astigmatism becomes larger. Accordingly, the YZ section shape is made asymmetric with respect to Z-axis of local coordinates for reducing the comatic aberration or astigmatism.

Figure 82:
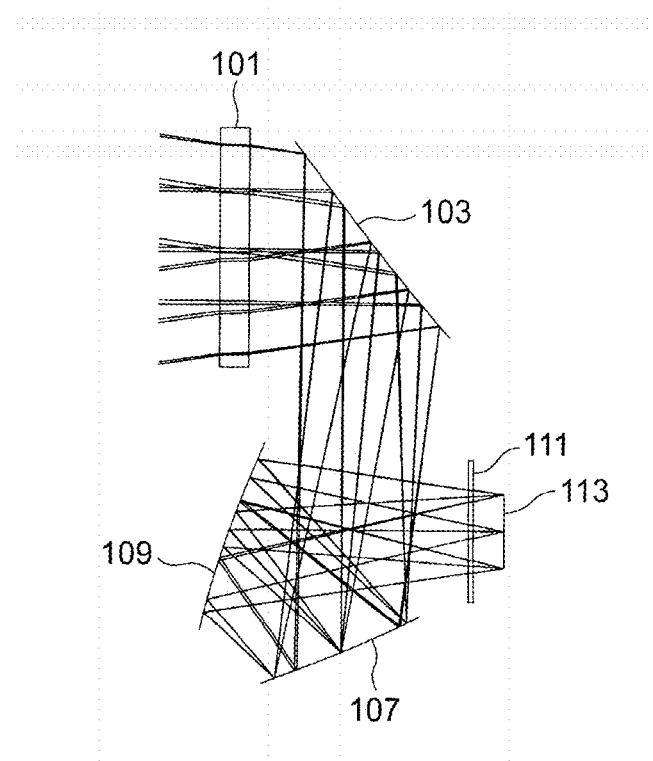
FIG. 82 is a YZ sectional view of the imaging optical system of Example 16.

FIG. 82 is a YZ sectional view of the imaging optical system of Example 16. In Example 4, the field of view (the object plane) and the image plane are in parallel to each other and the optical axis at the center of the field of view and the optical axis of the image plane are in parallel to each other and in the same orientation.

Figure 83:
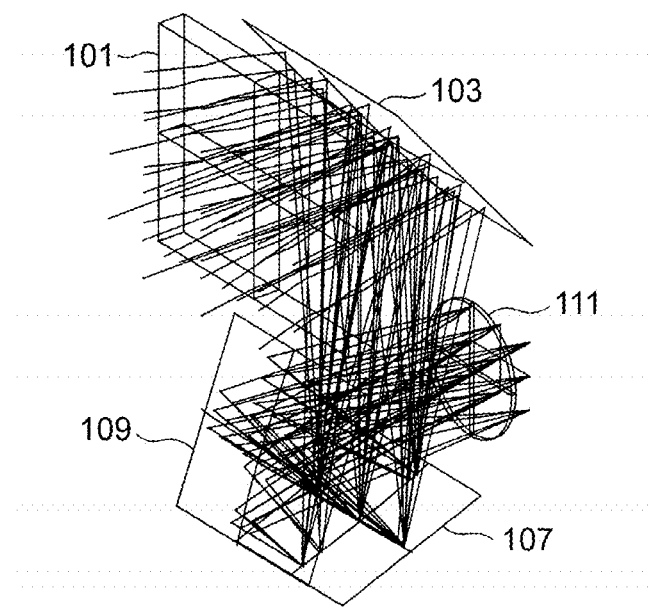
FIG. 83 shows a configuration of the imaging optical system of Example 16.

FIG. 83 shows a configuration of the imaging optical system of Example 16.

Figure 84:
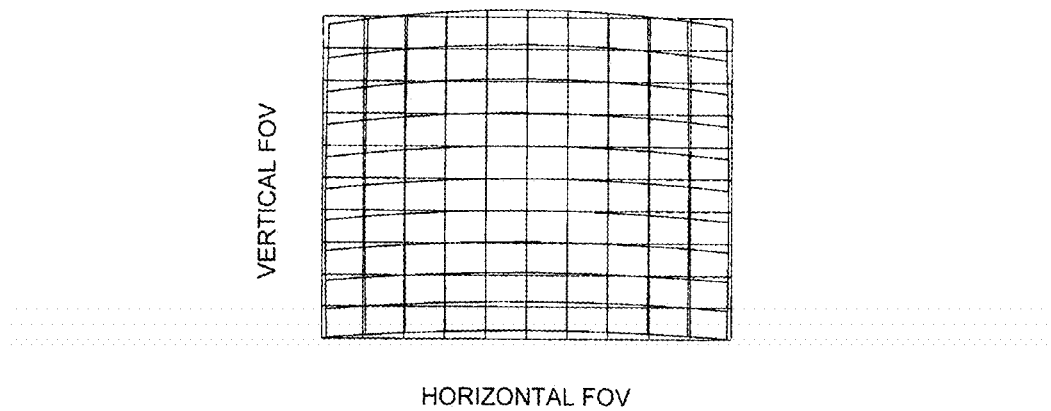
FIG. 84 shows distortion aberration of the imaging optical system of Example 16.

FIG. 84 shows distortion aberration of the imaging optical system of Example 16. The dashed line shows the reference lattice.

Figure 85:
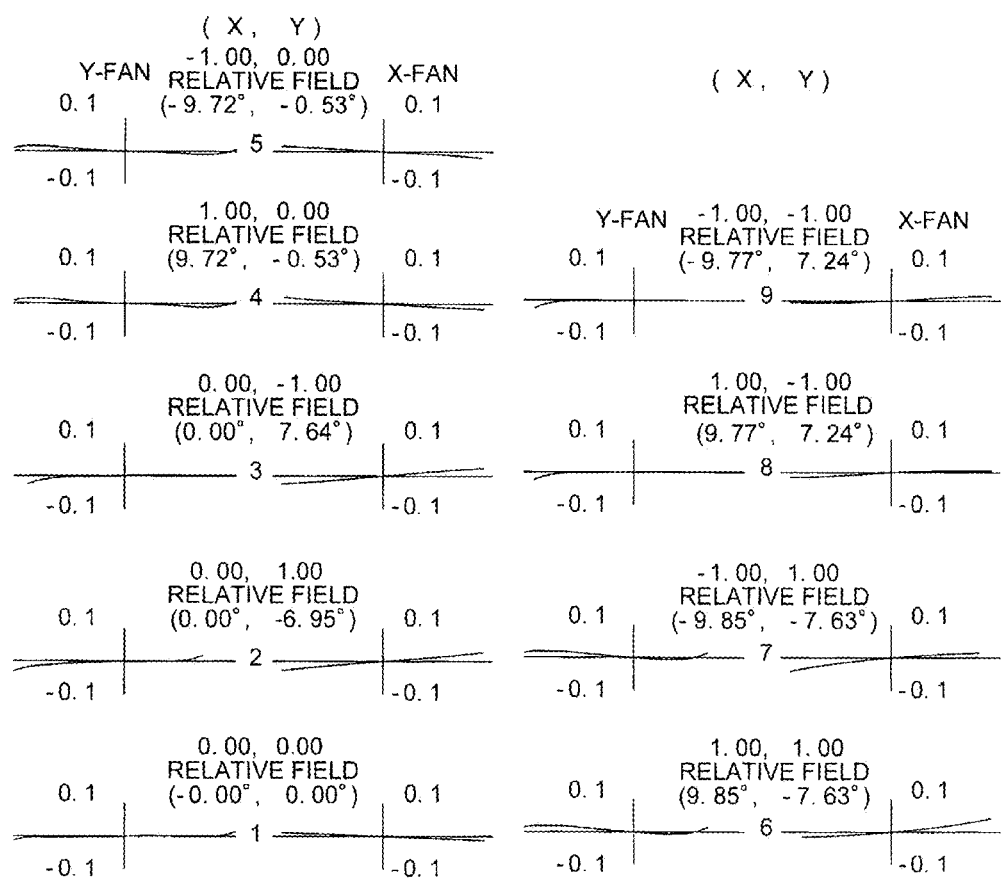
FIG. 85 shows transverse aberration of the imaging optical system of Example 16.

FIG. 85 shows transverse aberration of the imaging optical system of Example 16. FIG. 85 shows transverse aberration with respect to meridional image plane (Y-FAN) and sagittal image plane (X-FAN). The horizontal axis indicates the relative position where the beam passes through the aperture stop for each of the meridional image plane and the sagittal image plane. The position of principal ray L is zero and the outermost positions in the aperture radial direction is ±1, respectively. The vertical axis indicates amount of displacement D from the principal ray on the image plane, of positions on the image plane through which the beams that have passed through the relative positions pass, when the coordinate on the image plane through which the principal rays L on the respective image planes pass is zero (FIG. 78). In FIG. 85, (X,Y) show the positions on the image plane where transverse aberration is observed. That is, FIG. 85 shows transverse aberration with respect to nine points on the image plane represented by (X,Y). The size of the image plane is 12 millimeters in the X-axis direction and 9 millimeters in the Y-axis direction, and (−1,0) indicates coordinates (−6,0) and (0,1) indicates coordinates (0,4.5), for example. An angular vector represents an angle of X-component and Y-component incident in the optical system of beams collecting on a point on the image plane to be observed.

Product of Imaging Optical System

Figure 72:
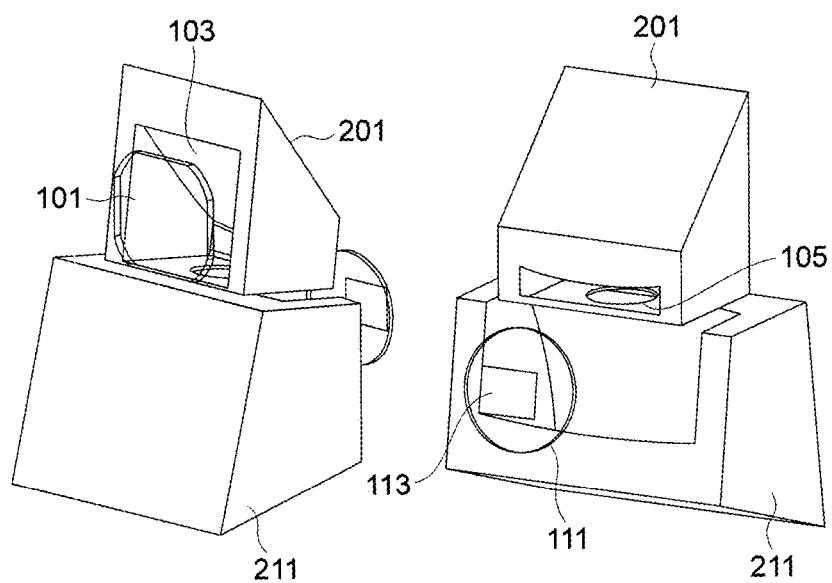
FIG. 72 shows a configuration of an imaging optical system as a product according to one embodiment of the present invention.

FIG. 72 shows a configuration of an imaging optical system as a product according to one embodiment of the present invention. The first reflecting mirror 103 and the aperture 105 are formed as a molded component 201, and the second reflecting mirror 107 and the third reflecting mirror 109 are formed as a molded component 211.

Figure 73:
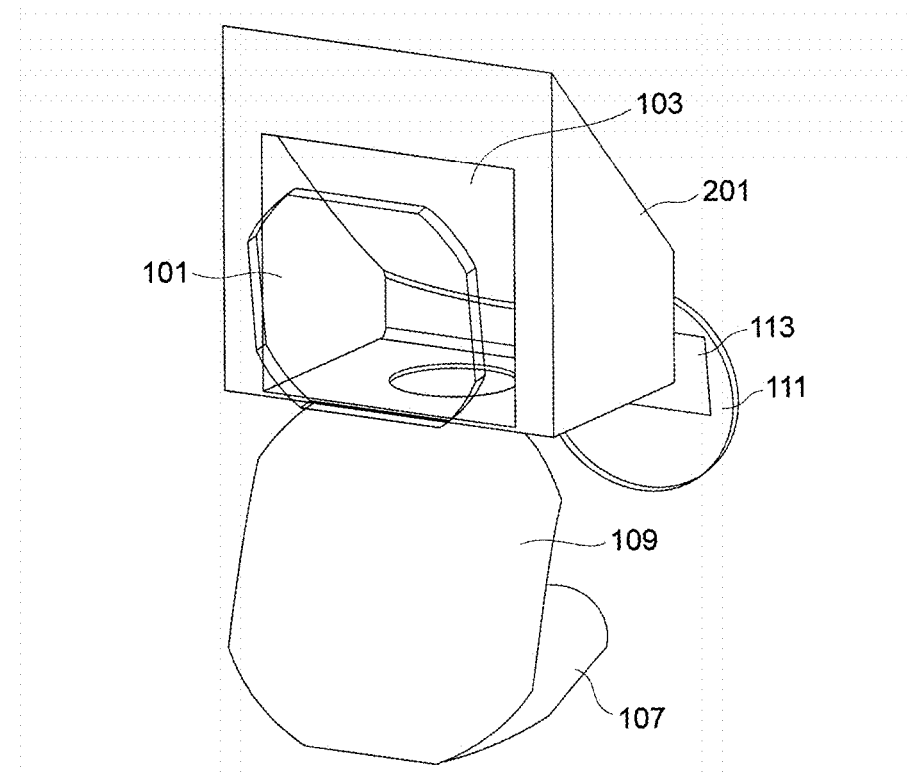
FIG. 73 shows one embodiment of a molded component including the first reflecting mirror and the aperture stop.

FIG. 73 shows one embodiment of a molded component 201 including the first reflecting mirror 103 and the aperture 105.

Figure 74:
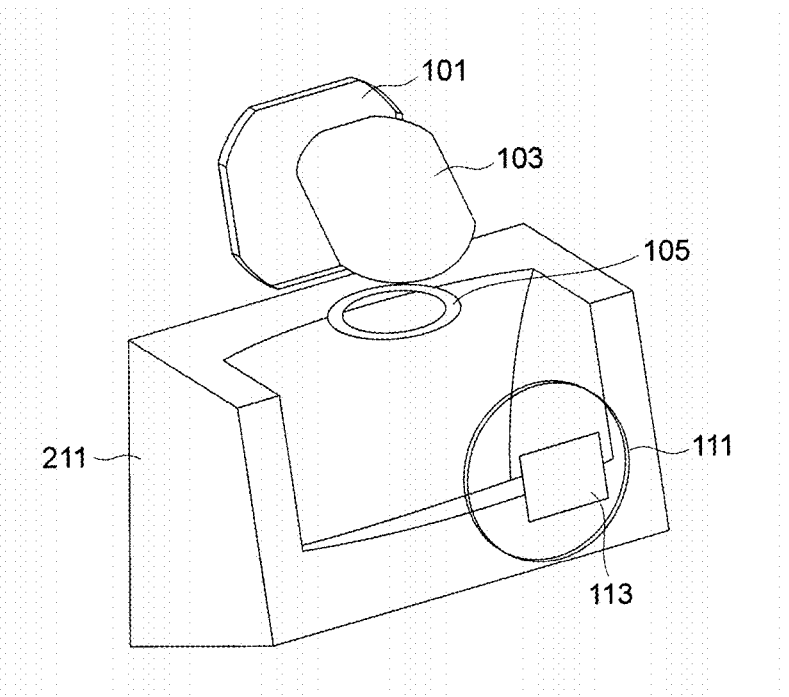
FIG. 74 shows one embodiment of a molded component including the second reflecting mirror and the third reflecting mirror.

FIG. 74 shows one embodiment of a molded component 211 including the second reflecting mirror 107 and the third reflecting mirror 109. It has a vibration-resistant box structure.

Figure 75:
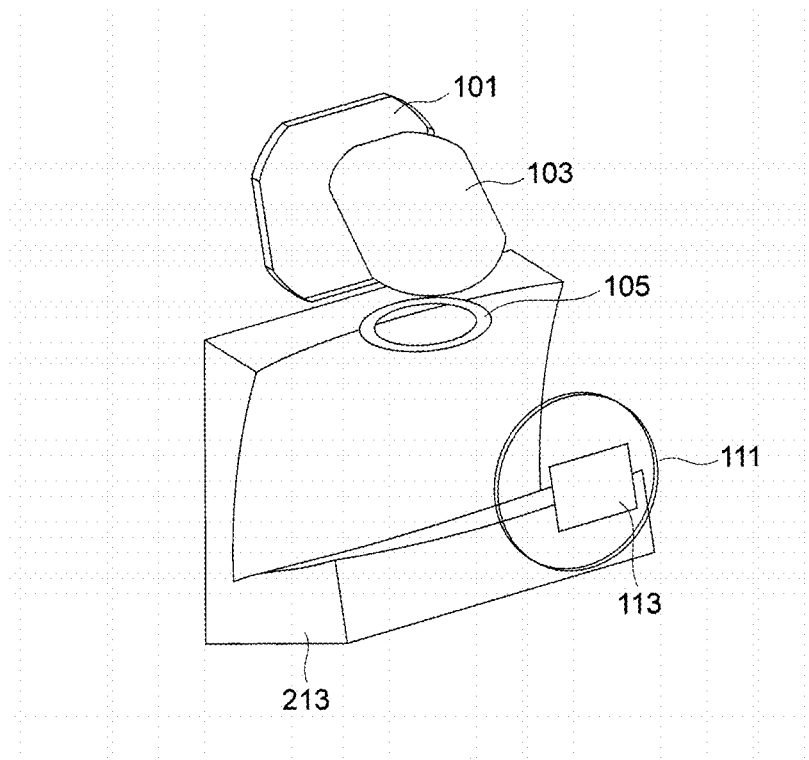
FIG. 75 shows another embodiment of a molded component including the second reflecting mirror and the third reflecting mirror.

FIG. 75 shows another embodiment of a molded component 213 including the second reflecting mirror 107 and the third reflecting mirror 109.

Figure 76:
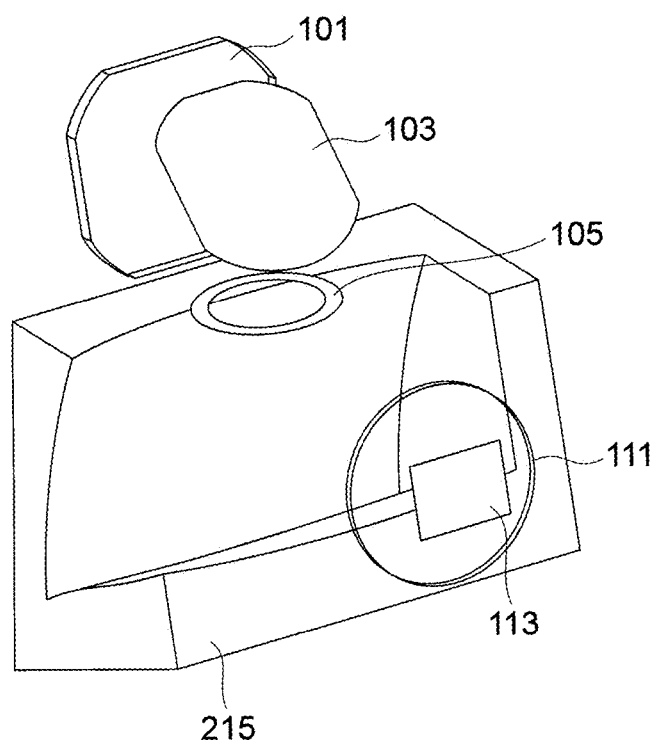
FIG. 76 shows still another embodiment of a molded component including the second reflecting mirror and the third reflecting mirror.

FIG. 76 shows still another embodiment of a molded component 215 including the second reflecting mirror 107 and the third reflecting mirror 109.

Figure 81A:
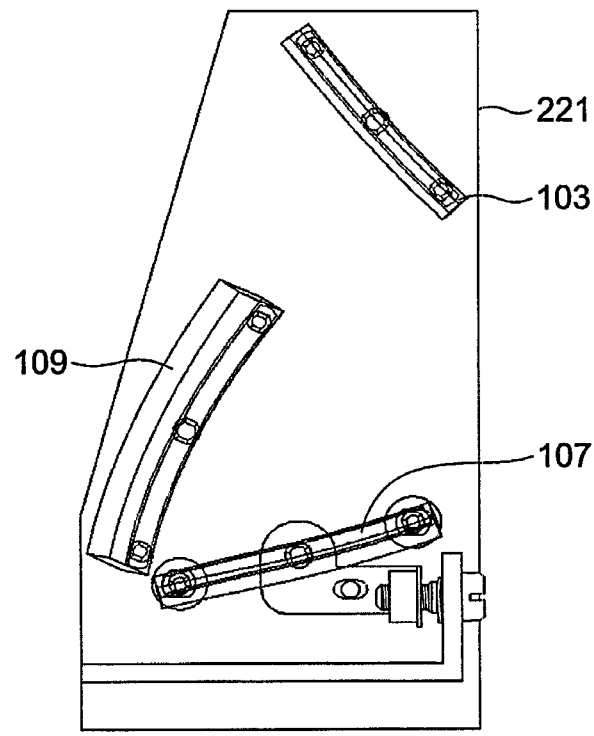
FIG. 81 shows an embodiment in which the first reflecting mirror, the second reflecting mirror and the third reflecting mirror are fixed to a frame by screws.
Figure 81B:
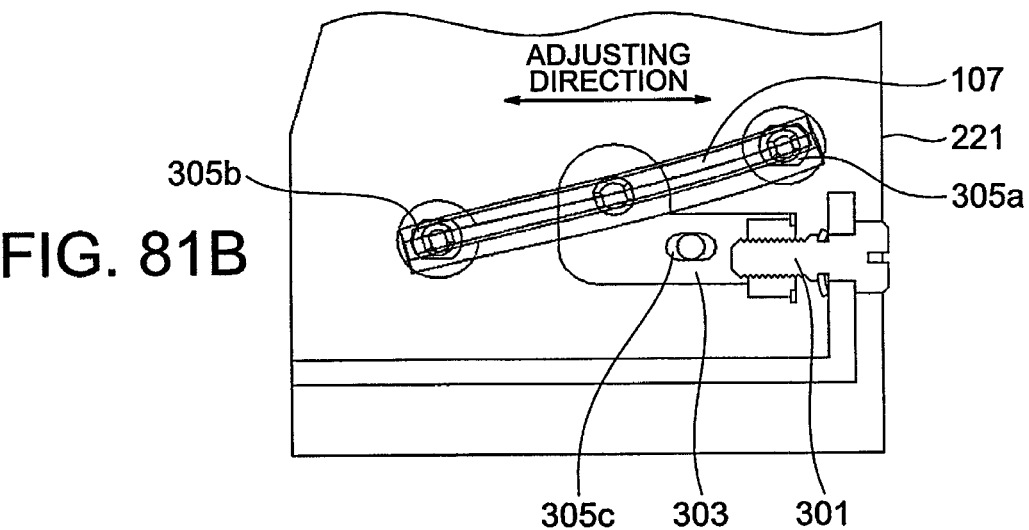

FIG. 81 shows an embodiment in which the first reflecting mirror 103, the second reflecting mirror 107 and the third reflecting mirror 109 are fixed to a frame 221 by screws. The second reflecting mirror 107 is fixed to an adjustment screw 301 by a link 303. By moving the adjustment screw 301 with respect to the frame 221 in adjusting direction (in the horizontal direction, that is, in Z axis direction), the second reflecting mirror 107 can be moved in the adjusting direction (in the horizontal direction, that is, in Z axis direction). Screw holes for fixing 305a and 305b of the second reflecting mirror 107 and a screw hole for fixing 305c of the link 303 are elongated in the adjusting direction.

The reason that an adjusting mechanism for moving the second reflecting mirror 107 in Z direction is provided is below. Assume that positions and inclinations of the first reflecting mirror 103, the second reflecting mirror 107 and the third reflecting mirror 109 may vary to a certain degree. The variation can be compensated by following movements.
1) Movement of the image plane in Z axis direction and movement of the first reflection surface in Y direction
2) Movement of the image plane in Z axis direction and movement of the first reflection surface in Z direction
3) Movement of the image plane in Z axis direction and movement of the second reflection surface in Y direction
4) Movement of the image plane in Z axis direction and movement of the second reflection surface in Z direction
5) Movement of the image plane in Z axis direction and movement of the third reflection surface in Y direction
6) Movement of the image plane in Z axis direction and movement of the third reflection surface in Z direction
7) Movement of the image plane in Z axis direction alone On the other hand, MTF (%) for MTF spatial frequency of 7 (lp/mm) is obtained for five points including the center of the field of view and the four corners on the meridional image plane and sagittal image plane. The average value of the values of the ten points is used as a performance evaluation value. The performance evaluation value is a value which can be realized with a probability of $2\sigma$. The performance evaluation value in design is 71.49%.

The performance evaluation values (MTF (%)) for items 1) to 7) described above are below.
1) 31.13
2) 31.94
3) 32.22
4) 38.12
5) 32.78
6) 32.78
7) 7.28

As shown above, movement of the second reflecting mirror 107 in Z axis direction is most effective to improve the performance evaluation value, and therefore the mechanism for movement of the second reflecting mirror 107 in Z axis direction is provided.

Rangefinder

Figure 79:
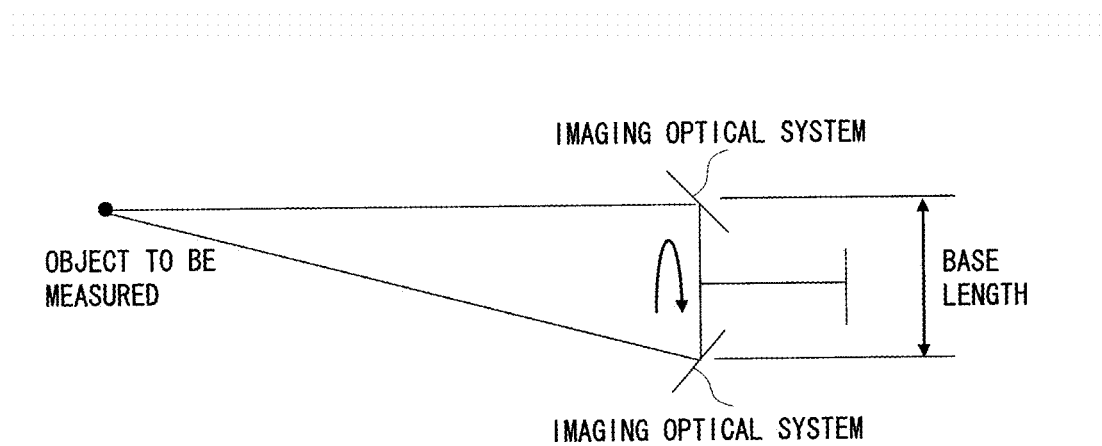
FIG. 79 shows the concept of a rangefinder.

FIG. 79 shows the concept of a rangefinder. In order to measure and determine the distance to an object (subject), the object is imaged from different view points and obtained images are searched for corresponding points of the respective pixels between the images. The distance to the object can be obtained based on the parallax between corresponding pixels. Here, the distance between different view points is referred to as base length. Therefore, in the typical rangefinder, two imaging optical systems provided separately with the base length in between are used.

FIG. 80 shows a configuration of the imaging optical system of Example 4 and a configuration in which the imaging optical system is rotated to 180 degrees around the optical axis of the image plane. d is about 33 millimeters and a rangefinder of about 66 millimeters in base length is realized by one imaging optical system according to the configuration. In an infrared camera, the cost of a cooling system in a light receiving part is high in addition to that of the optical system. Therefore, the cost is drastically reduced using only one optical system.

Features of Embodiments of the Present Invention

According to the aspect of the invention, a compact imaging optical system using reflecting mirrors that can be equipped and used in a vehicle or the like can be obtained.

Features of the embodiments of the present invention will be described below.

In an imaging optical system according to an embodiment of the invention, assuming that the focal length of the first reflection surface in XZ section and that in YZ section are represented respectively as fx1 and fy1, the relational expressions $$0 < fx1/L3 < 5$$

$$0 < fy1/L3 < 10$$

are further satisfied.

In an imaging optical system according to another embodiment of the invention, assuming that the combined focal length of the first reflection surface in XZ section and that in YZ section are represented respectively as fx1' and fy1', the relational expressions $$0 < fx1'/L3 < 5$$

$$0 < fy1'/L3 < 10$$

are further satisfied.

According to the embodiments described above, the layout dimensions can be reduced and vignetting of light beam can be prevented. Further, the angle of view can be increased and telecentricity of the angle of view of light reaching the image plane (degree of how orthogonally the reaching light travels to the image plane) can be improved. Further, brightness (F-number) can be improved and a space for setting a light shielding plate can be obtained between the first reflection surface and the second reflection surface.

In an imaging optical system according to another embodiment of the invention, assuming that along the path of the beam traveling along the optical axis at the center of the field of view a distance between the first reflection surface and the second reflection surface is L1 and a distance between the first reflection surface and the image plane is L, the relational expression $$0.35 < L1/L < 0.5$$

is further satisfied.

According to the embodiment, a compact imaging optical system in which stray lights reaching the image plane are minimized by blocking them.

In an imaging optical system according to another embodiment of the invention, the second reflection surface is a rotationally asymmetric aspherical surface.

When the second reflection surface is made a rotationally asymmetric aspherical surface, deterioration of resolution can be prevented in comparison with the case in which the three reflection surfaces are rotationally asymmetric surfaces like free-form surfaces.

In an imaging optical system according to another embodiment of the invention, the center position of the rotationally symmetric aspherical surface is displaced from the intersection of the path of the light beam traveling along the optical axis of the center of field and the aspherical surface so as to reduce aberrations of the imaging optical system.

According to the embodiment, differences in optical path are canceled and therefore aberrations of the imaging optical system can be reduced.

In an imaging optical system according to another embodiment of the invention, an aperture is provided between the first reflecting surface and the second reflecting surface.

According to the embodiment, stray lights traveling mainly from the object side to the image side can be blocked.

In an imaging optical system according to another embodiment of the invention, the aperture is rectangular.

A rectangular aperture is compared with a circular aperture brightness of which is the same as that of the former. For example, an aperture ratio in directions of sides of a square orthogonal to each other can be made smaller than that of the circular aperture. Accordingly, resolution can be improved.

An imaging optical system according to another embodiment of the invention is a non-relay optical system that does not perform intermediate imaging.

A compact imaging optical system is obtained using a non-relay optical system that does not perform intermediate imaging.

In an imaging optical system according to another embodiment of the invention, the optical axis at the center of the field of view and the optical axis of the image plane are different in orientation.

Since the optical axis at the center of the field of view and the optical axis of the image plane are different in orientation, light from the object side does not directly enter the image plane.

In an imaging optical system according to another embodiment of the invention, the optical axis at the center of the field of view and the optical axis of the image plane are the same in orientation.

For some applications it is preferable that the optical axis at the center of the field of view and the optical axis of the image plane are the same in orientation. Even when the optical axis at the center of the field of view and the optical axis of the image plane are the same in orientation, light from the object side toward the image plane can be shielded by providing a light shielding plate.

An imaging optical system according to another embodiment of the invention includes a light shielding plate so that the light other than the light from the most downstream reflecting mirror along the optical path may not enter the image plane.

In an imaging optical system according to another embodiment of the invention, the reflecting mirrors are made of plastic coated with metal.

Since the reflecting mirrors are made of plastic, molding is easy and inexpensive.

An imaging optical system according to another embodiment of the invention is used for infrared light.

The imaging optical system can be realized without using expensive materials such as germanium.

An imaging optical system according to another embodiment of the invention is used for millimeter-wave or terahertz-wave.

The imaging optical system can be realized without a complicated structure.

An imaging optical system according to another embodiment of the invention is configured such that adjustment can be performed by moving the second reflection surface in Z axis direction.

The performance evaluation value can be remarkably improved when adjustment is performed by moving the second reflection surface in Z axis direction.

In a rangefinder according to the invention is configured such that the imaging optical system according to any one of the above embodiments is rotated to 180 degrees around the optical axis of the image plane.

According to the invention, since only one imaging optical system is used, the cost can be drastically reduced.

What is claimed is:

1. An imaging optical system comprising only three reflecting mirrors having first to third reflection surfaces and configured, such that in an XYZ orthogonal coordinate system using an optical axis at the center of the field of view as Z-axis, the optical axis at the center of the field of view and an optical axis of an image plane are in parallel to each other by changing orientation of the optical axis in a YZ section while maintaining the orientation of the optical axis in an XZ section, wherein at least one of the three reflection surfaces is rotationally asymmetric, and wherein assuming that along the path of the beam traveling along the optical axis at the center of the field of view a distance between the second reflection surface and the third reflection surface is L2, a distance between the third reflection surface and the image plane is L3 and an equivalent F-number of the imaging optical system is represented as Fno, the relational expressions $$0.5 < Fno(L2/L3) < 1.3 \text{ and } Fno \leq 2.2$$

are satisfied.

2. An imaging optical system according to claim 1, wherein assuming that along the path of the beam traveling along the optical axis at the center of the field of view a distance between the first reflection surface and the second reflection surface is L1 and a distance between the first reflection surface and the image plane is L, the relational expression $$0.35 < L1/L < 0.5$$

is further satisfied.

3. An imaging optical system according to claim 1, wherein the second reflection surface is a rotationally asymmetric aspherical surface.

4. An imaging optical system according to claim 3, wherein the center position of the rotationally symmetric aspherical surface is displaced from the intersection of the path of the light beam traveling along the optical axis of the center of field and the aspherical surface so as to reduce aberrations of the imaging optical system.

5. An imaging optical system according to claim 1, wherein an aperture is provided between the first reflecting surface and the second reflecting surface.

6. An imaging optical system according to claim 5, wherein the aperture is rectangular.

7. An imaging optical system according to claim 1, which is a non-relay optical system that does not perform intermediate imaging.

8. An imaging optical system according to claim 1, wherein the optical axis at the center of the field of view and the optical axis of the image plane are different in orientation.

9. An imaging optical system according to claim 1, wherein the optical axis at the center of the field of view and the optical axis of the image plane are the same in orientation.

10. An imaging optical system according to claim 1, wherein a light shielding plate is provided between the first reflecting mirror and the second reflecting mirror.

11. An imaging optical system according to claim 1, wherein the reflecting mirrors are made of plastic coated with metal.

12. An imaging optical system according to claim 1, which is used for infrared light.

13. An imaging optical system according to claim 1, which is used for millimeter-wave or terahertz-wave.

14. An imaging optical system according to claim 1, which is configured such that adjustment can be performed by moving the second reflection surface in Z axis direction.

15. A rangefinder configured such that that the imaging optical system according to claim 1 may be rotated to 180 degrees around an optical axis incident to the image plane.

16. An imaging device comprising the imaging optical system according to claim 1.

\* \* \* \* \*